(12) United States Patent
Yasui et al.

(10) Patent No.: US 6,624,579 B2
(45) Date of Patent: Sep. 23, 2003

(54) MAGNETRON DRIVE POWER SUPPLY

(75) Inventors: Kenji Yasui, Yamatokoriyama (JP); Takeshi Kitaizumi, Yamatokoriyama (JP); Yoshiaki Ishio, Ikoma (JP); Hideki Omori, Akashi (JP); Kazuho Sakamoto, Souraku-gun (JP); Makoto Mihara, Nara (JP); Haruo Suenaga, Katano (JP); Hideaki Moriya, Yamatokoriyama (JP); Emiko Ishizaki, Nabari (JP); Hisashi Morikawa, Kitakatsuragi-gun (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 10/130,222

(22) PCT Filed: Sep. 26, 2001

(86) PCT No.: PCT/JP01/08392

§ 371 (c)(1),
(2), (4) Date: May 15, 2002

(87) PCT Pub. No.: WO02/28149

PCT Pub. Date: Apr. 4, 2002

(65) Prior Publication Data

US 2002/0171374 A1 Nov. 21, 2002

(30) Foreign Application Priority Data

Sep. 27, 2000 (JP) ................................. P2000-293824
Sep. 27, 2000 (JP) ................................. P2000-293835
Mar. 12, 2001 (JP) ................................. P2000-068955
Mar. 12, 2001 (JP) ................................. P2000-069964

(51) Int. Cl.[7] .............................................. H01J 25/50
(52) U.S. Cl. .................................. 315/39.51; 219/715
(58) Field of Search .............................. 315/39.51, 223, 315/207, 248, 283; 331/86, 87; 363/17, 97, 98; 219/715, 716; H01J 25/50

(56) References Cited

U.S. PATENT DOCUMENTS

| 4,988,922 A | * | 1/1991 | Shoda et al. ................. 315/223 |
| 5,053,682 A | * | 10/1991 | Shoda et al. ................. 315/223 |
| 5,115,168 A | * | 5/1992 | Shoda et al. ................. 315/223 |
| 5,565,781 A | * | 10/1996 | Dauge ........................ 324/403 |
| 5,909,086 A | * | 6/1999 | Kim et al. ............... 315/111.21 |
| 5,977,530 A | * | 11/1999 | Bessho et al. ............... 219/715 |

FOREIGN PATENT DOCUMENTS

| JP | 10/271846 | 10/1998 | .......... H02M/7/538 |
| WO | WO 00/08898 | 2/2000 | ............ H05B/6/66 |
| WO | WO 02/28149 A2 | 4/2002 | .......... H05B/41/00 |

* cited by examiner

Primary Examiner—Don Wong
Assistant Examiner—Trinh Vo Dinh
(74) Attorney, Agent, or Firm—Pearne & Gordon LLP

(57) ABSTRACT

It is provided a magnetron drive power supply wherein a series connection body of first and second semiconductor switch elements that can be brought into reverse conduction and a series connection body of first and second diodes are connected in parallel, first and second capacitors are connected in parallel to the first and second diodes, a series circuit of a commercial power supply and a primary winding of a high-voltage transformer is connected between a connection point of the first and second semiconductor switch elements that can be brought into reverse conduction and a connection point of the first and second diodes, and output of a secondary winding of the high-voltage transformer energizes a magnetron through a high-voltage rectification circuit.

17 Claims, 39 Drawing Sheets

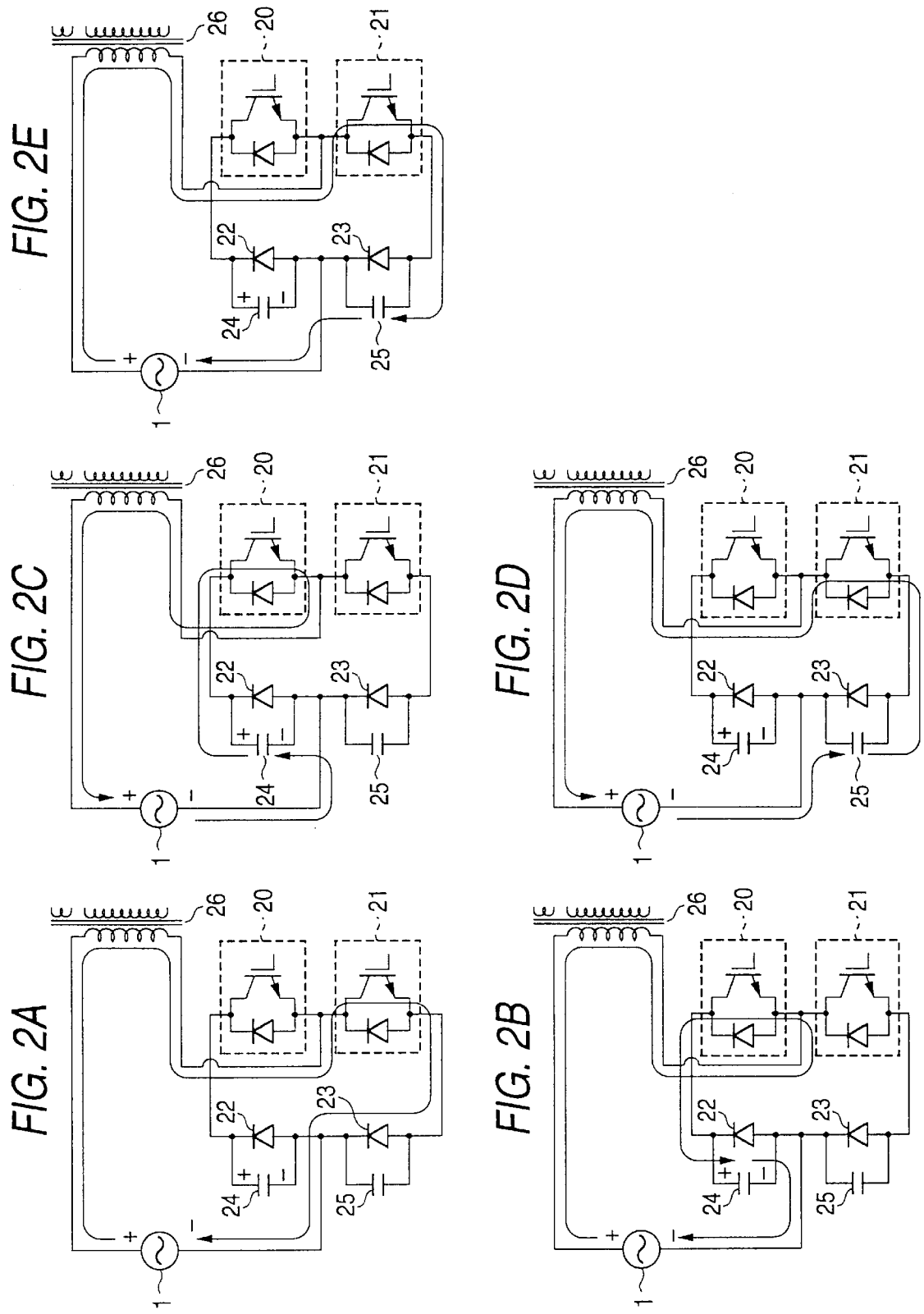

FIG. 14
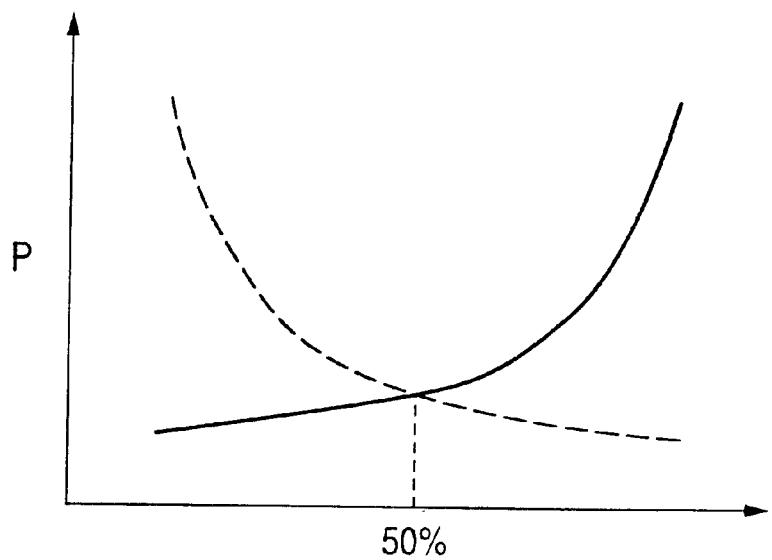
Don21
FIG. 15A
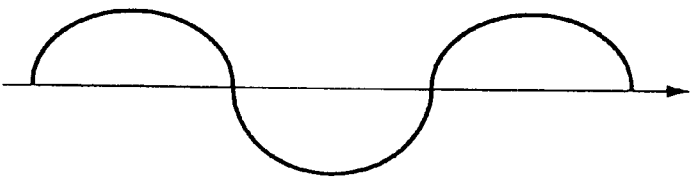
FIG. 15B

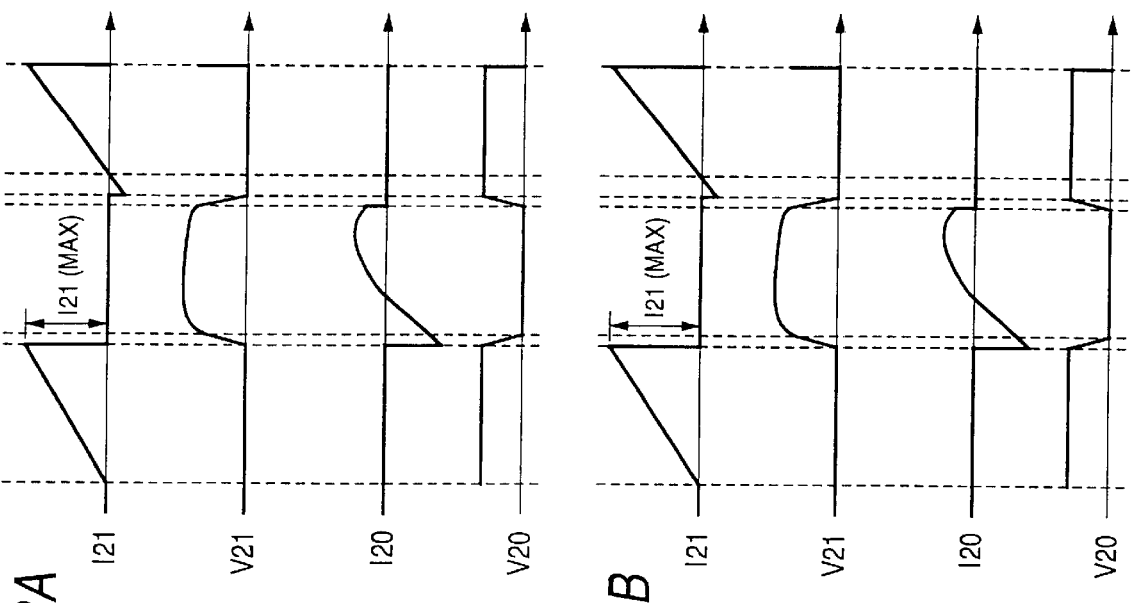
FIG. 28A
FIG. 28B
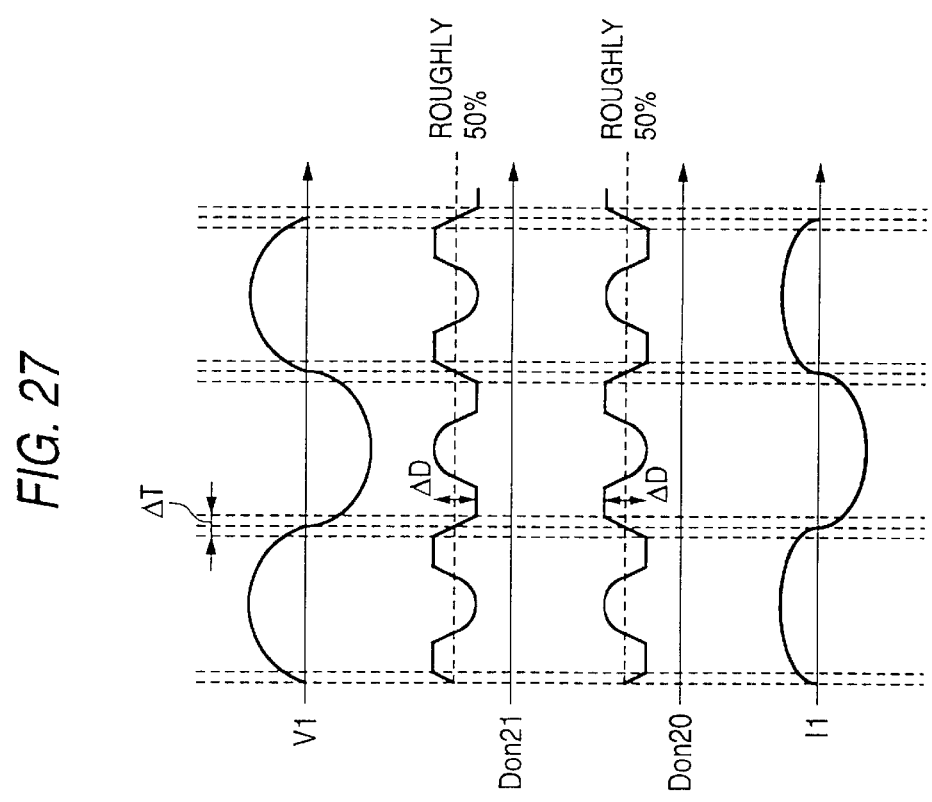
FIG. 27

COMMERCIAL FREQUENCIES

MAGNETRON DRIVE POWER SUPPLY

TECHNICAL FIELD

This invention relates to a magnetron drive power supply with a magnetron of a microwave oven, etc., as a load.

BACKGROUND ART

Magnetron drive power supplies in related arts will be discussed with reference to the accompanying drawings. FIG. 29 is a circuit diagram of a magnetron drive power supply in a related art. The magnetron drive power supply in the related art once converts a commercial power supply 1 of AC into DC voltage through a diode bridge 2, an inverter circuit 5 generates a high-frequency voltage in a primary winding of a high-voltage transformer 6 by turning on and off semiconductor switch elements 3 and 4, and the high-voltage transformer 6 excites a high-frequency high voltage in a secondary winding. This high-frequency high voltage is rectified to DC high voltage by a high-voltage rectification circuit 7 and the DC high voltage is applied to a magnetron 8. The magnetron 8 is driven at the DC high voltage and generates a radio wave of 2.45 GHz.

FIG. 30 is a drawing to show the operation waveform of the magnetron drive power supply in the related art. AC voltage V1 of the commercial power supply 1 is rectified to a DC voltage through the diode bridge 2. An inductor 9 and a capacitor 10 make up a smoothing circuit; the capacitor 10 has a capacity to such an extent that it can hold DC voltage with respect to the inverter circuit 5 operating in the range of 20 kHz to 50 kHz to miniaturize the inverter circuit 5, and does not have a capability of smoothing for the frequency of the commercial power supply 1 (50 Hz or 60 Hz). Thus, voltage V10 of the capacitor 10 shows a waveform provided by simply full-wave rectifying the commercial power supply 1 and shows a pulsation waveform fluctuating from almost 0 voltage to the maximum voltage of the commercial power supply 1. Since the inverter circuit 5 operates based on the pulsating voltage V10 of the capacitor 10, the envelope waveform of the high-frequency voltage generated in the primary winding of the high-voltage transformer 6 becomes a waveform as shown in V6 (Lp) and in the time period over which the voltage V10 of the capacitor 10 is low, likewise only a low voltage can be generated.

On the other hand, the operation characteristic of the magnetron 8 shows a nonlinear voltage current characteristic such that an anode current does not flow if a predetermined voltage or more is not applied between an anode and a cathode, as shown in FIG. 31. Therefore, in the time period over which the voltage generated in the primary winding of the high-voltage transformer 6 is low, the voltage excited in the secondary winding also becomes low at the same time and thus in the waveform of a voltage V8 applied to the magnetron 8, a time period over which the voltage does not reach VAK (TH) occurs, as shown in the figure. In the time period, the magnetron 8 stops oscillation and thus power is not consumed in the magnetron 8 of the load and thus a current I1 of the commercial power supply 1 does not flow. Consequently, the waveform of the current I1 of the commercial power supply 1 becomes a waveform having much distortion having time periods over which the current becomes 0, as shown in FIG. 30, causing the power factor of the magnetron drive power supply to be lowered and a harmonic current to be generated in input current.

To solve such a problem, a circuit configuration shown in FIG. 32 is proposed wherein an active filter circuit 13 is placed preceding an inverter circuit 5 for improving the power factor of the input current and suppressing the harmonic. The active filter circuit 13 forms a so-called step-up chopper circuit and can control step-up voltage based on the on time ratio of a semiconductor switch element 17.

The operation will be discussed with reference to FIG. 33. The voltage of a commercial power supply 1 shows an AC voltage waveform as shown in V1. The active filter circuit 13 controls voltage provided by full-wave rectifying the AC voltage V1 through a diode bridge 2 by turning on/off the semiconductor switch element 17, thereby generating step-up voltage in a capacitor 15. The step-up voltage V15 changes in ripple factor depending on the capacity of the capacitor 15, but can be prevented from lowering completely to 0 like V10 in the configuration in FIG. 29. Thus, voltage V6 (Lp) generated in the primary winding of a high-voltage transformer 6 can be generated a predetermined value or more if the voltage of the commercial power supply 1 is in the proximity of 0. Consequently, it is made possible to always hold the voltage applied to the magnetron 8 at oscillation-possible voltage or more. Consequently, an input current I1 can be made a waveform roughly like a sine wave having no time periods over which the current becomes 0, as shown in the figure, and it is made possible to improve the power factor of the input and suppress a harmonic current.

However, in such a configuration, the active filter circuit 13 is added to the inverter circuit 5 and the power conversion process becomes rectification to boosting to harmonic generation (inverter circuit) to high-voltage rectification. Thus, the power conversion process grows and degradation of the conversion efficiency and upsizing of the circuitry introduce a problem.

Then, JP-A-10-271846 discloses a configuration intended for sharing components and circuit functions. FIG. 34 is a circuit diagram to show the circuit configuration in JP-A-10-271846. According to the circuit configuration, the boosting function operation and the inverter function operation are performed at a time for improving the power factor of input and simplifying the circuit configuration. FIGS. 35 and 36 are drawings to describe the circuit operation. FIGS. 35(a) to (d) are drawings to describe energization paths as semiconductor switch elements Q1 and Q2 are turned on and off, and FIG. 36 is an operation waveform chart corresponding thereto. The circuit operation will be discussed with reference to FIGS. 35 and 36. For convenience of the description that follows, the voltage polarity of a commercial power supply 1 is in the direction shown in the figure and the semiconductor switch element Q2 is on in the beginning. When the semiconductor switch element Q2 is on, a current flows over a path of a capacitor C2 to the commercial power supply 1 to an inductive load circuit 19 to the semiconductor switch element Q2 as shown in FIG. 35 (a), and a current IQ2 of the semiconductor switch element Q2 increases monotonously as shown in FIG. 36(a). If the semiconductor switch element Q2 is turned off in a predetermined time, the current path makes a transition to the state in FIG. 35(b) and a capacitor C1 is charged as a current flows over a path of a diode D2 to the commercial power supply 1 to the inductive load circuit 19 to a diode D3 to the capacitor C1. When all energy stored in the inductive load circuit 19 is emitted, a current flow over a path of the capacitor C1 to the semiconductor switch element Q1 to the inductive load circuit 19 to the commercial power supply 1 to the capacitor C2 in FIG. 35(c) with the capacitor C1 as a power supply. If the semiconductor switch element Q1 is turned off in a predetermined time, the inductive load circuit 19 attempts to allow a current to flow in the same direction and thus a current flow over a path shown in FIG. 35(d) (commercial power supply 1 to capacitor C2 to diode D4 to inductive load circuit 19) and the capacitor C1 is charged by energy stored in the inductive load circuit 19. When all energy stored in the inductive load circuit 19 is emitted, again a current flows over the path in FIG. 35(a) and the circuit operation is continued. Although not disclosed in JP-A-10-271846, the capacity relationship as shown in Expression 1 is required between the capacitors C1 and C2 to realize the operation:

$$C1 \gg C2 \qquad \text{(Expression 1)}$$

To satisfy the relation, a capacitor capable of covering a large capacity such as an electrolytic capacitor needs to be used as the capacitor C1

Such operation is performed, whereby the current from the commercial power supply 1 can be allowed to flow over roughly all regions of the power supply period for improving the power factor of input current, suppressing harmonics, and simplifying the circuitry.

Inductor 9 and capacitor 10 make up a smoothing circuit; the capacitor 10 has a capacity to such an extent that it can hold DC voltage with respect to the operation frequencies (20 kHz to 50 kHz) under the present circumstances where miniaturization of the inverter circuit 5 is advanced, and does not have a capability of smoothing for the frequency of the commercial power supply 1. Thus, as shown in FIG. 30, the voltage V10 of the capacitor 10 shows a waveform provided by simply full-wave rectifying the commercial power supply 1 and shows a pulsation waveform fluctuating from almost 0 voltage to the maximum voltage of the commercial power supply 1. Since the inverter circuit 5 operates based on the pulsating voltage V10 of the capacitor 10, the envelope waveform of the high-frequency voltage generated in the primary winding of the high-voltage transformer 6 becomes a waveform as shown in V6 (Lp) and in the time period over which the voltage V10 of the capacitor 10 is low, likewise only a low voltage can be generated. That is, a time period occurs over which the voltage does not reach threshold value VAK (TH) oscillating in the magnetron 8 having a nonlinear characteristic. In the time period, the magnetron 8 stops oscillation and thus power is not consumed in the magnetron 8 of the load and thus the current I1 of the commercial power supply 1 does not flow and becomes a waveform having much distortion having time periods over which the current becomes 0, resulting in lowering of the power factor and generating of a harmonic current in the input current.

Thus, a large number of methods are proposed wherein a step-up chopper circuit is used as a circuit configuration to complement voltage in the vicinity of the valley of a pulsation waveform from commercial power supply, components and circuit configuration are shared from the viewpoint of reducing the number of parts and miniaturizing, and the boosting function operation and the inverter function operation are performed as a time; JP-A-10-271846 discloses a representative one. FIG. 34 is a circuit diagram to show the circuit configuration in JP-A-10-271846. However, a load circuit 19 in JP-A-10-271846 is a component consuming small power like an electric discharge lamp and in a power supply unit for handling large power as in a microwave oven, a drive signal for turning on/off semiconductor switch elements Q1 and Q2 for governing the boosting operation and the inverter operation does not require a time period for charging and discharging a capacitor for boosting, so-called dead time. Further, adjustment of heating power (power consumption) such as strong, medium, weak in heating setting as in a microwave oven is not required and thus particular attention need not be given to control of the drive signal of the semiconductor switch element Q1, Q2 in the 0 voltage part and the maximum voltage part of the commercial power supply 1 or the instant at which the polarity of the commercial power supply 1 changes.

However, the above-described configuration in the related art involves the following problems and cannot sufficient provide high circuit efficiency:

In the operation waveform chart of FIG. 36, the current flowing through the diode D2 is a current shown in ID2. The voltage applied to the diode D2 changes as VD2. The current of the diode D2 becomes ideally 0 at the timing at which a transition is made from the time period in FIG. 36(b) to that in (c), but an actual diode produces a recovery current at the turn off time. When the recovery current occurs, a switching loss is produced in the diode as the product with the applied voltage. Therefore, a characteristic of high switching speed Trr is required for the diode D1, D2. However, the forward on voltage VF, another diode characteristic, of a diode having the characteristic of high switching speed Trr tends to become high, in which case the on loss at the energization time becomes large. Consequently, the loss of the diode D1, D2 becomes large and the total efficiency of the circuit cannot be made sufficiently high.

However, the configuration shown in the related art example disclosed in JP-A-10-271846 is intended for a lighting unit and the conversion power of the lighting unit is about 100W to 200W at the maximum. Therefore, as the current flowing through the circuit, only a minute current of about several A flows and thus if the diode is designed so that the forward on voltage VF becomes high as design of attaching importance to the switching speed, it is possible to design without much increasing the loss of the diode.

On the other hand, the magnetron drive power supply used with a microwave oven, etc., handles large power of about 1000 W to 1500 W as conversion power and thus a large current of 40 A to 50 A flows at the maximum as the current flowing through circuitry. Thus, if a diode is designed with importance attached to the switching speed, the forward on voltage VF becomes high and thus the loss when the diode conducts (conduction loss) becomes large, reducing the effect of decreasing the loss by increasing the switching speed. Since the cooling capability of a home microwave oven is limited naturally because of the factors of the size and costs of the microwave oven, it becomes necessary to upsize the diode or use a large-sized radiation fan to radiate heat under a limited cooling condition in order to increase the switching speed and suppress a rise in the forward on voltage VF. Thus, in the magnetron drive power supply, raising the conversion efficiency and a decrease in the loss occurring in each part of circuitry become indispensable conditions. Therefore, applying the configuration shown in the related art example to the magnetron drive power supply involves extreme difficulty from the viewpoint of decreasing the loss. Thus, to apply the configuration to the magnetron drive power supply, it becomes necessary to configure such circuitry of suppressing an increase in the switching loss of the diode and that in the on loss. Because of the magnitude of the conversion power, if an electrolytic capacitor is used with the magnetron drive power supply, an electrolytic capacitor of a high capacity and high dielectric strength is required to suppress the pulsation current of the electrolytic capacitor. This results in upsizing the power supply itself, thus inducing upsizing the microwave oven installing the magnetron drive power supply, and the effect of reducing the size and weight of the magnetron drive power supply by the high-frequency switching operation is impaired.

DISCLOSURE OF INVENTION

It is therefore a first object of the invention to provide a magnetron drive power supply to make it possible to suppress the distortion of input current, suppress occurrence of harmonics, raise the power factor of input, simplify circuitry, and improving the circuit efficiency if large power of 1 kW or more is converted.

The configuration as described above involves the following problems: In control of a machine actually handling large power, such as a microwave oven, if a circuit configuration is used in which the on/off timing of a semiconductor switch element needs to be switched according to the polarity of power supply voltage, it becomes extremely important to control a drive signal at the polarity change point where the polarity changes, because if charging and discharging of a charge-up capacitor are not well switched based on the duty ratio or the switch timing when one semiconductor switch element for governing a step-up charge-up function and an inverter function and another semiconductor switch element for governing only the inverter function are switched at the polarity change point, needle-like distortion occurs in the vicinity of the polarity change point in input current. Formerly, in such a circuit configuration, a load circuit, such as an electric discharge lamp, consumes small power and has a minute current value and the capacity of the charge-up capacitor is also small and thus input current distortion was scarcely observed. However, with a load circuit consuming large power, such as a microwave oven, it is feared that the input current waveform will become largely distorted, that the power factor will be lowered, and that the harmonic component will grow.

Further, the magnetron drive power supply making it possible to suppress the distortion of input current, suppress occurrence of harmonics, and raise the power factor of input requires two flywheel diode containing semiconductor switches and two rectification diodes. If housing the rectification diodes in one package is adopted as an inexpensive configuration, generally the element of such a configuration is less frequently used and thus cost reduction is not expected. Then, it is possible to use a method of applying a general-purpose rectification bridge diode as shown in FIG. 53; although the method can be made more inexpensive than the above-mentioned method, the number of elements is increased and the method is not considered to be the best.

It is therefore a second object of the invention to provide an inexpensive magnetron drive power supply which has a simple configuration and is excellent in cooling capability.

To solve the above-described problems, according to the invention, there is provided a magnetron drive power supply wherein a series connection body of first and second semiconductor switch elements that can be brought into reverse conduction and a series connection body of first and second diodes are connected in parallel, first and second capacitors are connected in parallel to the first and second diodes, a series circuit of a commercial power supply and a high-voltage transformer is connected between the connection point of the first and second diodes and the connection point of the first and second semiconductor switch elements that can be brought into reverse conduction, and high-voltage output of the high-voltage transformer supplies power to a magnetron through a high-voltage rectification circuit.

Thus, the first and second semiconductor switch elements are turned on and off complementarily, whereby if the commercial power supply has a positive voltage polarity, the voltage provided by boosting the voltage of the commercial power supply is applied to the second capacitor and if the commercial power supply has an opposite voltage polarity, the voltage provided by boosting the voltage of the commercial power supply is applied to the first capacitor. Since the voltage applied to the primary winding of the high-voltage transformer depends on the boosted voltage, the voltage required for the magnetron to oscillate can always be applied to the primary winding of the high-voltage transformer even in a time period over which the voltage of the commercial power supply is low, and input current can be allowed to flow over almost all regions of the commercial power supply, so that input current with small distortion can be provided. Since the first and second semiconductor switch elements can perform the inverter operation of allowing a high-frequency current to flow into the primary winding of the high-voltage transformer and the operation of applying the boosted voltage to the first and second capacitors at a time, the inverter can be made up of a minimum number of components and the inverter circuit can be miniaturized. In the circuit operation, the first and second diodes are turned off by the semiconductor switch elements and the circuit mode is switched and thus the diodes can be designed with importance attached to the forward on voltage without receiving any restriction on the switching speed, the losses of the diodes can be extremely lessened, and the inverter circuit can be made highly efficient.

In the described configuration, in the invention, each of on-off duty ratios of the first and second semiconductor switch elements is set to 50% in the vicinity of the polarity change point where the polarity changes, and one semiconductor switch element for governing the step-up charging-up function and the inverter function and the other semiconductor switch element for governing only the inverter function are switched in the vicinity of the polarity change point. According to such means, in the vicinity of the polarity change point where the polarity changes, the one semiconductor switch element for governing the step-up charging-up function and the inverter function can be switched upon completion of charging and discharging of charge-up capacitor, so that input current whose harmonic component is cut can be provided at a stable high power factor.

Further, to solve the above-described problems, according to the invention, there is provided a magnetron drive power supply comprising a series connection body of first and second semiconductor switches, first and second fly-wheel diodes in inverse parallel to the first and second semiconductor switches, a series connection body of first and second rectification diodes connected in parallel to the first and second semiconductor switches, first and second capacitors connected in parallel to the first and second rectification diodes, a commercial power supply and the primary winding of a high-voltage transformer connected in series to each other, connected between the connection point of the first and second semiconductor switches and the connection point of the first and second rectification diodes, and a high-voltage rectification circuit and a magnetron connected to output of the secondary winding of the high-voltage transformer, characterized in that the first and second flywheel diodes and the first and second rectification diodes are housed in one package.

Thus, the diodes can be used with no waste and moreover the need for containing a diode in the semiconductor switch is eliminated, so that an inexpensive magnetron drive power supply can be provided.

BRIEF DESCRIPTION OF DRAWINGS

FIG. 1 is a circuit diagram of a magnetron drive power supply in a first embodiment of the invention;

[FIG. 2]

FIGS. 2(a) to 2(e) are current path diagrams in operation modes of the magnetron drive power supply in the first embodiment of the invention;

FIG. 3 is an operation waveform chart of an inverter circuit in the first embodiment of the invention;

FIG. 4 is an operation waveform chart of the magnetron drive power supply in the first embodiment of the invention;

FIG. 5 is a circuit diagram to show the configuration of a magnetron drive power supply in a modified embodiment of the first embodiment of the invention;

FIG. 6 is a circuit diagram of a magnetron drive power supply in a second embodiment of the invention;

FIG. 7 is an operation waveform chart of an inverter circuit in the second embodiment of the invention;

[FIG. 8]

FIG. 9 is a circuit diagram of connecting a capacitor in parallel to a semiconductor switch element in the second embodiment of the invention;

FIG. 10 is a circuit diagram of connecting capacitors to semiconductor switch elements in the second embodiment of the invention;

FIG. 11 is a circuit diagram of connecting a capacitor in parallel to a high-voltage transformer in the second embodiment of the invention;

FIG. 12 is a circuit diagram of a magnetron drive power supply in a third embodiment of the invention;

[FIG. 13]

[FIG. 14]

FIG. 14 is a characteristic drawing of on signal width Don21 of the semiconductor switch element and conversion power P in the third embodiment of the invention;

[FIG. 15]

FIGS. 15(a) and 15(b) are current waveform charts of a commercial power supply in the third embodiment of the invention;

FIG. 16 is a circuit diagram of a magnetron drive power supply in a fourth embodiment of the invention;

FIGS. 17(a) and 17(b) are output waveform charts of power supply polarity determination means in the fourth embodiment of the invention;

[FIG. 18]

FIG. 19 is a circuit diagram to show another configuration example of the power supply polarity determination means in the fourth embodiment of the invention;

FIG. 20 is an output waveform chart of the power supply polarity determination means in the fourth embodiment of the invention;

FIG. 21 is a circuit diagram of a magnetron drive power supply in a fifth embodiment of the invention;

FIG. 22 is a waveform chart of voltage of commercial power supply and on time ratios of semiconductor switch elements when the on time ratios of the semiconductor switch elements are replaced instantaneously in the fifth embodiment of the invention;

FIG. 23 is a drive signal waveform chart of the semiconductor switch elements when the voltage polarity of the commercial power supply changes in the fifth embodiment of the invention;

[FIG. 24]

FIG. 25 is a waveform chart of voltage of the commercial power supply and the on time ratios of the semiconductor switch elements in the fifth embodiment of the invention;

FIG. 26 is a circuit diagram of a magnetron drive power supply in a sixth embodiment of the invention;

[FIG. 27]

FIG. 27 is a waveform chart of voltage of a commercial power supply and on time ratios of semiconductor switch elements in the sixth embodiment of the invention;

[FIG. 28]

FIGS. 28(a) and 28(b) are operation waveform charts of the semiconductor switch elements in the sixth embodiment of the invention; FIG. 28(a) is an operation waveform chart at the maximum voltage time when the on time ratios are changed in response to the voltage of the commercial power supply as in the embodiment and FIG. 28(b) is an operation waveform chart at the maximum voltage time when the on time ratios are not changed in response to the voltage of the commercial power supply;

FIG. 29 is a circuit diagram to show a magnetron drive power supply in a related art;

FIG. 30 is an operation waveform chart of the magnetron drive power supply in the related art in FIG. 29;

FIG. 31 is a drawing to show the operation characteristic of a magnetron;

FIG. 32 is a circuit diagram to show a magnetron drive power supply in a related art to which an active filter circuit is added;

FIG. 33 is an operation waveform chart of the magnetron drive power supply in FIG. 32;

FIG. 34 is a circuit diagram of a power supply unit disclosed in JP-A-10-271846;

[FIG. 35]

FIG. 36 is an operation waveform chart of the power supply unit in FIG. 34;

FIG. 37 is a chart to show the relationship between commercial power supply and semiconductor switch element on time ratio in a magnetron drive power supply in a seventh embodiment of the invention;

FIG. 38 is a drive signal waveform chart of the semiconductor switch element in the vicinity of a polarity change point in the magnetron drive power supply in a seventh embodiment of the invention;

FIG. 40 is an output waveform chart of power supply polarity determination means in the magnetron drive power supply in the eighth embodiment of the invention;

FIG. 41 is a drive signal waveform chart of a semiconductor switch element in the vicinity of a polarity change point in the magnetron drive power supply in the eighth embodiment of the invention;

FIG. 42 is a circuit diagram of a magnetron drive power supply in a ninth embodiment of the invention;

FIG. 43 is a diagram to show connection of semiconductors of the magnetron drive power supply in the ninth embodiment of the invention;

FIG. 44 is a circuit diagram of a magnetron drive power supply in a tenth embodiment of the invention;

FIG. 45 is a diagram to show connection of semiconductors of the magnetron drive power supply in the tenth embodiment of the invention;

FIG. 46 is a current and voltage waveform chart to use a high-speed product as a fly-wheel diode in a magnetron drive power supply in an eleventh embodiment of the invention;

FIG. 47 is a current and voltage waveform chart to use a low-speed product as a fly-wheel diode in the magnetron drive power supply in the eleventh embodiment of the invention;

FIG. 48 is a current and voltage waveform chart to use a rectification diode in the magnetron drive power supply in the eleventh embodiment of the invention;

FIG. 49 is a current and voltage waveform chart of the rectification diode when viewed with respect to commercial frequencies in the magnetron drive power supply in the eleventh embodiment of the invention;

FIG. 50 is a characteristic chart of diodes of the magnetron drive power supply in the eleventh embodiment of the invention;

FIG. 51 is a diagram to show connection of semiconductors of a magnetron drive power supply in a twelfth embodiment of the invention;

FIG. 52 is a diagram to show connection of semiconductors of a magnetron drive power supply in a thirteenth embodiment of the invention; and

FIG. 53 is a circuit configuration diagram of a magnetron drive power supply in another related art.

BEST MODE FOR CARRYING OUT THE INVENTION

Figure 1:
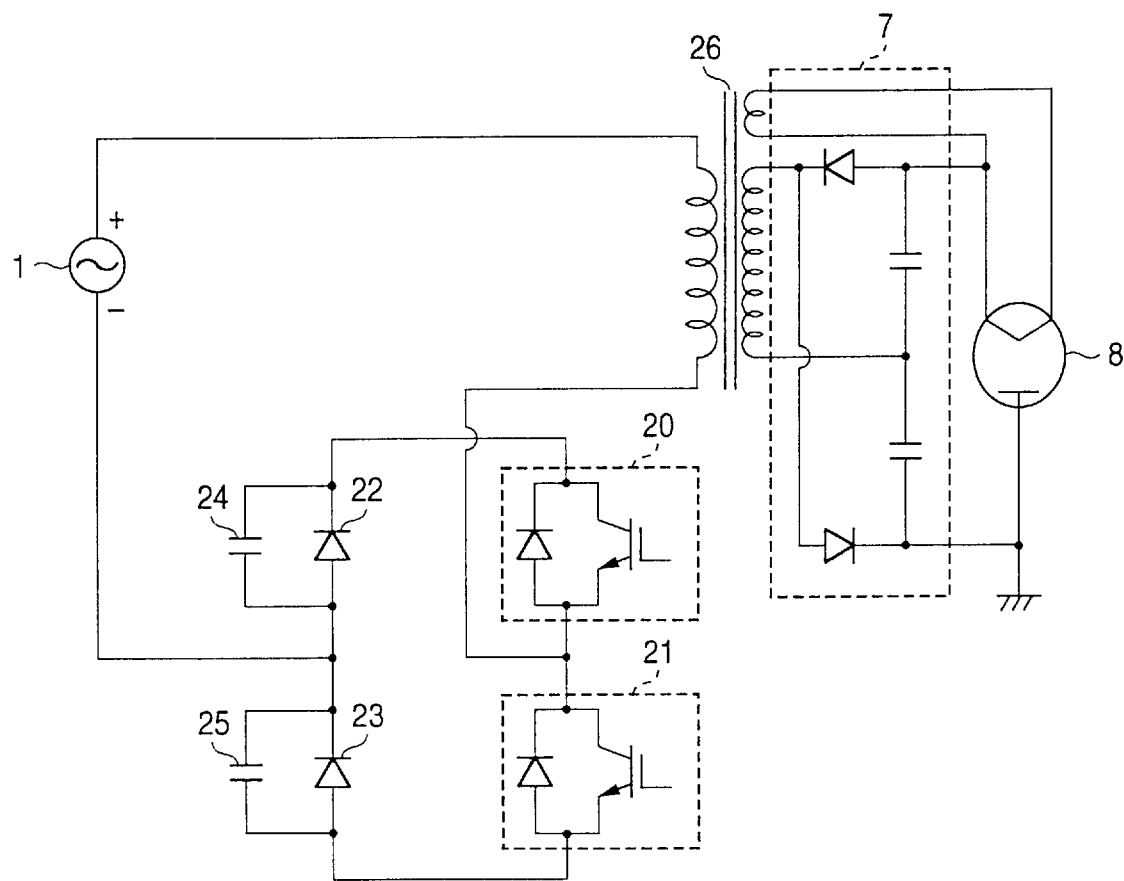
[FIG. 1]

In the invention as claimed in claims 1 to 3, in a magnetron drive power supply, a series connection body of first and second semiconductor switch elements that can be brought into reverse conduction and a series connection body of first and second diodes are connected in parallel, first and second capacitors are connected in parallel to the first and second diodes, a series circuit of a commercial power supply and the primary winding of a high-voltage transformer is connected between the connection point of the first and second semiconductor switch elements that can be brought into reverse conduction and the connection point of the first and second diodes, and output of the secondary winding of the high-voltage transformer energizes a magnetron through a high-voltage rectification circuit, so that the voltage enabling the magnetron to oscillate can be applied to the primary winding of the high-voltage transformer even in a time period over which the voltage of the commercial power supply is low, and input current can always be allowed to flow and thus input current with small distortion can be provided, making it possible to improve the power factor of the magnetron drive power supply. The two semiconductor switch elements are turned on and off complementarily, whereby the inverter operation of allowing a high-frequency current to flow into the primary winding of the high-voltage transformer and the operation of generating the boosted voltage in the first and second capacitors can be performed at a time, so that the number of circuit components can be minimized and the number of power conversion steps can be lessened and thus the power conversion efficiency can be improved. Since the first and second diodes are turned off by the semiconductor switch elements, it is made possible to design the diode characteristics with importance attached to the forward on voltage and the circuit efficiency of the inverter circuit can be improved.

In the invention as claimed in claim 4, particularly, in the magnetron drive power supply as claimed in claim 1 or 2, a third capacitor is connected in parallel to at least one point of the first and second semiconductor switch elements and the primary winding of the high-voltage transformer. Thus, when each of the first and second semiconductor switch elements is turned off, the voltage applied to the semiconductor switch element gently rises or falls with a predetermined gradient, so that the switching losses of the semiconductor switch elements can be reduced and the power conversion efficiency of the inverter circuit can be improved.

In the invention as claimed in claim 5, in a magnetron drive power supply wherein a series connection body of first and second semiconductor switch elements that can be brought into reverse conduction and a series connection body of first and second diodes are connected in parallel, first and second capacitors are connected in parallel to the first and second diodes, a series circuit of a commercial power supply and the primary winding of a high-voltage transformer is connected between the connection point of the first and second semiconductor switch elements that can be brought into reverse conduction and the connection point of the first and second diodes, output of the secondary winding of the high-voltage transformer energizes a magnetron through a high-voltage rectification circuit, and a drive circuit for driving the first and second semiconductor switch elements is provided and drives the first and second semiconductor switch elements complementarily and replaces drive signals depending on whether the commercial power supply is of positive or negative polarity, so that the voltage enabling the magnetron to oscillate can be applied to the primary winding of the high-voltage transformer even in a time period over which the voltage of the commercial power supply is low, and input current can always be allowed to flow and thus input current with small distortion can be provided, making it possible to improve the power factor of the magnetron drive power supply. The two semiconductor switch elements are turned on and off complementarily, whereby the inverter operation of allowing a high-frequency current to flow into the primary winding of the high-voltage transformer and the operation of generating the boosted voltage in the first and second capacitors can be performed at a time, so that the number of circuit components can be minimized and the number of power conversion steps can be lessened and thus the power conversion efficiency can be improved. Since the first and second diodes are turned off by the semiconductor switch elements, it is made possible to design the diode characteristics with importance attached to the forward on voltage and the circuit efficiency of the inverter circuit can be improved. Although the relationship between the on signal width of the semiconductor switch element and the conversion power of the inverter circuit shows a different characteristic depending on the voltage polarity of the commercial power supply, input current symmetrical with respect to the polarity can always be provided. If the on time ratio of the semiconductor switch element is controlled for increasing or decreasing the conversion power of the inverter circuit, input power roughly like a sine wave can always be maintained.

In the invention as claimed in claims 6 to 8, the magnetron drive power supply as claimed in claim 5 comprises power supply polarity determination means for determining the polarity of the commercial power supply, wherein the drive circuit replaces the drive signals of the first and second semiconductor switch elements based on determination information of the power supply polarity determination means. Thus, the power supply polarity determination means determines the voltage polarity of the commercial power supply, and the signals of the semiconductor switch elements are replaced, so that input current equal in positive and negative polarities can be provided, the power factor of the magnetron drive power supply can be improved, and harmonics can be suppressed.

In the invention as claimed in claim 9, in the magnetron drive power supply as claimed in any one of claims 5 to 8, the drive signal is changed at a predetermined change rate in the proximity of the zero-crosspoint of the commercial power supply, whereby the change amount of the on time of the semiconductor switch element in the proximity of the zero-cross point of the commercial power supply lessens. Thus, if the operation is performed in a state in which the on time ratio of the semiconductor switch element shifts from roughly 50%, occurrence of needle-like current can be suppressed in the input current and a magnetron drive power supply with a high power factor can be provided.

In the invention as claimed in claim 10, in the magnetron drive power supply as claimed in any one of claims 5 to 9, the conduction time of the second semiconductor switch element is changed so as to shorten in response to the voltage of the commercial power supply in the time period over which the voltage of the commercial power supply is high in a positive direction and in contrast, the conduction time of the first semiconductor switch element is changed so as to shorten in response to the voltage of the commercial power supply in the time period over which the voltage of the commercial power supply is high in a negative direction, whereby the maximum value of the current flowing through the semiconductor switch element and the inverter circuit when the positive and negative voltages of the commercial power supply are the maximum can be suppressed, so that the effective values of the current of the semiconductor switch element and the current of the high-voltage transformer can be suppressed and the occurrence loss of the inverter circuit can be decreased.

In the invention as claimed in claim 11, in a high-frequency heating power supply unit, a series connection body of first and second semiconductor switch elements that can be brought into reverse conduction and a series connection body of first and second diodes are connected in parallel, first and second capacitors are connected in parallel to the first and second diodes, a series circuit of a commercial power supply and the primary winding of a high-voltage transformer is connected between the connection point of the first and second semiconductor switch elements that can be brought into reverse conduction and the connection point of the first and second diodes, output of the secondary winding of the high-voltage transformer drives a magnetron through a high-voltage rectification circuit, and each of on-off duty ratios of the first and second semiconductor switch elements that can be brought into reverse conduction is set to 50% in the vicinity of the polarity change point where the polarity of the commercial power supply changes.

In the invention as claimed in claim 12, in a high-frequency heating power supply unit, a series connection body of first and second semiconductor switch elements that can be brought into reverse conduction and a series connection body of first and second diodes are connected in parallel, first and second capacitors are connected in parallel to the first and second diodes, a series circuit of a commercial power supply and the primary winding of a high-voltage transformer is connected between the connection point of the first and second semiconductor switch elements that can be brought into reverse conduction and the connection point of the first and second diodes, output of the secondary winding of the high-voltage transformer drives a magnetron through a high-voltage rectification circuit, and while polarity determination means is provided in control of the vicinity of the polarity change point of the commercial power supply, the polarity change point is detected, whereby the roles of the first and second semiconductor switch elements that can be brought into reverse conduction for playing a role of both a step-up charging-up function and an inverter function and a role of only the inverter function complementarily at the same time are replaced.

According to the configurations as claimed in claims 11 and 12, it is made possible to suppress input current waveform distortion shaped like a needle at the polarity change point where the polarity of the commercial power supply changes even in a load circuit consuming large power, such as a microwave oven, and also suppress lowering of the power factor and enlarging of the harmonic component.

In the invention as claimed in claim 13, a magnetron drive power supply comprises a series connection body of first and second semiconductor switches, first and second fly-wheel diodes in inverse parallel to the first and second semiconductor switches, a series connection body of first and second rectification diodes connected in parallel to the first and second semiconductor switches, first and second capacitors connected in parallel to the first and second rectification diodes, a commercial power supply and the primary winding of a high-voltage transformer connected in series to each other, connected between the connection point of the first and second semiconductor switches and the connection point of the first and second rectification diodes, and a high-voltage rectification circuit and a magnetron connected to output of the secondary winding of the high-voltage transformer, characterized in that the first and second fly-wheel diodes and the first and second rectification diodes are housed in one package.

Thus, the diodes can be used with no waste and moreover the need for containing a diode in the semiconductor switch is eliminated, so that an inexpensive magnetron drive power supply can be provided.

In the invention as claimed in claim 14, particularly, in the magnetron drive power supply as claimed in claim 13, the first and second semiconductor switches are housed in one package.

Accordingly, the number of parts can be more reduced and a magnetron drive power supply miniaturized as a simple configuration can be provided.

In the invention as claimed in claim 15, particularly, in the magnetron drive power supply as claimed in claim 13 or 14, diodes with a low on voltage are used as the first and second rectification diodes and high-speed diodes are used as the first and second fly-wheel diodes.

Accordingly, it is made possible to minimize the loss of each diode and downsize a radiation fan, and an inexpensive magnetron drive power supply excellent in cooling capability can be provided.

In the invention as claimed in claim 16, particularly, in the magnetron drive power supply as claimed in any one of claims 13 to 15, the first and second semiconductor switches, the first and second fly-wheel diodes, and the first and second rectification diodes are housed in one package.

Accordingly, all semiconductor elements of the primary circuit of the inverter are housed in one package and a more miniaturized magnetron drive power supply can be provided.

In the invention as claimed in claim 17, particularly, the magnetron drive power supply as claimed in claim 16 contains a drive circuit for driving the first and second semiconductor switches.

Accordingly, a driver is built in the semiconductor module and a more miniaturized magnetron drive power supply can be provided.
(Embodiments)

Referring now to the accompanying drawings, there are shown preferred embodiments of the invention.

(Embodiment 1)

A first embodiment of the invention will be discussed with reference to FIGS. 1 to 3. FIG. 1 is a circuit diagram to show a magnetron drive power supply of a first embodiment of the invention. A series connection body of first and second semiconductor switch elements 20 and 21 and a series connection body of first and second diodes 22 and 23 are connected in parallel, first and second capacitors 24 and 25 are connected in parallel to the first and second diodes 22 and 23, and a series circuit of a commercial power supply 1 and a high-voltage transformer 26 is connected between the connection point of the semiconductor switch elements 20 and 21 and the connection point of the diodes 22 and 23. Secondary winding output of the high-voltage transformer 26 is connected to a high-voltage rectification circuit 7 for applying a DC high voltage to a magnetron 8. The magnetron 8 is energized by the DC high voltage and generates a radio wave of 2.45 GHz. In the embodiment, each of the first and second semiconductor switch elements is described as an IGBT (insulated gate bipolar transistor) conducting forward and a diode connected in inversely parallel with the IGBT, but such an element with a diode formed therein such as MOSFET can also be used, needless to say.

Figure 3:
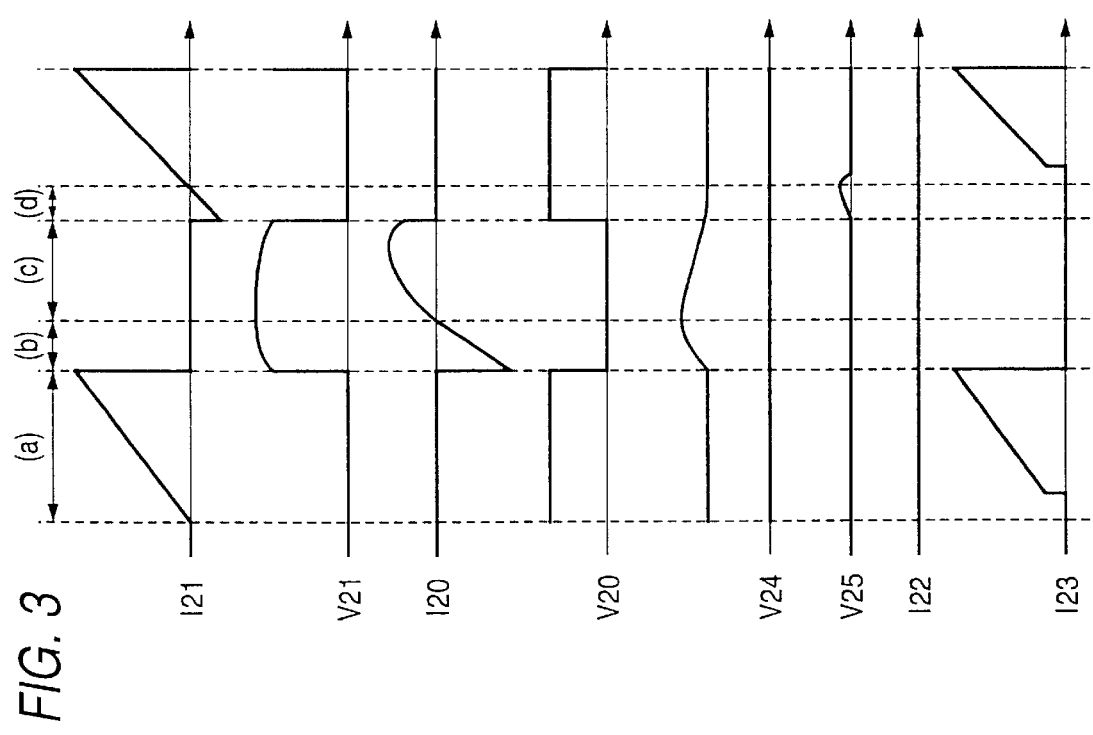
[FIG. 3]

FIGS. 2(*a*) to 2(*e*) are diagrams to show paths over which currents in time periods of an inverter circuit flow, and FIG. 3 is an operation waveform chart corresponding thereto. The description to follow starts at the state in which the semiconductor switch element 21 is on with the polarity of the commercial power supply 1 as shown in the figure. In the state, a current flows over a path of the commercial power supply 1 to primary winding of the high-voltage transformer 26 to the semiconductor switch element 21 to the diode 23, as shown in FIG. 2(*a*), and current shown in 121 in the time period in FIG. 3(*a*) flows into the semiconductor switch element 21 and the primary winding of the high-voltage transformer 26, thereby storing energy in the primary winding of the high-voltage transformer 26. If the semiconductor switch element 21 is turned off in a predetermined time, the primary winding current of the high-voltage transformer 26 attempts to continue flowing in the same direction and thus this time, the capacitor is charged by the energy stored in the primary winding of the high-voltage transformer 26 on a path of the commercial power supply 1 to the primary winding of the high-voltage transformer 26 to parallel diode of the semiconductor switch element 20 to the capacitor 24, as shown in FIG. 2(*b*). This operation is performed, whereby the voltage provided by boosting the voltage of the commercial power supply 1 is stored in the capacitor 24. When all energy stored in the primary winding of the high-voltage transformer 26 is released, a path in FIG. 2(*c*) is formed and this time, the charged energy of the capacitor 24 is taken out on a path of the capacitor 24 to the semiconductor switch element 20 to the primary winding current of the high-voltage transformer 26 to the commercial power supply 1. If the semiconductor switch element 20 is turned off in a predetermined time, the primary winding of the high-voltage transformer 26 attempts to continue allowing the current to flow in the same direction and thus the current flows over a path of the primary winding of the high-voltage transformer 26 to the commercial power supply 1 to the capacitor 25 to parallel diode of the semiconductor switch element 21, as shown in FIG. 2(*d*). If the commercial power supply 1 has an opposite voltage polarity to that shown in the figure, the semiconductor switch elements 20 and 21, the diodes 22 and 23, and the capacitors 24 and 25 are only replaced in operation and similar operation is performed.

Figure 4:
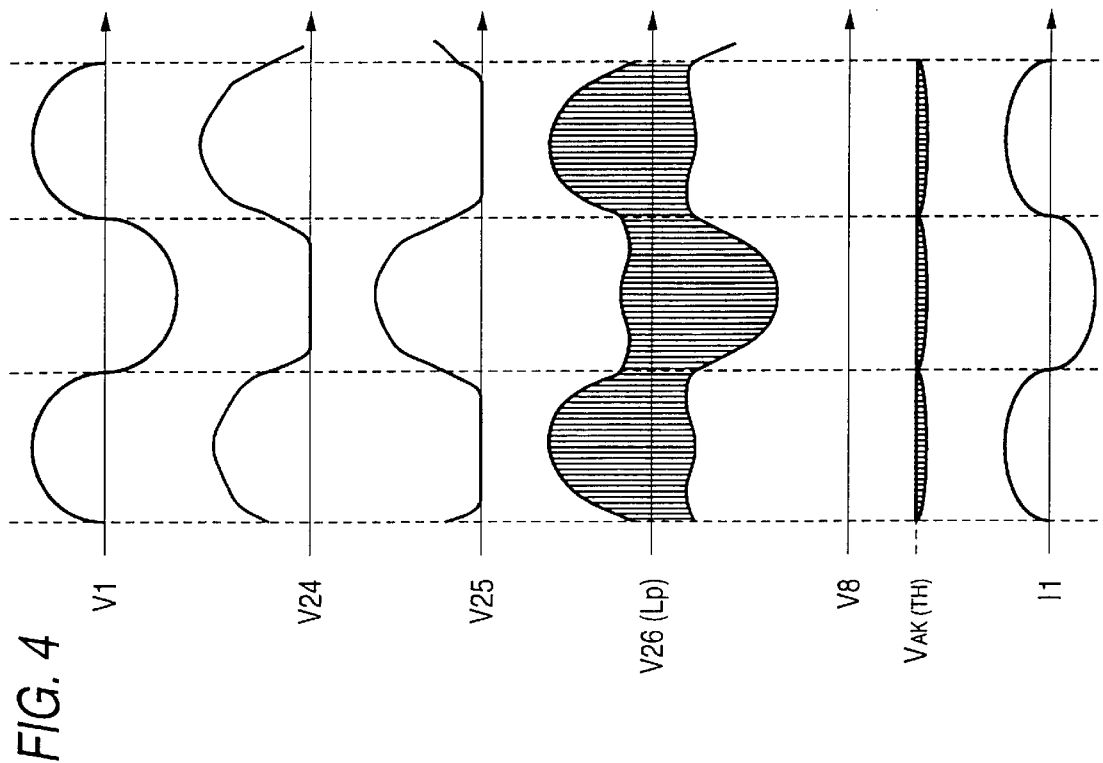
[FIG. 4]

In the described operation, the capacitor 24, 25 is designed for such a capacity making it possible to perform both the inverter operation of generating a high-frequency current in the primary winding of the high-voltage transformer 26 as the semiconductor switch element 20, 21 is turned on/off and the operation of generating the voltage provided by boosting the voltage of the commercial power supply 1 in the capacitor 24, 25, and the capacity of the capacitor 24 is made equal to that of the capacitor 25. Consequently, if the commercial power supply 1 has the voltage polarity shown in the figure, the voltage provided by boosting the voltage of the commercial power supply 1 is stored in the capacitor 24 and in contrast, if the commercial power supply 1 has an opposite voltage polarity to that shown in the figure, the voltage provided by boosting the voltage of the commercial power supply 1 is stored in the capacitor 25. Therefore, the voltage generated in the capacitor 24 can be made equal to that generated in the capacitor 25 independently of the voltage polarity of the commercial power supply 1 and thus the current of the commercial power supply 1 can be made a symmetrical waveform with respect to the voltage polarity. Such operation is continued, whereby the voltage waveform of the capacitor 24, 25 generates a voltage boosted in response to the voltage polarity of the commercial power supply 1 with respect to the period of the commercial power supply 1, as shown in FIG. 4. Thus, the envelope waveform of the current flowing into the primary winding of the high-voltage transformer 26 becomes a waveform as shown in V26 (Lp). Since the high-voltage transformer 26 boosts the voltage and applies the boosted voltage to the magnetron 8, the voltage applied to the magnetron 8 shows a waveform as in V8 and it is made possible to always maintain the voltage equal to or more than oscillation voltage VAK (TH). Consequently, the input current 11 can be allowed to flow in any periods of the commercial power supply 1 and improvement in the power factor and suppression of harmonics can be accomplished.

When a transition is made from the time period (a) to (b) in FIG. 3, the operation of cutting off the diode 23 is performed; the semiconductor switch element 21, which is connected in series as a current path, shuts off the current, and the switching speed of the diode 23 is not required. Since the voltage applied to the diode 23 at the off time is zero, no switching loss occurs at the turning off time. Therefore, it is made possible to design the diode 22, 23 so as to focus on suppressing the loss at the conduction time in the design with importance attached to the forward on voltage VF, and simplifying the structure of cooling the diode 22, 23 as well as miniaturizing the diode 22, 23 is facilitated. Particularly, such a magnetron drive power supply used with a microwave oven handles high power of 1000 W or more and thus the current of an inverter circuit becomes a very large current level of about 40 A to 50 A and it is advantageous in improving the efficiency of the inverter circuit to decrease the conduction loss with importance attached to the forward on voltage VF in the design of the diode 22, 23. Thus, the total power loss of the inverter circuit can be minimized and a magnetron drive power supply high in efficiency can be provided.

Thus, in the magnetron drive power supply of the embodiment, it is made possible to design the diode 22, 23 with importance attached to the forward on voltage VF by performing circuit operation entirely different from that of the circuitry shown in the related art example, the loss of the diode 22, 23 is minimized, and the whole power conversion efficiency of the magnetron drive power supply is improved. This advantage is a proper advantage to the invention exerted as the capacitor 24, 25 serves as both the inverter operation and the operation of applying the voltage provided by boosting the voltage of the commercial power supply 1 to the capacitor 24, 25, and is provided by the capacitor circuit function and circuit operation different from those in JP-A-10-271846 described in the related art example.

Figure 5:
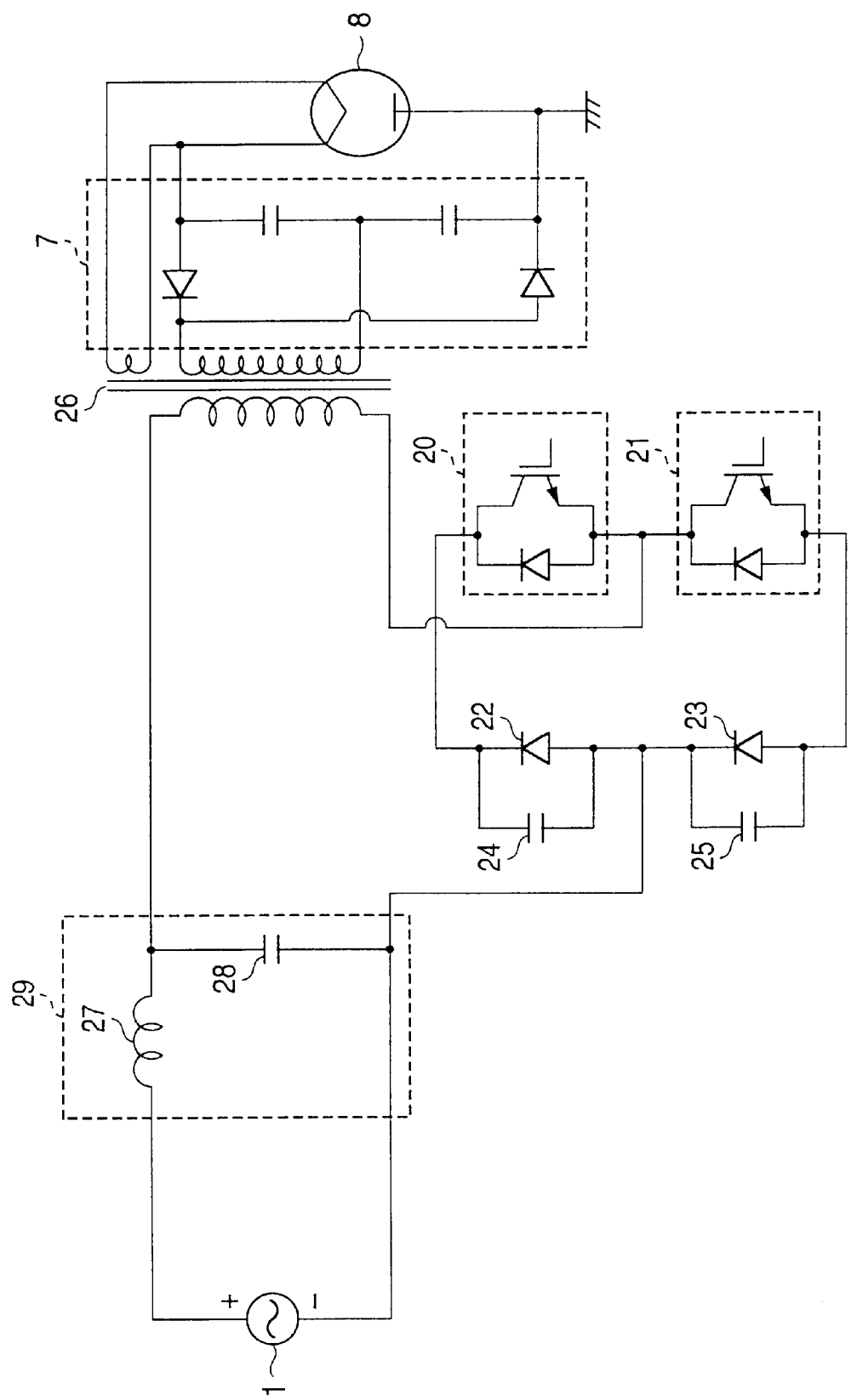
[FIG. 5]

FIG. 5 shows a more actual circuit configuration of the magnetron drive power supply of the embodiment, wherein output of the commercial power supply 1 is provided with a low-pass filter 29 consisting of an inductor 27 and a capacitor 28, whereby the high-frequency current of the inverter circuit is not allowed to flow into the commercial power supply. The low-pass filter 29 is thus inserted between the commercial power supply 1 and the inverter circuit, so that the high-frequency current or voltage of the inverter circuit is not routed to the commercial power supply side, thereby making it possible to decrease terminal noise. The above-described operation does not change if the configuration is applied.

(Embodiment 2)

Figure 6:
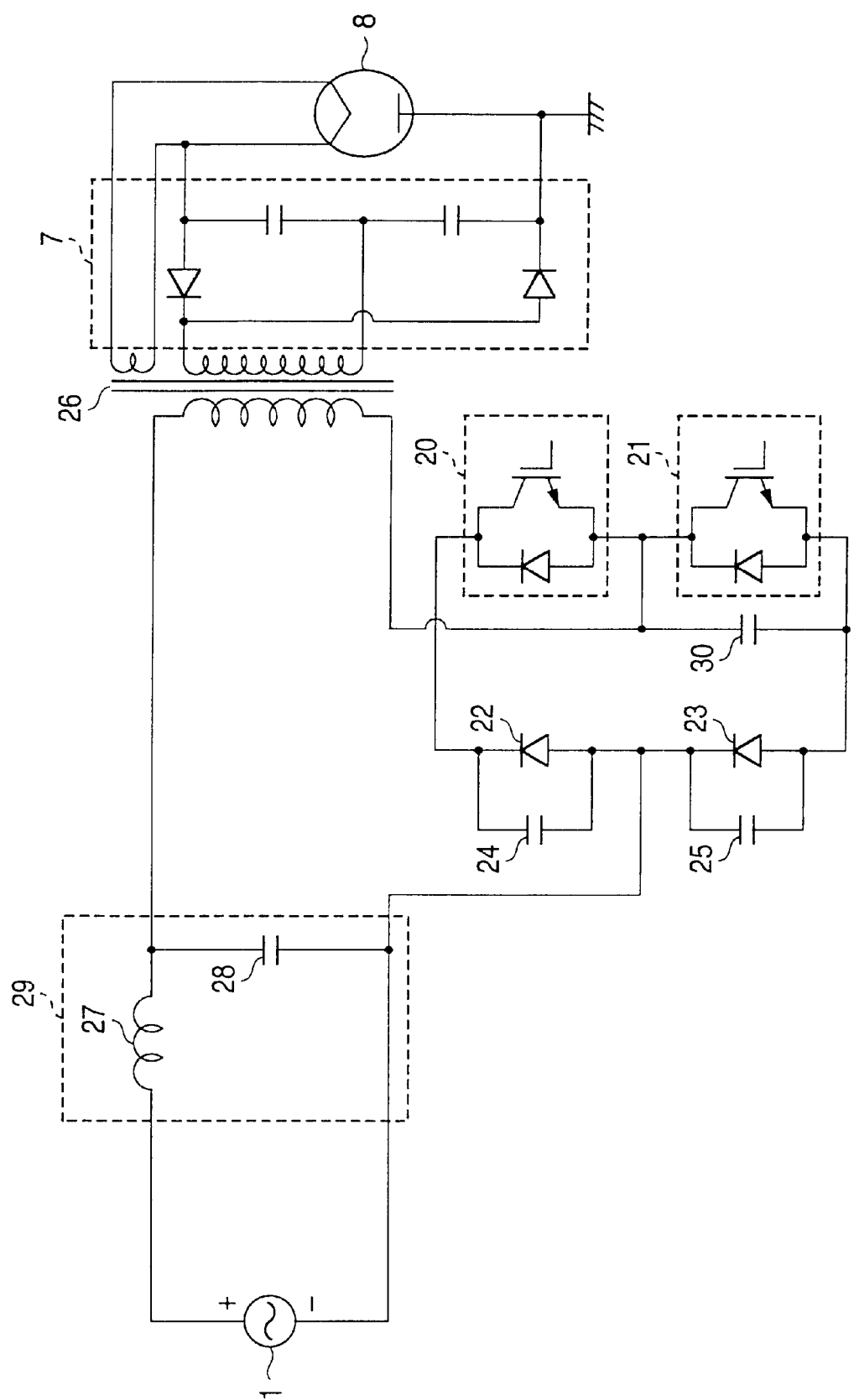
[FIG. 6]

FIG. 6 is a circuit diagram of a magnetron drive power supply in a second embodiment of the invention. In the circuit configuration, a capacitor 30 is connected in parallel to a semiconductor switch element 21 in addition to the circuit configuration of the embodiment 1 described above.

Figure 7:
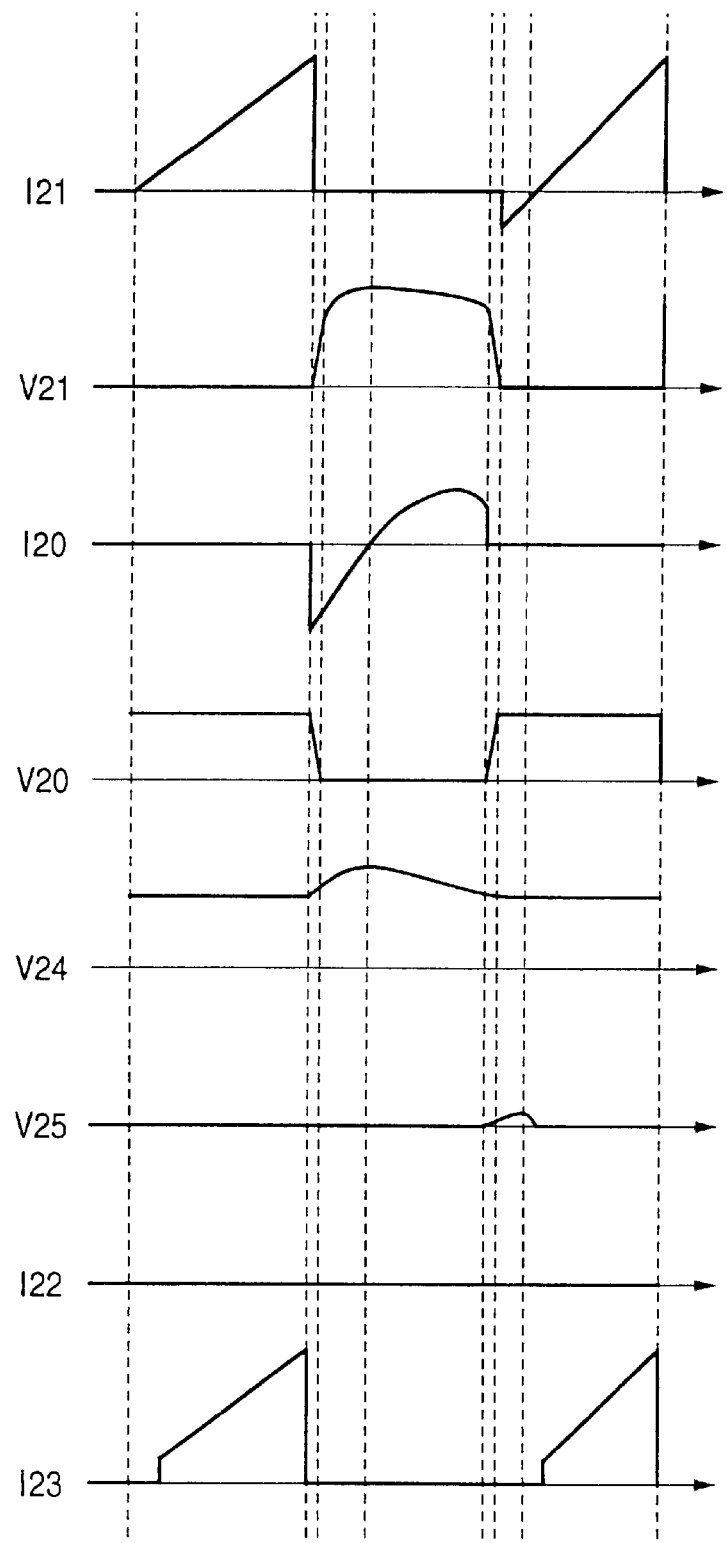
[FIG. 7]
Figure 8A:
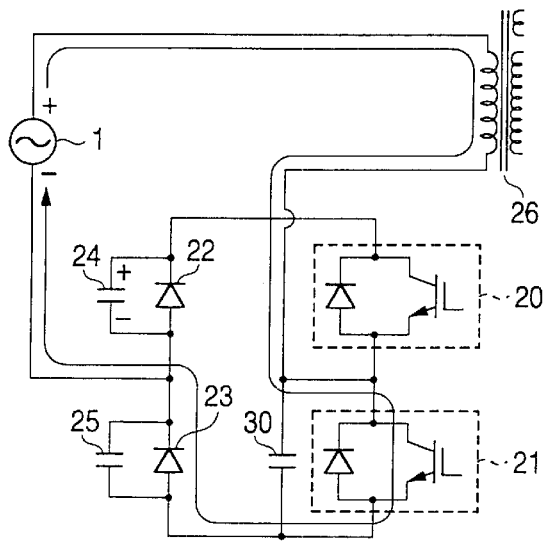
FIGS. 8(a) to 8(g) are current path diagrams in operation modes of the magnetron drive power supply in the second embodiment of the invention.
Figure 8C:
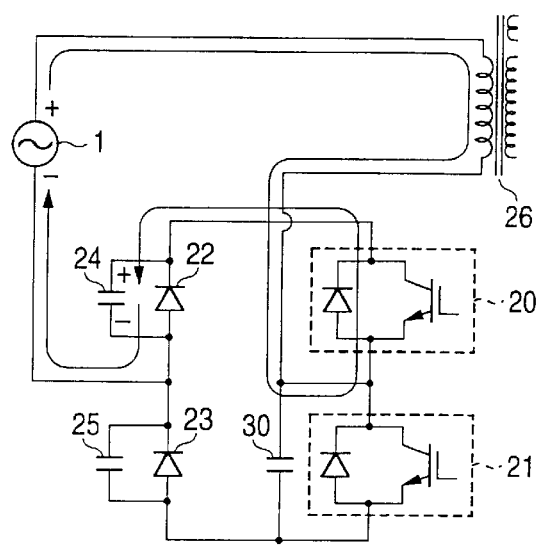
Figure 8B:
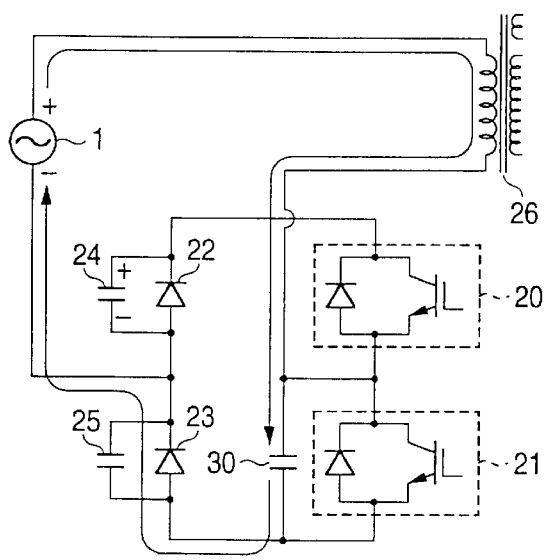
Figure 8D:
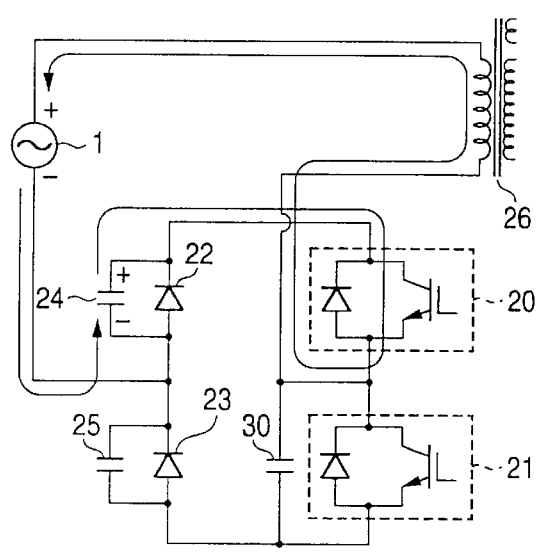
Figure 8E:
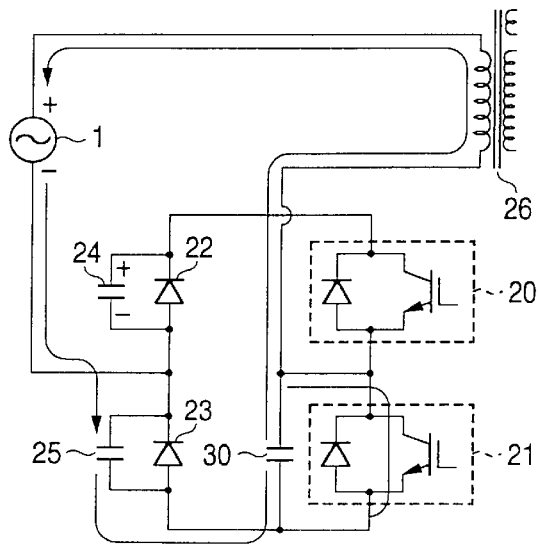
Figure 8G:
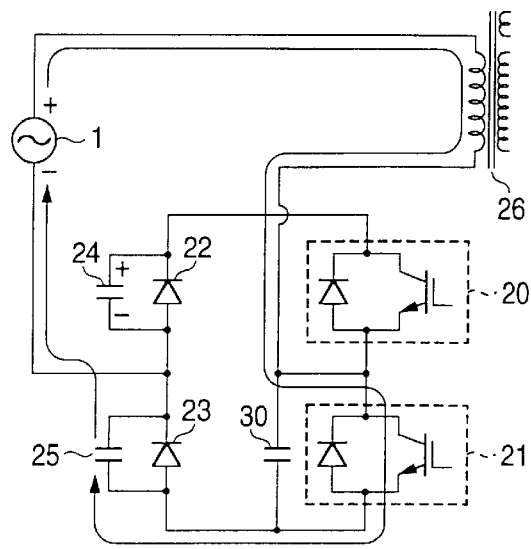
Figure 8F:
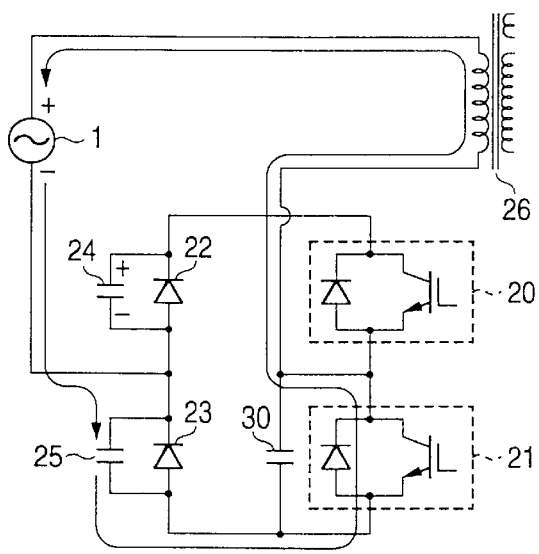

FIG. 7 is an operation waveform chart in the embodiment and FIGS. 8(*a*) to 8(*g*) are diagrams to show current paths in time periods in the embodiment. The description to follow starts at the state in which the semiconductor switch element 21 is on with the voltage polarity of a commercial power supply 1 as shown in the figure. In the state in which the semiconductor switch element 21 is on, a current flows through the primary winding of a high-voltage transformer 26 from the commercial power supply 1, forming a path in FIG. 8(*a*). At this time, the current flowing into the semiconductor switch element 21 increases linearly as shown in FIG. 7. If the semiconductor switch element 21 is turned off in a given time, the current of the primary winding of the high-voltage transformer 26 attempts to continue flowing in the same direction and thus the current path becomes the state in FIG. 8(*b*), and the capacitor 30 connected in parallel to the semiconductor switch element 21 is charged. At this time, voltage V21 of the semiconductor switch element 21 rises at the charging speed of the capacitor 30. When the voltage of the capacitor 30 becomes equal to the voltage of a capacitor 24, then a parallel diode of a semiconductor switch element 20 is brought into conduction, a current path of charging the capacitor 24 is formed, and a transition is made to time period FIG. 8(*c*). Upon completion of charging the capacitor 24, the semiconductor switch element 20 is turned on and charges of the capacitor 24 are taken out on a path of the capacitor 24 to the semiconductor switch element 20 to the primary winding of the high-voltage transformer 26 to the commercial power supply 1 shown in FIG. 8(*d*). At this time, the waveform of the current flowing through the semiconductor switch element 20 becomes a waveform as shown in FIG. 7(*d*). If the semiconductor switch element 20 is turned off in a predetermined time, then a path of discharging the charges of the capacitor 30 connected in parallel to the semiconductor switch element 21 on a path in FIG. 8(*e*) is formed, and the capacitor 30 is discharged. At this time, voltage V21 applied to the semiconductor switch element 21 is decreased gradually and in contrast, voltage V20 applied to the semiconductor switch element 20 is raised gradually. When discharging the capacitor 30 is complete and the voltage applied to the semiconductor switch element 21 becomes zero, a current path in FIG. 8(*f*) is formed and a diode connected in parallel to the semiconductor switch element 21 is brought into conduction. Next, if the semiconductor switch element 21 is turned on, a current path in FIG. 8(g) is formed and the charges stored in a capacitor 25 are discharged. Upon completion of discharging the capacitor 25, a transition is made to the state in FIG. 8(a).

If the commercial power supply 1 has an opposite voltage polarity to that shown in the figure, the semiconductor switch elements 20 and 21, the capacitors 24 and 25, and the diodes 22 and 23 are replaced in operation and similar operation is performed.

In the embodiment, the switching loss of the diode 22, 23 does not occur as in the above-described embodiment and the occurrence loss of the diode 22, 23 can be minimized in designing the diode 22, 23 with importance attached to forward on voltage VF. Further, the voltage applied to the semiconductor switch element 20, 21 is gently raised using charging, discharging of the capacitor 30 when the semiconductor switch element 20, 21 is turned on/off, whereby the occurrence loss at the switching time can be decreased. That is, an actual semiconductor switch element always has a transition time period when it makes the on-to-off state transition or makes the off-to-on state transition, and a switching loss is produced in the transition time period during which voltage and current occur at the same time. Particularly, in a semiconductor switch element earning the current density of the semiconductor element by performing bipolar operation, such as an IGBT (insulated gate bipolar transistor) or a BJT (bipolar junction transistor) fitted for handling a large current, if a gate signal is turned off, the remaining holes in the element do not immediately disappear and thus the collector current cannot immediately be shut off and a transition time period of several 100 ns to several µs occurs. In the embodiment, however, the voltage applied to the semiconductor switch element is gently changed at the timing and gently rises in the time period until the current is shut off, so that it is made possible to extremely lessen the switching loss when the semiconductor switch element 20, 21 is turned on/off, and further it is made possible to enhance the circuit efficiency.

Figure 9:
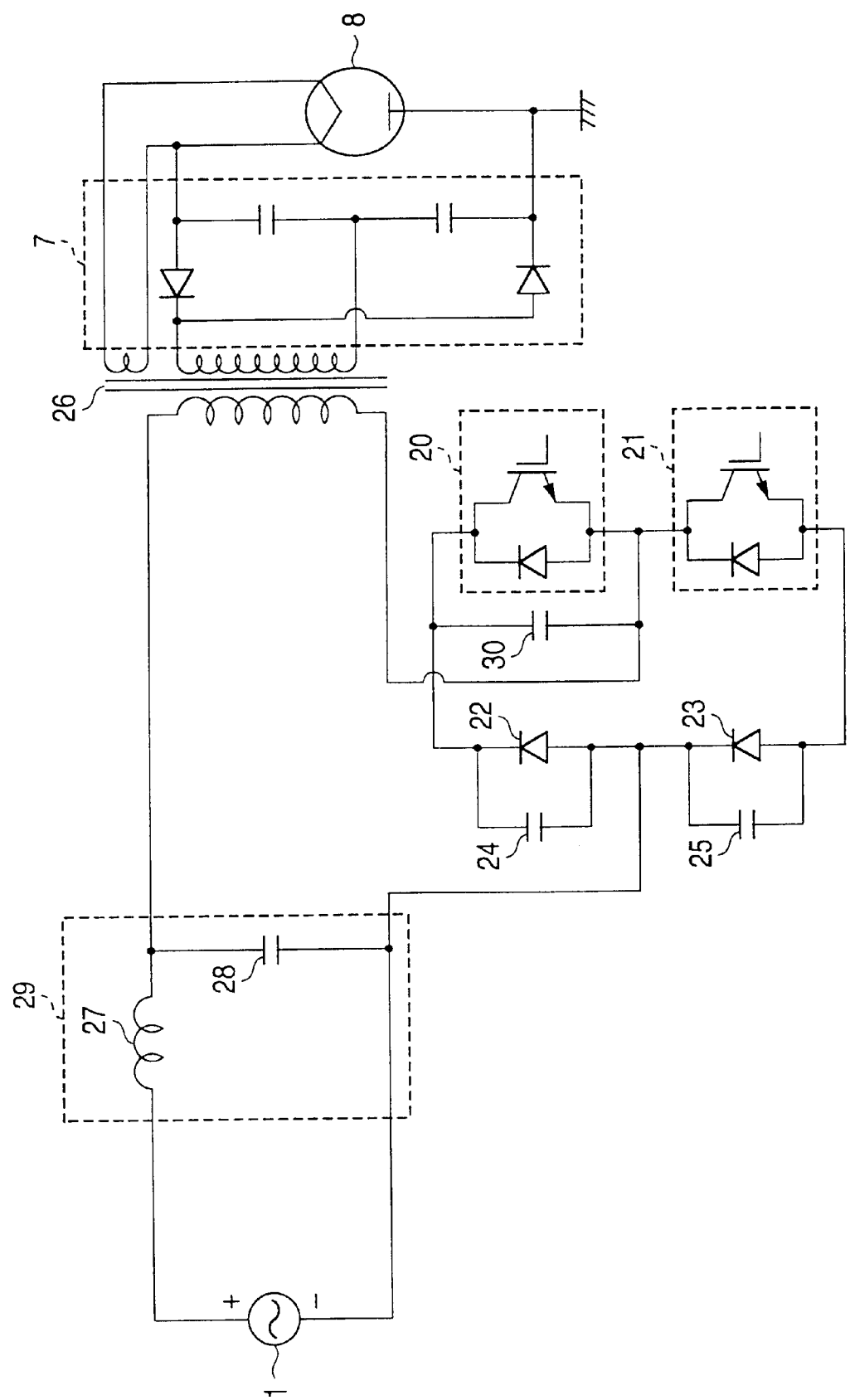
[FIG. 9]

FIG. 9 shows the configuration wherein the capacitor 30 is connected in parallel to the semiconductor switch element 20. In this case, the timings of charging and discharging the capacitor 30 become opposite to those described above, but the function of gently changing the voltage applied to the semiconductor switch element 20, 21 is similar to that described above. Therefore, the occurrence loss of the semiconductor switch element 20, 21 can be decreased at the same time as the loss of the diode 22, 23 can be minimized in designing the diode 22, 23 with importance attached to the forward on voltage VF as with the case in FIG. 6 described above, and it is made possible to improve the power conversion efficiency of the magnetron drive power supply.

Figure 10:
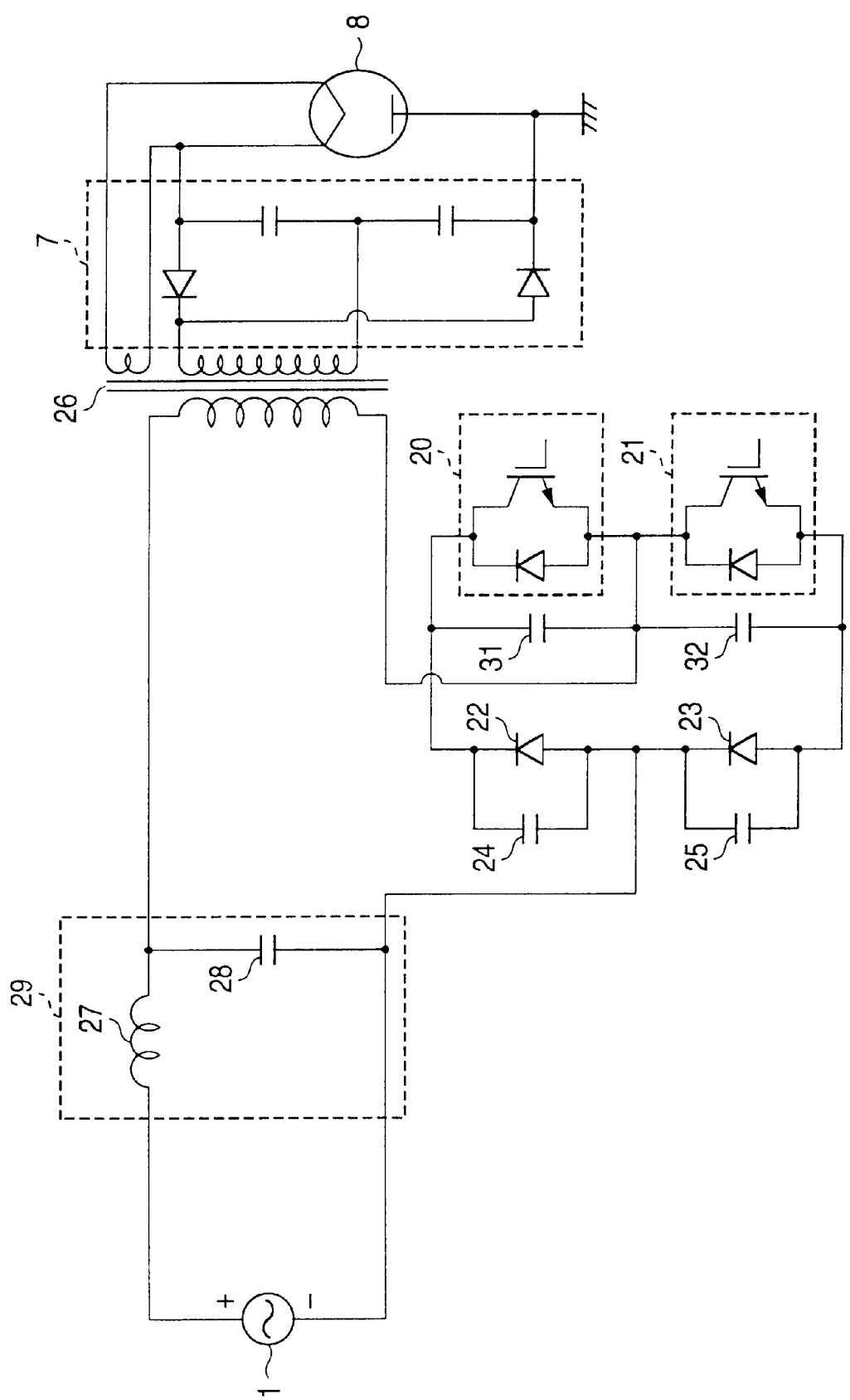
[FIG. 10]

FIG. 10 shows the configuration wherein capacitors 31 and 32 are connected to the semiconductor switch elements 20 and 21. In this case, to provide the same voltage gradient as in the above-described example, a capacitor having a half capacity of the above-described capacitor 30 may be connected. In this case, the function given by the capacitor 31, 32 to the magnetron drive power supply is equal to that in FIG. 6 or 9 described above; when the capacitor 31 is charged, the capacitor 32 is discharged and in contrast, when the capacitor 31 is discharged, the capacitor 32 is charged, thereby providing a similar advantage.

Figure 11:
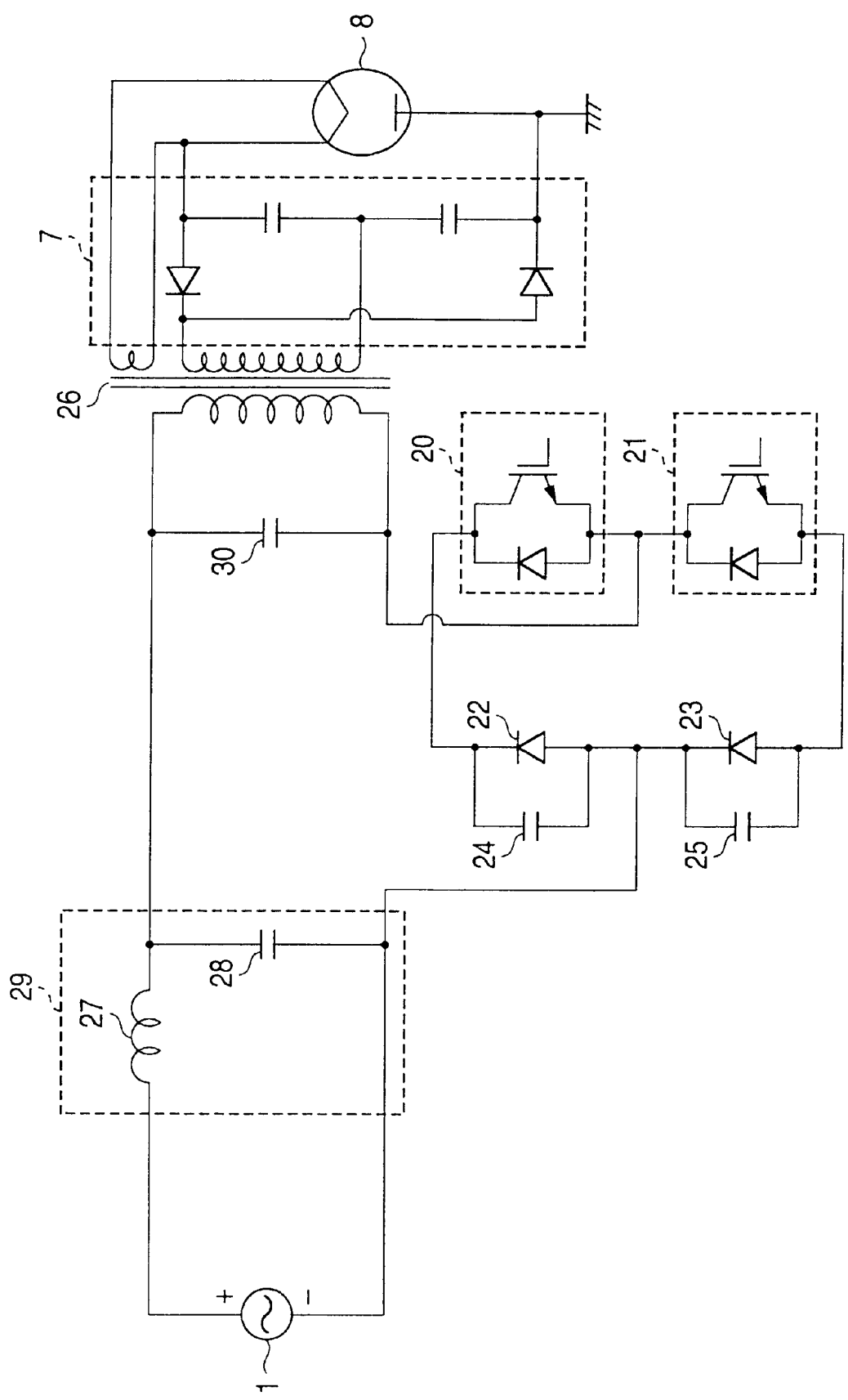
[FIG. 11]

FIG. 11 shows the configuration wherein the capacitor 30 is connected in parallel to the primary winding of the high-voltage transformer 26. In this case, the voltage of the primary winding of the high-voltage transformer 26 is gently changed by the action of the capacitor 30 and thus the voltage of the semiconductor switch element 20, 21 gently changes, thereby providing a similar advantage to that in the above-described example.

(Embodiment 3)

A third embodiment of the invention will be discussed with reference to FIGS. 12 to 15.

Figure 12:
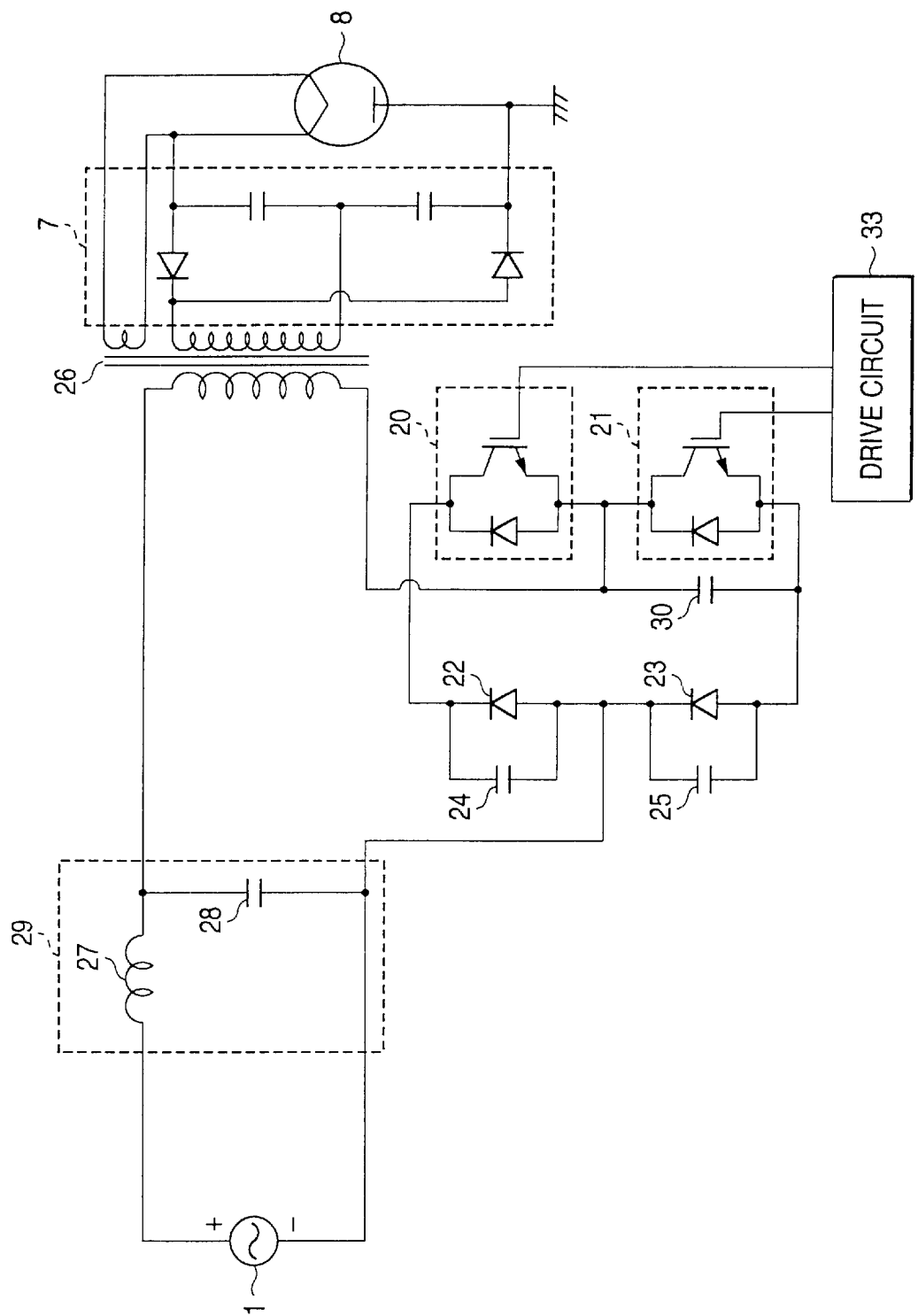
[FIG. 12]
Figure 13A:
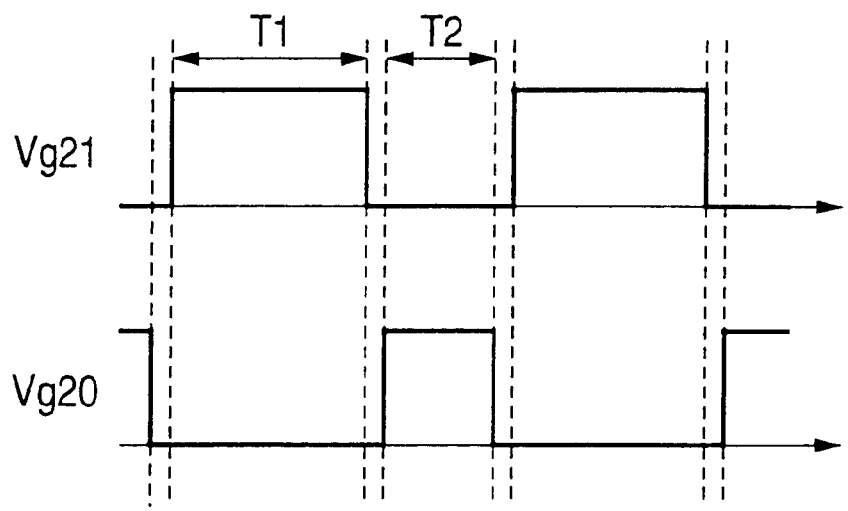
FIGS. 13(a) and 13(b) are drive signal waveform charts of semiconductor switch elements in the third embodiment of the invention.

FIG. 12 is a circuit diagram of a magnetron drive power supply in the third embodiment of the invention. Parts identical with those in the above-described embodiments are denoted by the same reference numerals in FIG. 12 and therefore will not be discussed again in detail. A drive circuit 33 drives semiconductor switch elements 20 and 21 for operating an inverter circuit. Drive signals sent by the drive circuit 33 to the semiconductor switch elements 20 and 21 have waveforms each having a dead time and turned on and off complementarily to each other, as shown in FIG. 13(a). The semiconductor switch elements 20 and 21 are thus turned on and off complementarily to each other, whereby the inverter circuit transmits electric power to a magnetron 8.

FIG. 14 shows the relationship between on time ratio Don21 of the semiconductor switch element 21 and conversion power P of the inverter circuit. In the figure, the curve indicated by the solid line shows change in the conversion power P when a commercial power supply 1 has a voltage polarity shown in FIG. 12 and in contrast, the curve indicated by the dashed line shows change in the conversion power P when the commercial power supply 1 has a voltage polarity opposite to that shown in FIG. 12. Thus, the relationship between the on time ratio Don21 of the semiconductor switch element 21 and the conversion power P of the inverter circuit varies depending on the voltage polarity of the commercial power supply 1. Therefore, in a state in which the on time ratio Don21 of the semiconductor switch element 21 is roughly 50%, the same power conversion can be performed regardless of the positive or negative voltage polarity of the commercial power supply 1, so that the current of the commercial power supply 1 can made a symmetrical waveform with respect to the voltage polarity, as shown in FIG. 15(b). However, if an attempt is made to make the current of the commercial power supply 1 a sine wave symmetrical with respect to the voltage polarity, conversion power is limited only at the one point. Heating power is selected from among various steps in response to foods at the heating time with a home microwave oven, etc. The heating power needs to be adjusted as "strong," "medium," "weak," or the like is set, for example. To meet it, it becomes necessary to change the on time ratio Don21 of the semiconductor switch element 21 in response to any desired output power. However, if an attempt is made to adjust to the desired output power at a constant on time ratio Don21 independently of the voltage polarity of the commercial power supply 1, the on time ratio Don21 is placed out of 50% from the relationship between the on time ratio Don21 of the semiconductor switch element 21 and the conversion power P shown in FIG. 14, and different waveforms are shown in positive and negative time periods of the voltage of the commercial power supply 1; for example, a current waveform placed out of balance of the positive and negative polarities as shown in FIG. 15 (a) results. In this case, the current waveform does not become a symmetrical waveform and thus an even'th-order harmonic occurs and in the end, it is made impossible to improve the power factor.

Figure 13B:
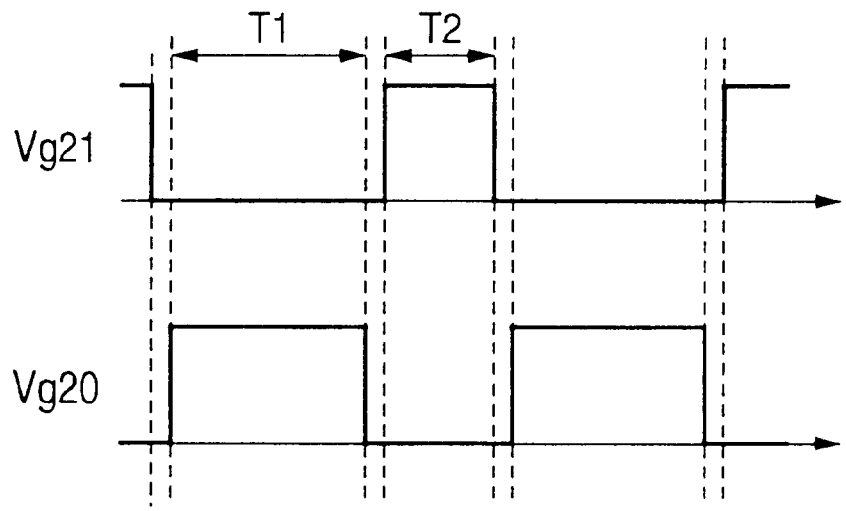

Then, in the embodiment, the drive circuit 33 operates so as to replace the drive signals of the semiconductor switch elements 20 and 21 in response to the voltage polarity of the commercial power supply 1. That is, if the voltage polarity of the commercial power supply 1 is positive, the semiconductor switch elements 20 and 21 are turned off and on and turned on and off at on times T1 and T2 as shown in FIG. 13(a) and in contrast, if the voltage polarity of the commercial power supply 1 is negative, the on times of the semiconductor switch elements 20 and 21 in FIG. 13(a) are replaced, as shown in FIG. 13(b). The drive circuit 33 operates in such a manner, whereby while the occurrence loss of the magnetron drive power supply in the circuit is decreased, the conversion power of the magnetron drive power supply changes and if the on time ratio Don21 of the semiconductor switch element 21 shifts in either direction from the state of roughly 50% and the conversion power is increased or decreased, it is made possible to always maintain the current waveform of the commercial power supply 1 as a waveform like a sine wave symmetrical with respect to the voltage polarity. Thus, it is made possible to accomplish the operation with no current distortion at a high power factor while high power conversion efficiency is always maintained if the conversion power is changed.

(Embodiment 4)

Figure 16:
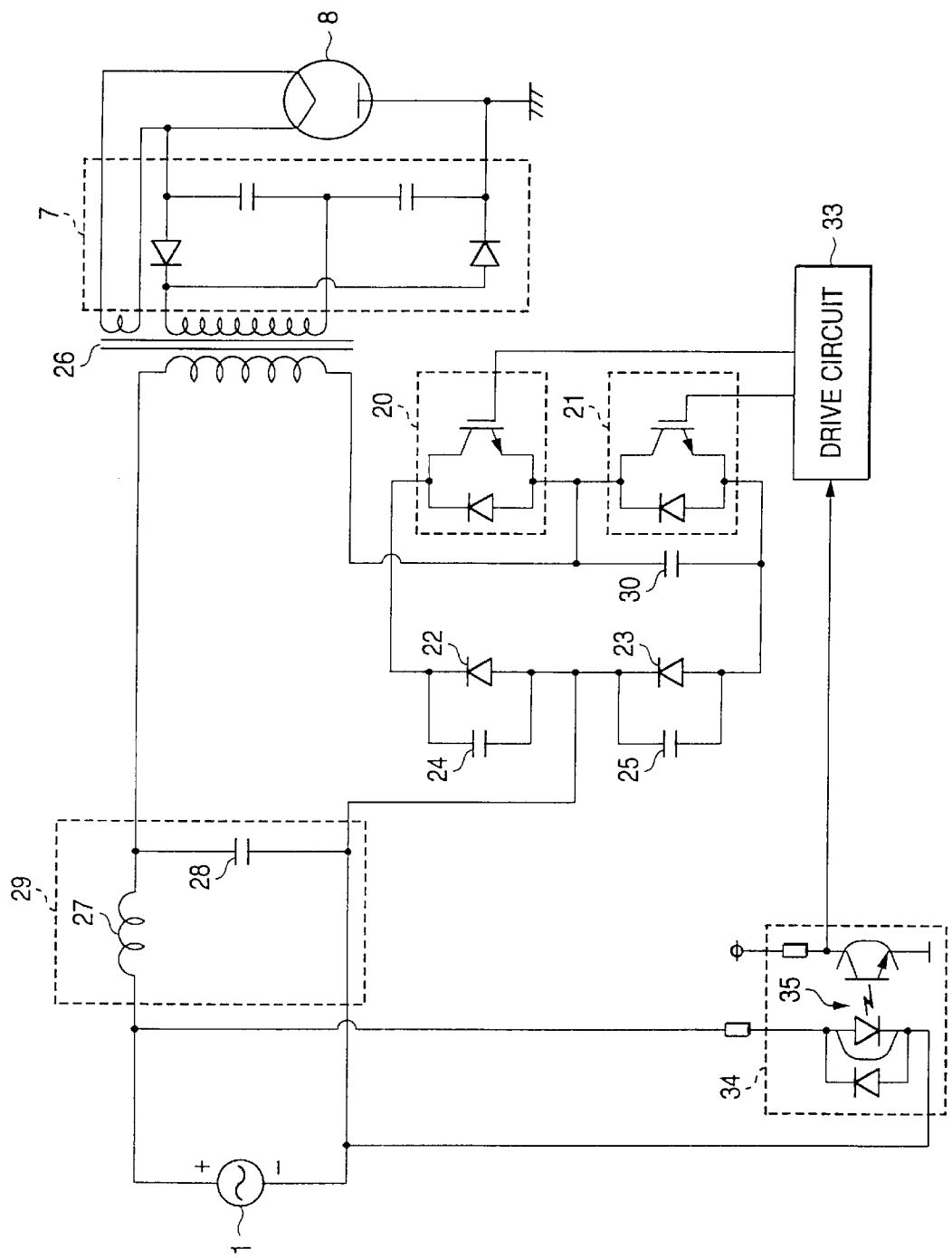
[FIG. 16]
Figure 17:
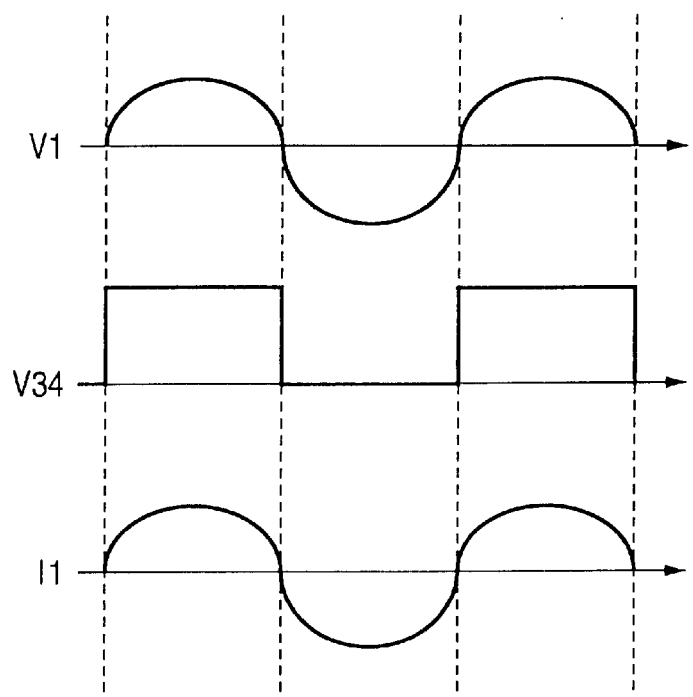
[FIG. 17]
Figure 18A:
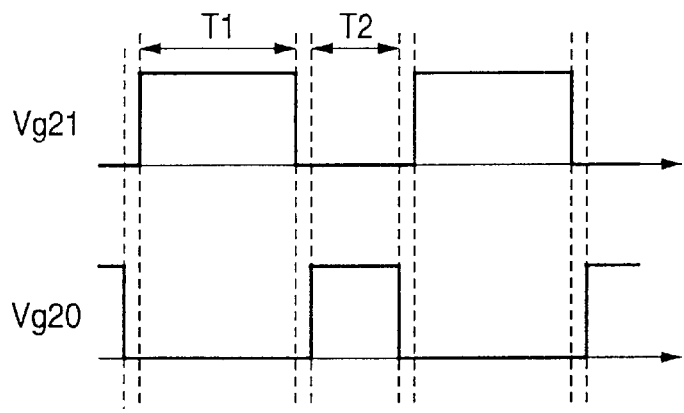
FIGS. 18(a) and 18(b) are drive signal waveform charts of semiconductor switch elements in the fourth embodiment of the invention.
Figure 18B:
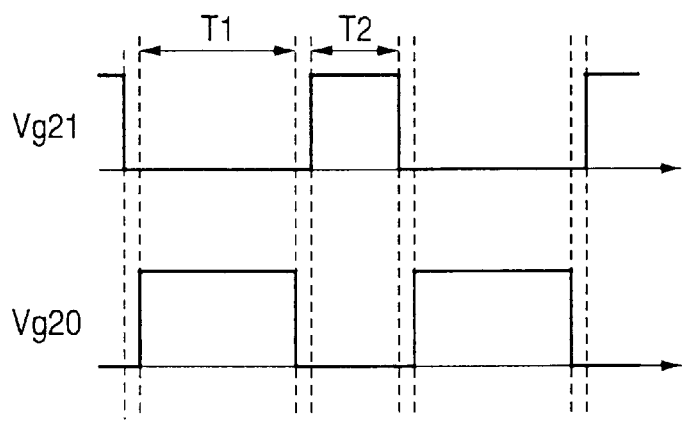

A fourth embodiment of the invention will be discussed with reference to FIGS. 16 to 18. FIG. 16 is a circuit diagram of a magnetron drive power supply in the fourth embodiment of the invention. Parts identical with those in the above-described embodiments are denoted by the same reference numerals in FIG. 16 and will not be discussed again in detail. Power supply polarity determination means 34 determines the voltage polarity of a commercial power supply 1; in the embodiment, it is implemented using a photocoupler, for example. If the voltage of the commercial power supply 1 changes as V1 in FIG. 17, when the voltage polarity is as shown in the figure, a light emission diode of the photocoupler 35 emits light, whereby a transistor on the light receiving side is brought into conduction. At this time, output of the power supply polarity determination means 34 goes low. A drive circuit 33 determines that this state is positive power supply polarity, and outputs on times of semiconductor switch elements 20 and 21 as T1 and T2 as shown in FIG. 18(a). When the voltage polarity of a commercial power supply 1 becomes negative, then light emission of the light emission diode of the photocoupler 35 stops and the transistor on the light receiving side is turned off, whereby output of the power supply polarity determination means 34 goes high. The drive circuit 33 determines that this state is negative voltage polarity of the commercial power supply, and outputs drive signals so that the on times of the semiconductor switch elements 20 and 21 become opposite to those when the voltage polarity of the commercial power supply 1 is positive, as shown in FIG. 18(b). Such operation is performed, whereby if the conversion power of the magnetron drive power supply is increased or decreased, it is made possible to always maintain the current waveform of the commercial power supply 1 as a waveform like a sine wave symmetrical with respect to the voltage polarity. Thus, it is made possible to accomplish the operation with no current distortion at a high power factor while high power conversion efficiency is always maintained if the conversion power is changed.

Figure 19:
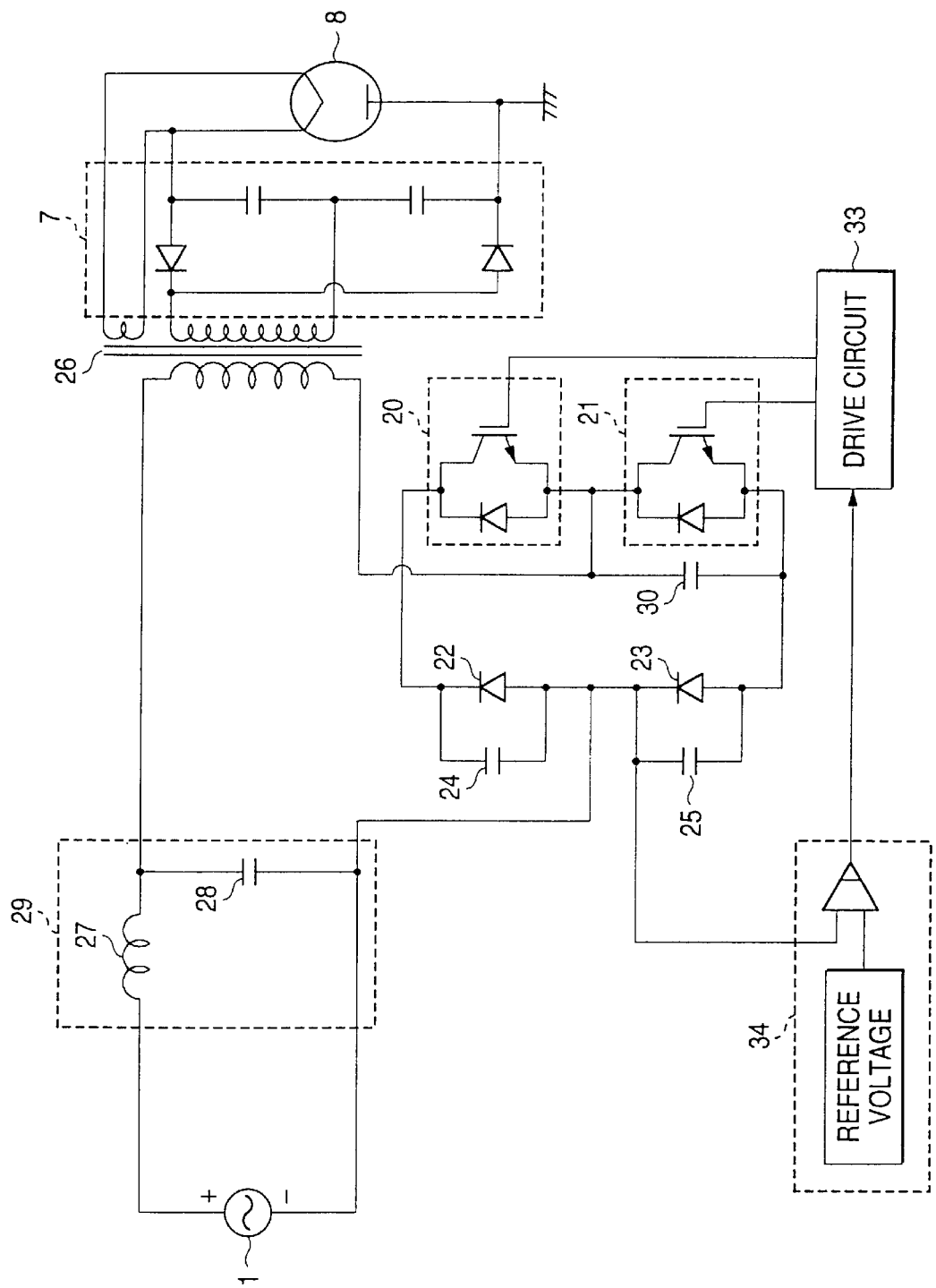
[FIG. 19]
Figure 20:
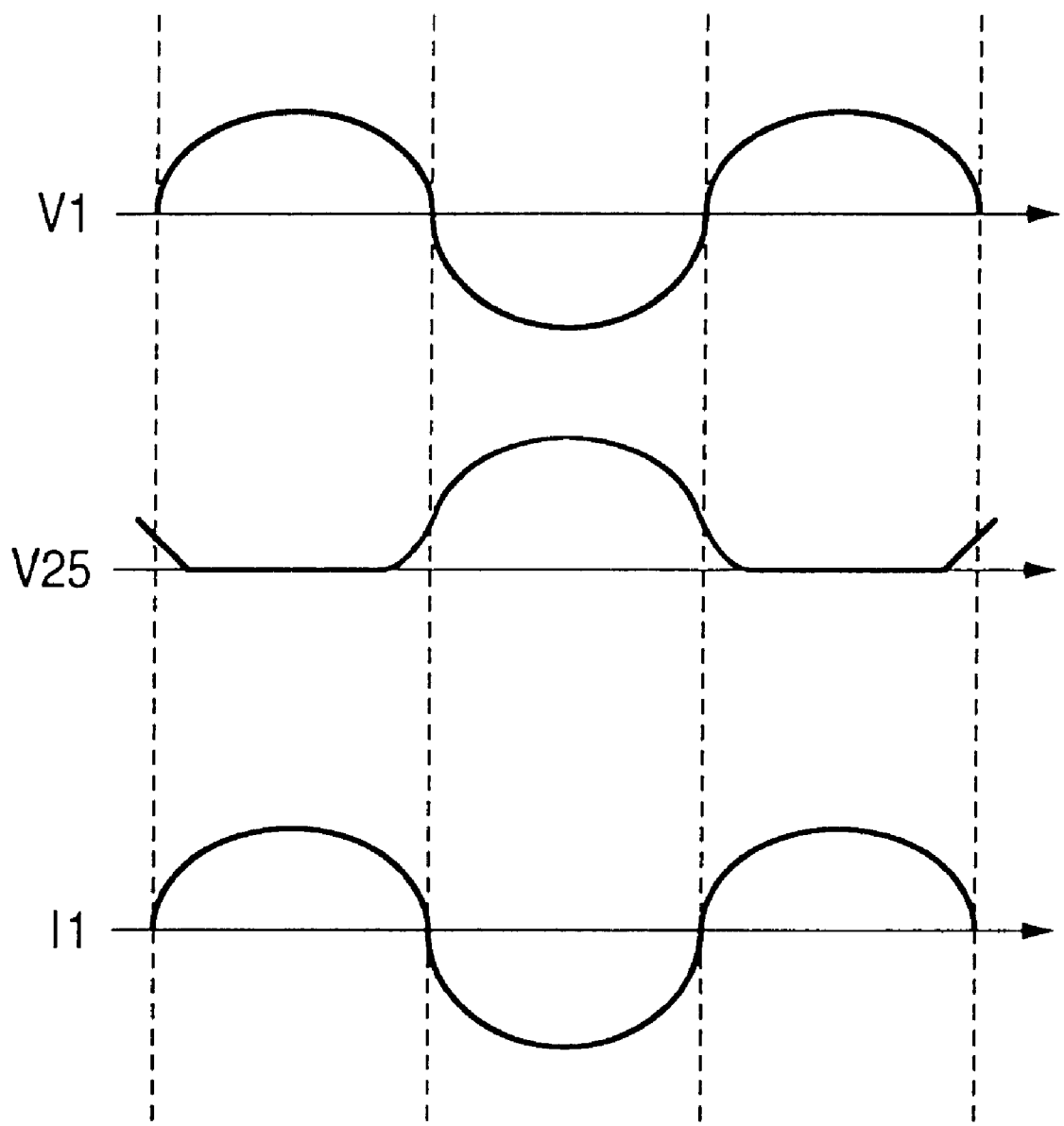
[FIG. 20]

FIG. 19 shows an example of implementing the power supply polarity determination means 34 as a voltage detection resistor connected in parallel to a capacitor 25. This uses the fact that voltage occurring in the capacitor 25 changes as V25 in FIG. 20 as previously described in the embodiment 1. That is, when the voltage of the commercial power supply 1 shows an AC waveform as shown in FIG. 20, if the power supply polarity is positive, the voltage V25 of the capacitor 25 is almost zero. On the other hand, when the negative polarity is shown, voltage provided by boosting the voltage of the commercial power supply 1 is generated in response to the operation of an inverter circuit, as shown in the figure. This voltage is divided by means of resistor as in the embodiment and using a comparator, the power supply polarity determination means 34 determines that the voltage polarity of the commercial power supply 1 is negative in the time period during which the value is equal to or greater than a reference value, and transmits a signal to the drive circuit 33. The drive circuit 33 operates so as to replace the drive signals of the semiconductor switch elements 20 and 21 based on the determination signal. Such operation is performed, whereby if the conversion power of the magnetron drive power supply is increased or decreased, it is made possible to always maintain the current waveform of the commercial power supply 1 as a waveform like a sine wave symmetrical with respect to the voltage polarity as in the above-described example. Thus, it is made possible to accomplish the operation with no current distortion at a high power factor while high power conversion efficiency is always maintained if the conversion power is changed.

(Embodiment 5)

Figure 21:
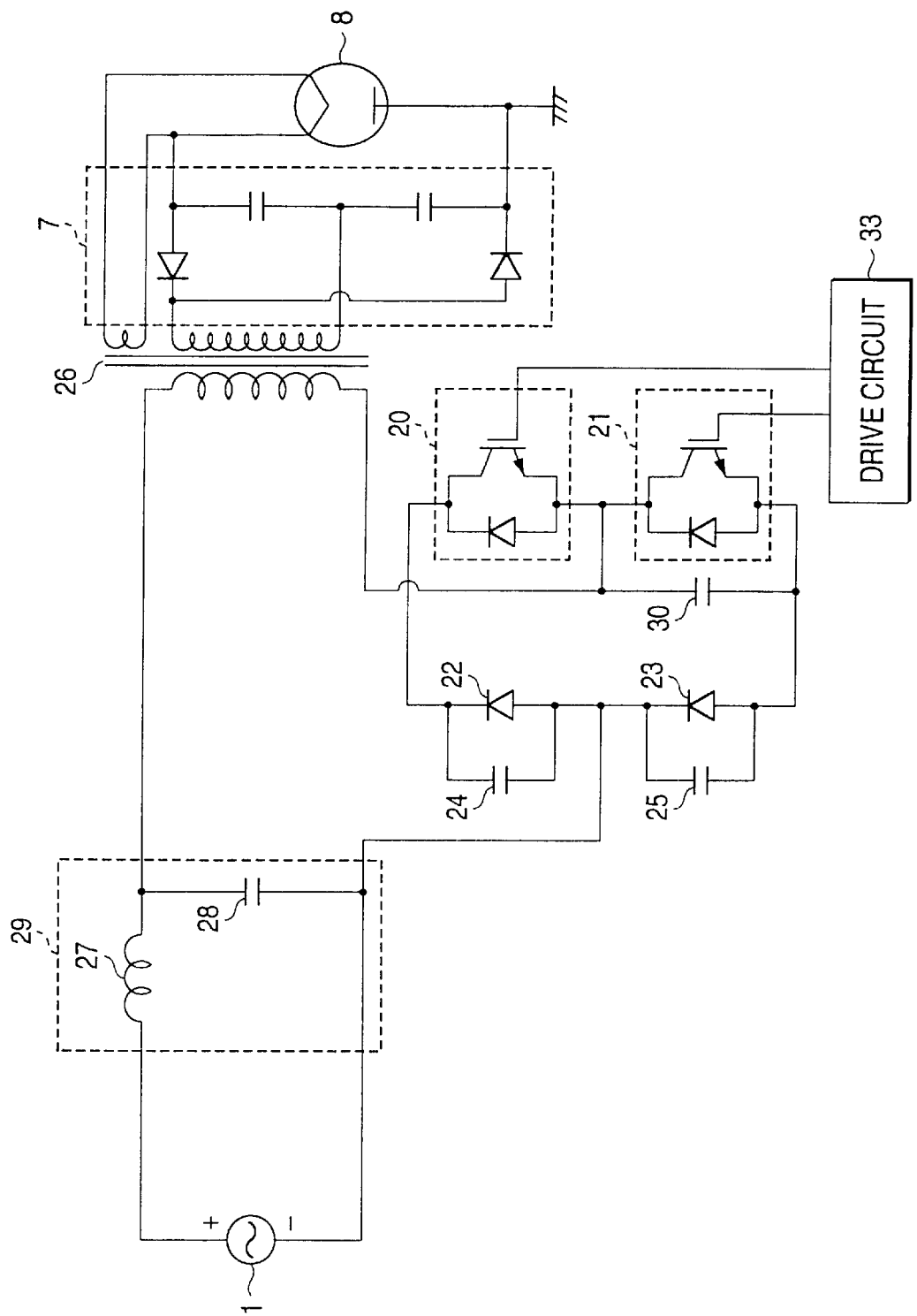
[FIG. 21]

A fifth embodiment of the invention will be discussed with reference to FIGS. 21 to 25. FIG. 21 is a circuit diagram of a magnetron drive power supply in the fifth embodiment of the invention. A drive circuit 33 operates so as to replace drive signals of semiconductor switch elements 20 and 21 when the voltage polarity of a commercial power supply 1 changes, and at the same time, operates so as to change at a constant change rate at the replacing time.

Figure 22:
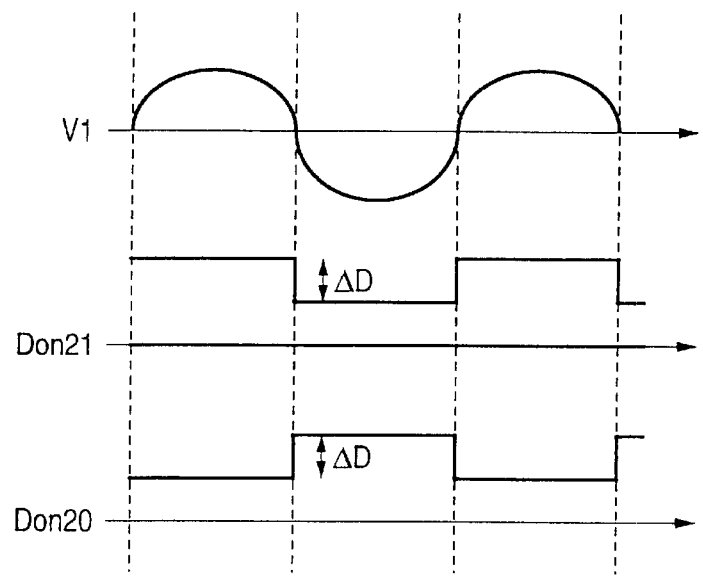
[FIG. 22]
Figure 23:
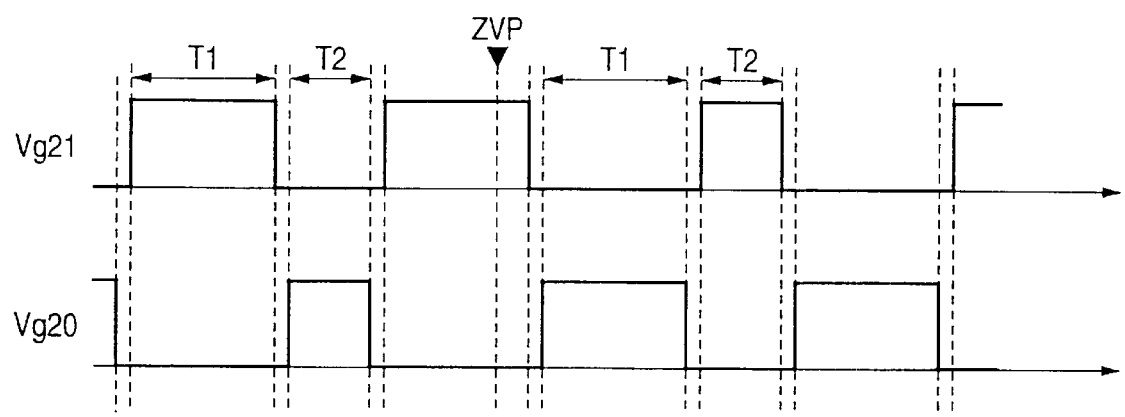
[FIG. 23]
Figure 24A:
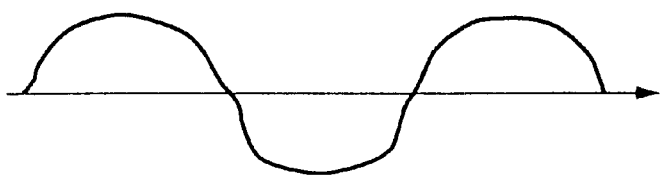
FIGS. 24(a) and 24(b) are current waveform charts of the commercial power supply in the fifth embodiment of the invention.
Figure 24B:

FIG. 22 is a chart to show change in voltage waveform V1 of the commercial power supply 1 and on time ratios Don20 and Don21 of the semiconductor switch elements 20 and 21. In the figure, the on time ratio changes are replaced instantaneously when the voltage polarity of the commercial power supply 1 changes, and the change width has a change amount of ΔD. FIG. 23 shows how the drive signals of the semiconductor switch elements 20 and 21 change when the voltage polarity of the commercial power supply 1 changes. In the figure, time point ZIP is the time point at which the voltage polarity of the commercial power supply 1 changes, and with this point as the boundary, the on time of the semiconductor switch element 20 changes from on time T1 to on time T2 in the next period. On the other hand, the on time of the semiconductor switch element 21 changes from on time T2 to on time T1. If such operation is performed, when the on times of the semiconductor switch elements 20 and 21 almost equal, the on time ratio change width ΔD is small and thus the change amount of the operation of an inverter circuit is small at the time point at which the voltage polarity of the commercial power supply 1 changes. Thus, as shown in FIG. 24(a), the current of the commercial power supply 1 shows smooth change even at the time point at which the voltage polarity of the commercial power supply 1 changes. However, if the on times of the semiconductor switch elements 20 and 21 are adjusted so as to increase or decrease the conversion power of the inverter circuit from the state, the on times of the semiconductor switch elements 20 and 21 become unequal. In this case, the on time change amount at the time point at which the voltage polarity of the commercial power supply 1 changes becomes large, and thus there is a possibility that a current waveform like a needle will occur transiently as the change amount of the operation of the inverter circuit is large at the time point at which the voltage polarity of the commercial power supply 1 changes, as shown in FIG. 24(b). Particularly, this phenomenon becomes obvious if a lag occurs between the time point at which the voltage polarity of the commercial power supply 1 changes and the timing at which the drive circuit replaces the on times of the semiconductor switch elements 20 and 21.

Figure 25:
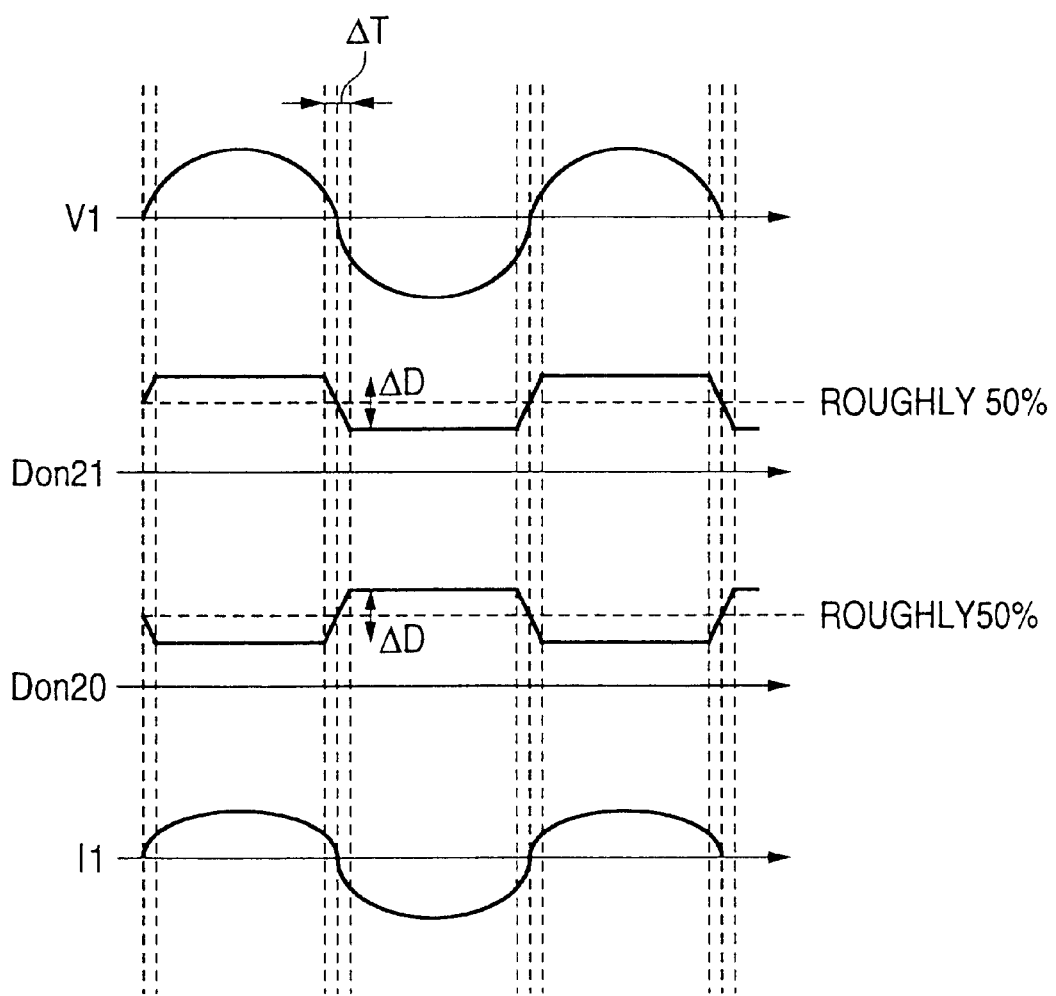
[FIG. 25]

However, in the configuration of the embodiment, when the voltage polarity of the commercial power supply 1 changes, the on time ratios of the semiconductor switch elements 20 and 21 are replaced at a constant change rate as shown in FIG. 25 and thus the change amounts of the on time ratios Don20 and Don21 of the semiconductor switch elements 20 and 21 at the time point are limited. Thus, if the conversion power of the inverter circuit is changed and the difference $\Delta D$ between the on time ratios of the semiconductor switch elements 20 and 21 is large, the current waveform of the commercial power supply 1 can always be changed smoothly and the current waveform roughly like a sine wave can always be maintained without showing any transient current waveform. If a lag occurs between the time point at which the voltage polarity of the commercial power supply 1 changes and the timing at which the drive circuit replaces the on times of the semiconductor switch elements 20 and 21 for some reason, switching is performed at the constant change rate at the replacing time and thus it is made possible to guarantee against the timing lag to some extent.

Thus, in the magnetron drive power supply of the embodiment, if the conversion power of the inverter circuit is increased or decreased and the difference between the on time ratios of the semiconductor switch elements 20 and 21 becomes large, the current waveform of the commercial power supply 1 can always be maintained roughly like a sine wave without showing any transient current.

As shown in FIG. 25, if the on time ratios Don20 and Don21 of the semiconductor switch elements 20 and 21 change so as to each become roughly 50% at the time point at which the voltage polarity of the commercial power supply 1 changes, the current waveform of the commercial power supply 1 can be changed more smoothly from the relationship between the on time ratio Don and the conversion power P of the inverter circuit as previously shown in the embodiment 3.

(Embodiment 6)

Figure 26:
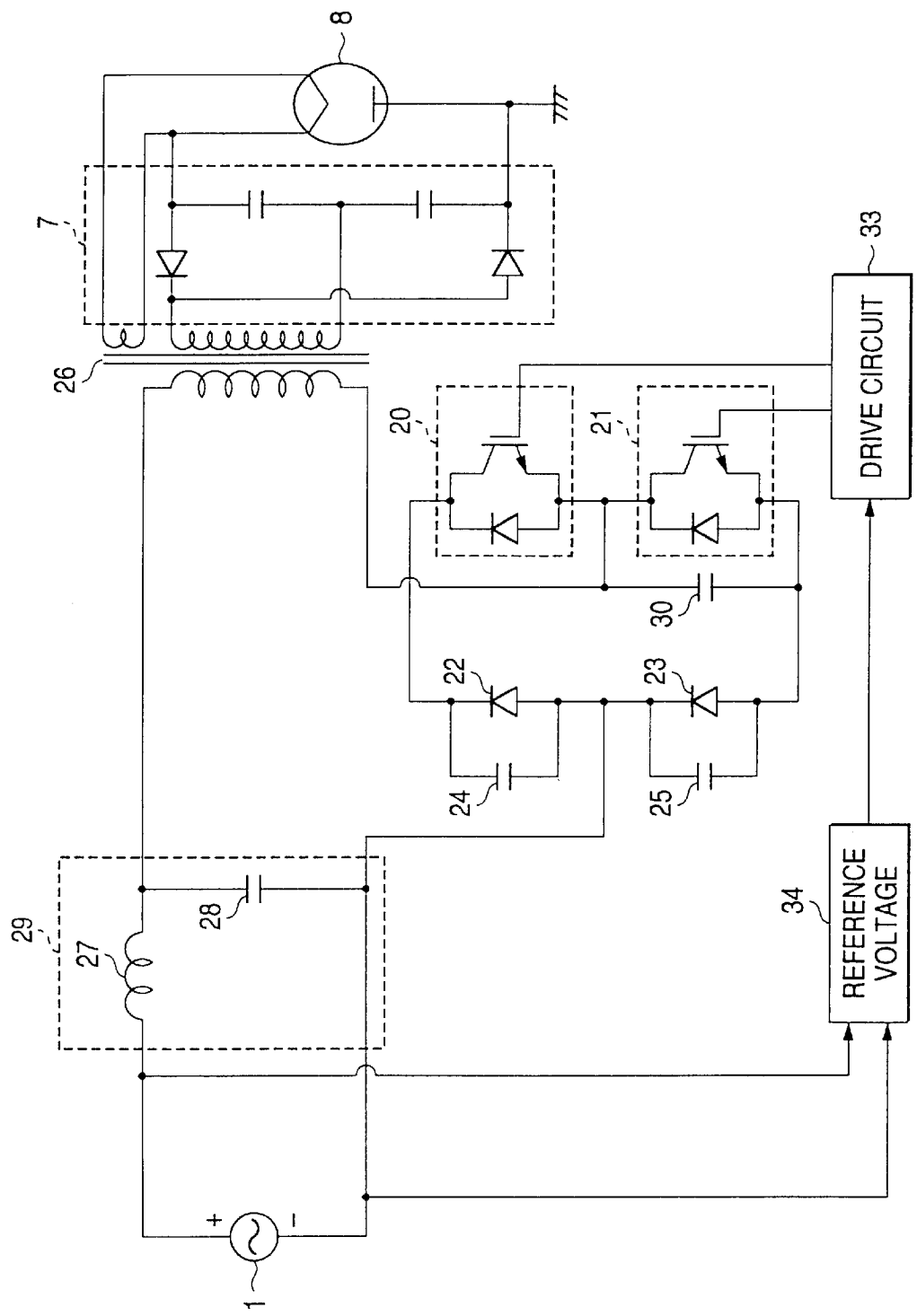
[FIG. 26]
Figure 29:
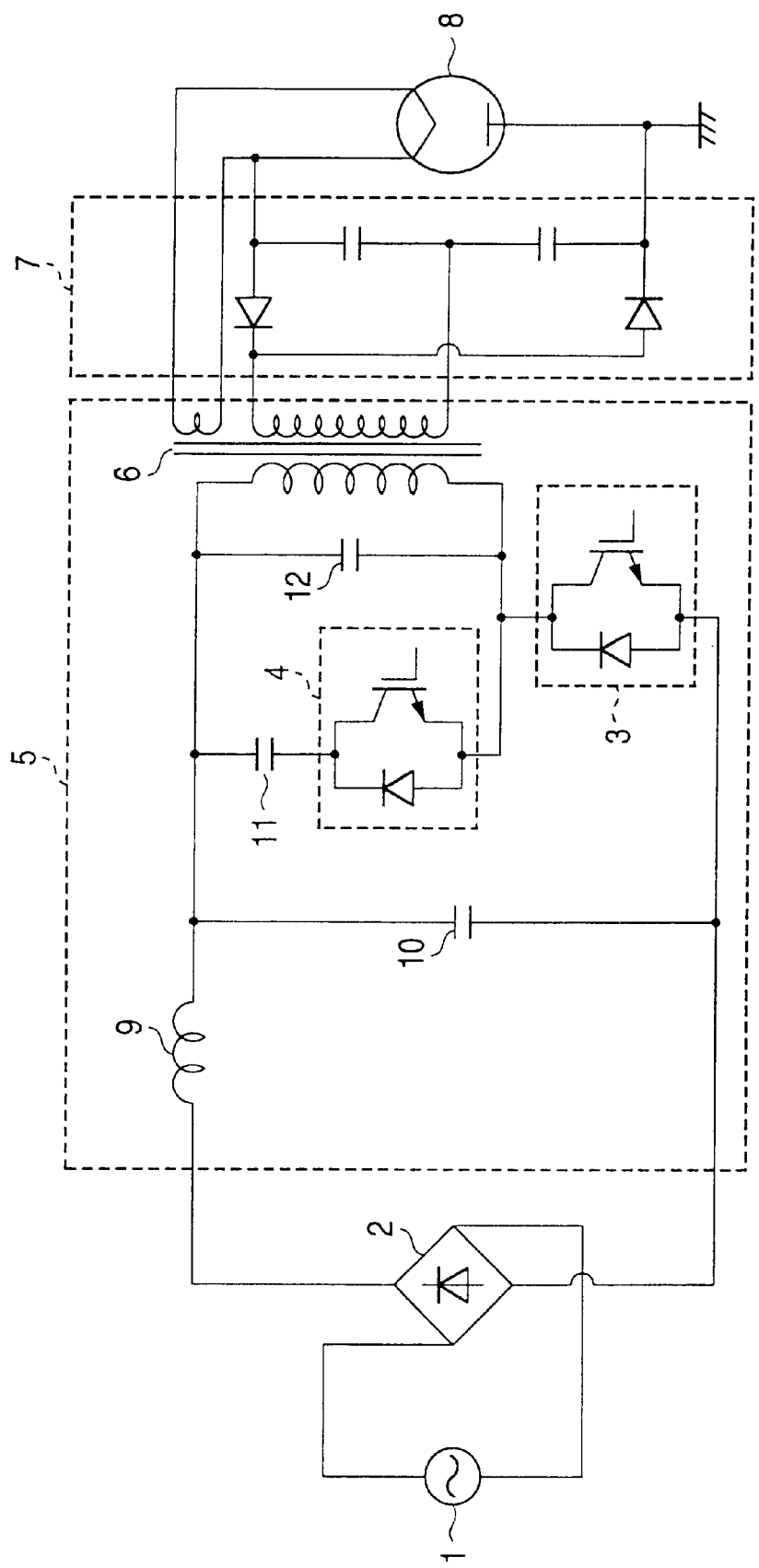
[FIG. 29]
Figure 30:
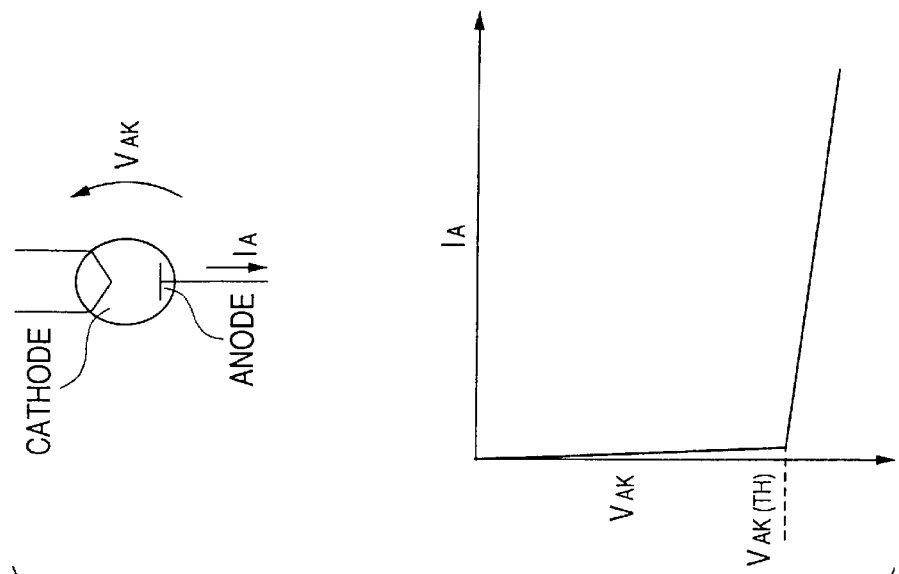
[FIG. 30]
Figure 31:
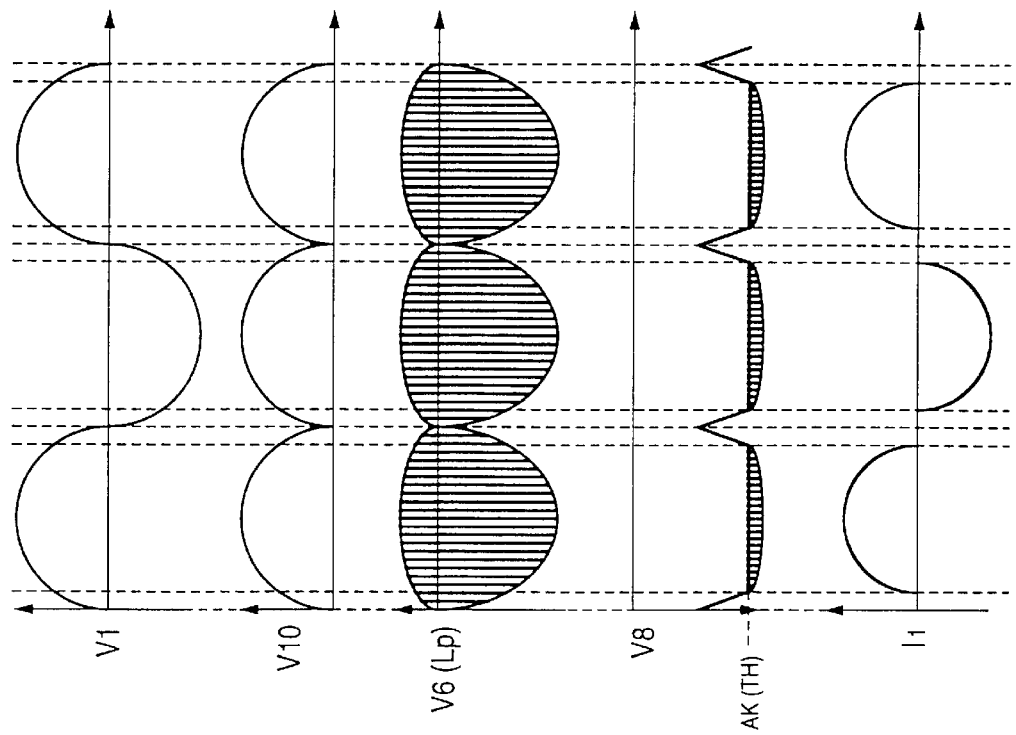
[FIG. 31]
Figure 32:
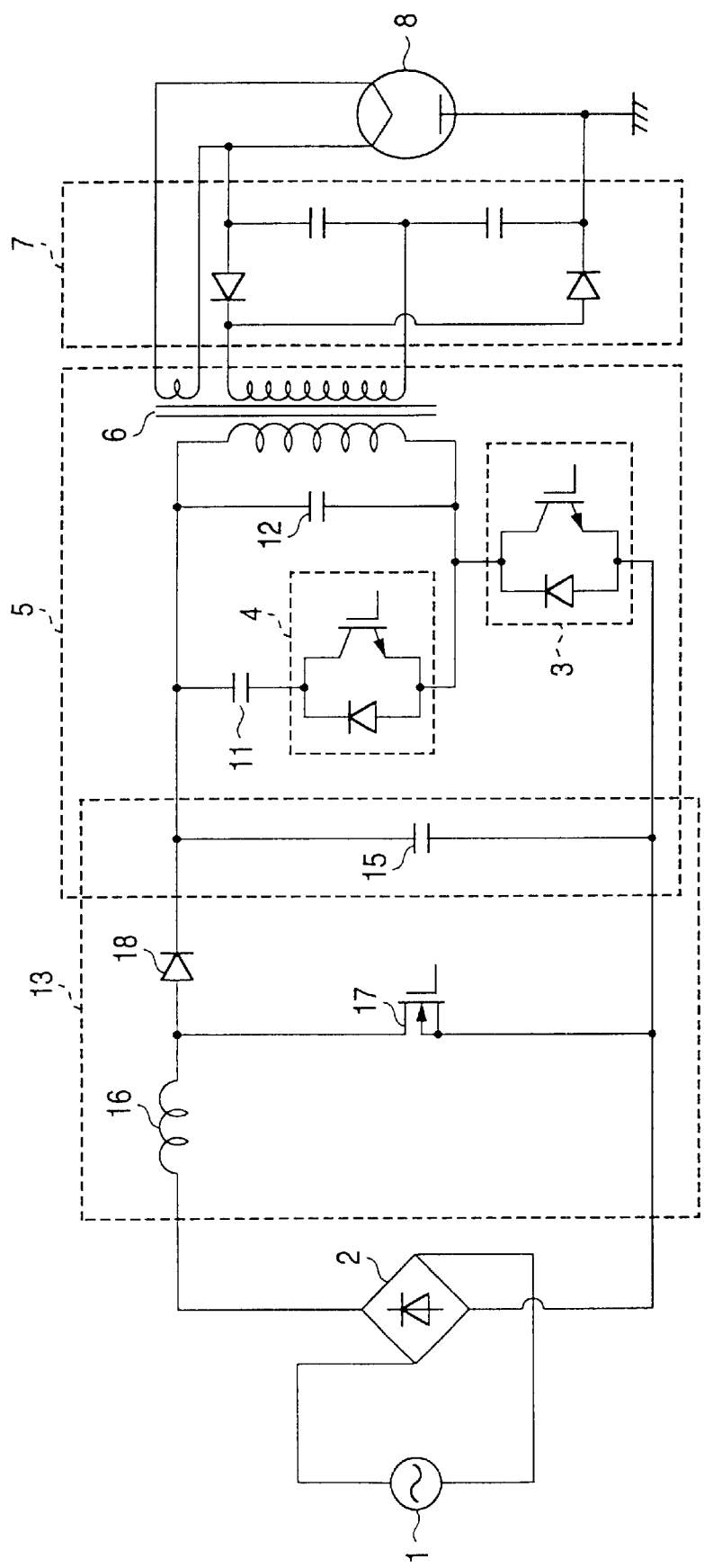
[FIG. 32]
Figure 33:
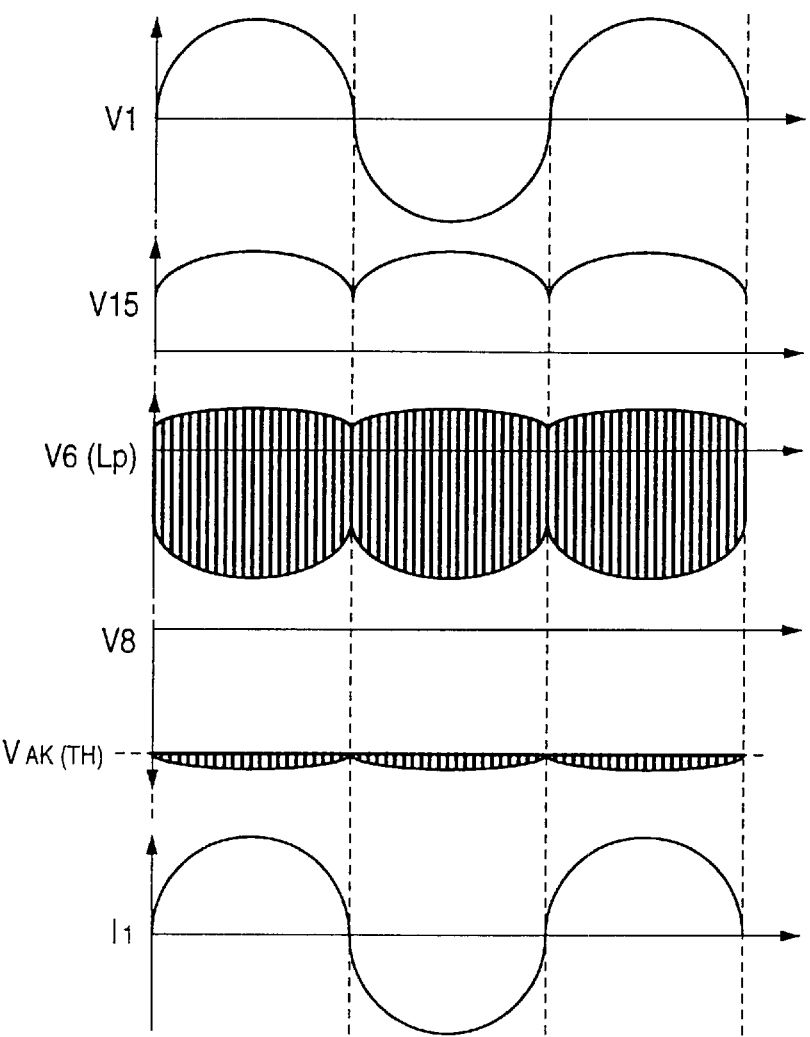
[FIG. 33]
Figure 34:
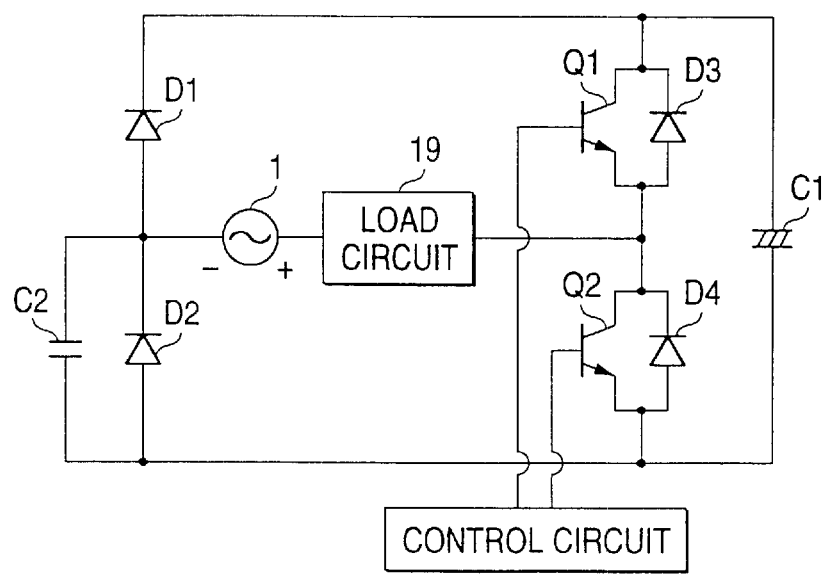
[FIG. 34]
Figure 35B:
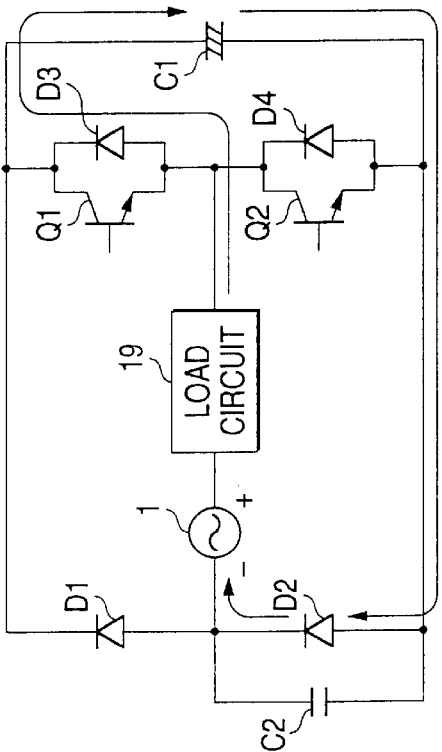
FIGS. 35A to 35D are circuit diagrams to show current paths in operation modes of the power supply unit in FIG. 34.
Figure 35D:
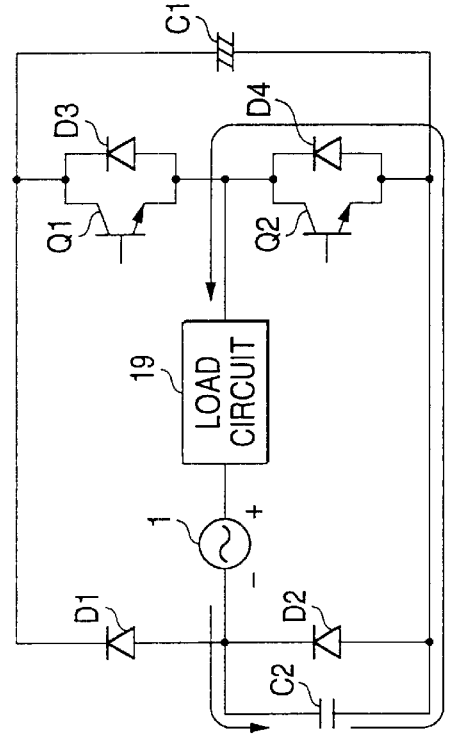
Figure 35A:
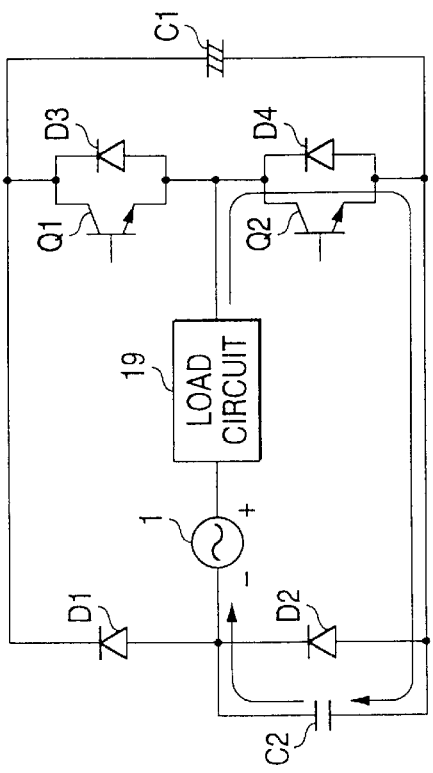
Figure 35C:
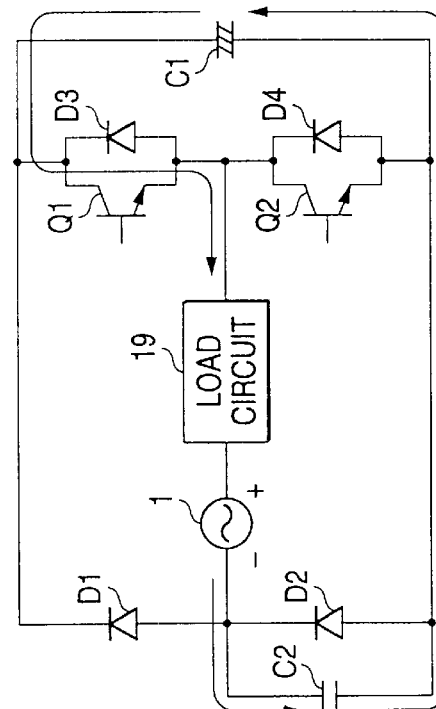
Figure 36:
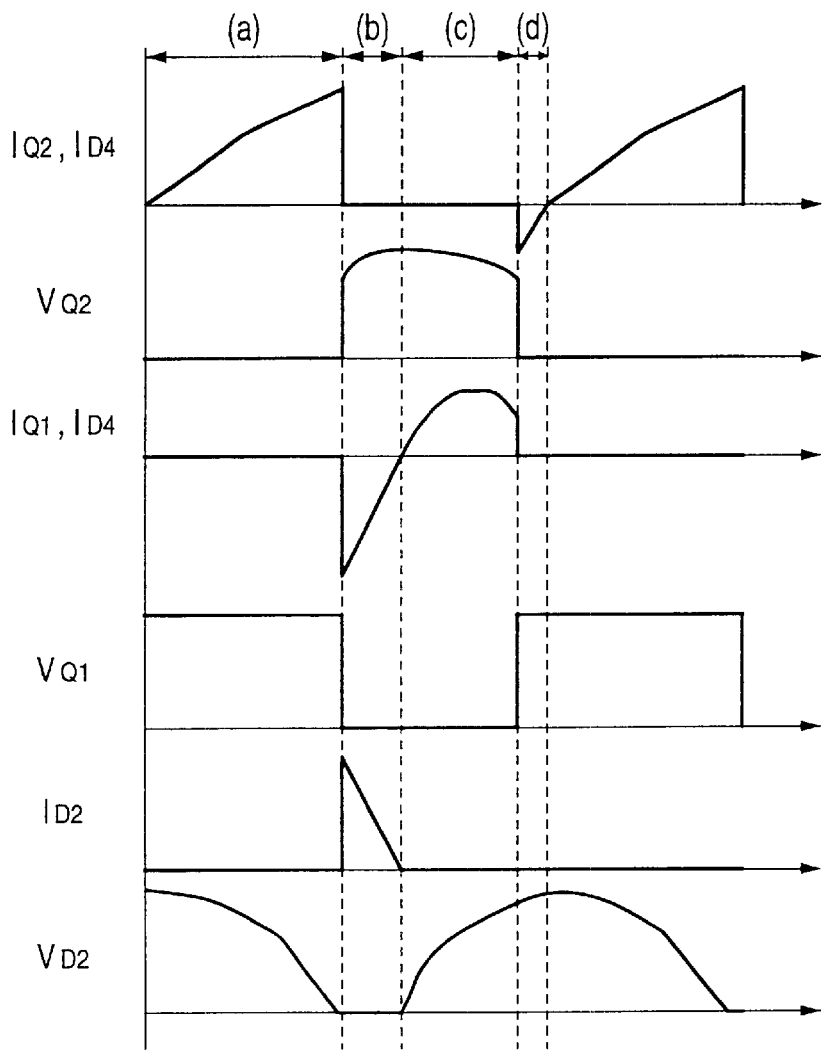
[FIG. 36]

A sixth embodiment of the invention will be discussed with reference to FIGS. 26 to 28. FIG. 26 is a circuit diagram of a magnetron drive power supply in the sixth embodiment of the invention. Power supply polarity determination means 34 determines the voltage polarity of a commercial power supply 1 and transmits a signal indicating whether the commercial power supply 1 has a positive or negative voltage polarity to a drive circuit 33. The drive circuit 33 operates so as to replace on time ratios of semiconductor switch elements 20 and 21 based on the determination signal and at the same time, operates so as to decrease the on time ratio Don21 of the semiconductor switch element 21 in response to the voltage value of the commercial power supply 1 in the time period over which the voltage of the commercial power supply 1 is large in the positive direction and operates so as to decrease the on time ratio Don20 of the semiconductor switch element 20 in response to the voltage value of the commercial power supply 1 if the voltage of the commercial power supply 1 is large in the negative direction. FIG. 27 shows this state, and the on time ratios of the semiconductor switch elements 20 and 21 change as Don20 and Don21 in response to the voltage of the commercial power supply 1. The on time ratios of the semiconductor switch elements 20 and 21 are thus controlled, whereby current waveform I1 of the commercial power supply 1 changes like a trapezoidal wave such that the portion of the maximum value is squashed as compared with a rough sine wave, as shown in the figure. To handle the same conversion power, the maximum current value can be lessened if the current waveform is controlled like a trapezoidal wave rather than a sine wave. FIGS. 28(a) and 28(b) show current and voltage waveforms of the semiconductor switch elements 20 and 21 at the maximum current time when the on time ratios are controlled in response to the voltage of the commercial power supply 1 and when the input current is made roughly like a sine wave at a constant one time ratio. FIG. 28(a) shows waveform examples when the on time ratios Don20 and Don21 are controlled in response to the voltage of the commercial power supply 1 and FIG. 28(b) shows waveform examples when the input current is made roughly like a sine wave. Making a comparison among the waveforms, in the waveforms in FIG. 28(a), maximum current value 121 (max) of the semiconductor switch element 21 becomes low as compared with that in FIG. 28(b). Consequently, the current effective value of the semiconductor switch element becomes low and thus the loss in wiring on a lead or a printed circuit board can be decreased and the loss of an inverter circuit can be decreased. Since a current also flows into the primary winding of a high-voltage transformer 26 at the same time as the semiconductor switch elements 20 and 21 are on, decreasing the current effective value of the semiconductor switch element leads to decreasing the current effective value of the primary winding of the high-voltage transformer 26 at the same time. The loss occurring in the high-voltage transformer 26 is roughly classified into a copper loss produced by allowing a current to flow into the winding and an iron loss occurring in a magnetic circuit such as a ferrite core. Particularly, the part of the copper loss can be roughly expressed by the product of equivalent series resistance Rs of the winding and the square of effective value I of a passed current. Therefore, the on time ratio of the semiconductor switch element is changed in response to the voltage of the commercial power supply 1 for decreasing the current effective value as in the embodiment, whereby the copper loss of the primary winding of the high-voltage transformer 26 can be decreased drastically. Therefore, it is made possible to more decrease the loss of the inverter circuit and it is made possible to improve the circuit efficiency.

(Embodiment 7)

FIG. 1 shows the circuit configuration used in a seventh embodiment of the invention. A series connection body of first and second semiconductor switch elements 20 and 21 and a series connection body of first and second diodes 22 and 23 are connected in parallel, first and second capacitors 24 and 25 are connected in parallel to the first and second diodes 22 and 23, and a series circuit of a commercial power supply 1 and a high-voltage transformer 26 is connected between the connection point of the semiconductor switch elements 20 and 21 and the connection point of the diodes 22 and 23. Secondary winding output of the high-voltage transformer 26 is connected to a high-voltage rectification circuit 7 for applying a DC high voltage to a magnetron 8. The magnetron 8 is driven by the DC high voltage and generates a radio wave of 2.45 GHz. In the embodiment, each of the first and second semiconductor switch elements is described as an IGBT (insulated gate bipolar transistor) conducting forward and a diode connected in inversely parallel with the IGBT, but such an element with a diode formed therein such as MOSFET can also be used, needless to say.

FIGS. 2(a) to 2(e) are diagrams to show paths over which currents in time periods of an inverter circuit flow, and FIG. 3 is an operation waveform chart corresponding thereto. The description to follow starts at the state in which the semiconductor switch element 21 is on with the polarity of the commercial power supply 1 as shown in the figure. In the state, a current flows over a path of the commercial power supply 1 to primary winding of the high-voltage transformer 26 to the semiconductor switch element 21 to the diode 23, as shown in FIG. 2(a), and current shown in I21 in the time period in FIG. 3(a) flows into the semiconductor switch element 21 and the primary winding of the high-voltage transformer 26, thereby storing energy in the primary winding of the high-voltage transformer 26. If the semiconductor switch element 21 is turned off in a predetermined time, the primary winding current of the high-voltage transformer 26 attempts to continue flowing in the same direction and thus this time, the capacitor is charged by the energy stored in the primary winding of the high-voltage transformer 26 on a path of the commercial power supply 1 to the primary winding of the high-voltage transformer 26 to parallel diode of the semiconductor switch element 20 to the capacitor 24, as shown in FIG. 2(b). This operation is performed, whereby the voltage provided by boosting the voltage of the commercial power supply 1 is stored in the capacitor 24. When all energy stored in the primary winding of the high-voltage transformer 26 is released, a path in FIG. 2(c) is formed and this time, the charged energy of the capacitor 24 is taken out on a path of the capacitor 24 to the semiconductor switch element 20 to the primary winding current of the high-voltage transformer 26 to the commercial power supply 1. If the semiconductor switch element 20 is turned off in a predetermined time, the primary winding of the high-voltage transformer 26 attempts to continue allowing the current to flow in the same direction and thus the current flows over a path of the primary winding of the high-voltage transformer 26 to the commercial power supply 1 to the capacitor 25 to parallel diode of the semiconductor switch element 21, as shown in FIG. 2(d). If the commercial power supply 1 has an opposite voltage polarity to that shown in the figure, the semiconductor switch elements 20 and 21, the diodes 22 and 23, and the capacitors 24 and 25 are only replaced in operation and similar operation is performed.

In the described operation, the capacitor 24, 25 is designed for such a capacity making it possible to perform both the inverter operation of generating a high-frequency current in the primary winding of the high-voltage transformer 26 as the semiconductor switch element 20, 21 is turned on/off and the operation of generating the voltage provided by boosting the voltage of the commercial power supply 1 in the capacitor 24, 25, and the capacity of the capacitor 24 is made equal to that of the capacitor 25. Consequently, if the commercial power supply 1 has the voltage polarity shown in the figure, the voltage provided by boosting the voltage of the commercial power supply is stored in the capacitor 24 and in contrast, if the commercial power supply 1 has an opposite voltage polarity to that shown in the figure, the voltage provided by boosting the voltage of the commercial power supply 1 is stored in the capacitor 25. Therefore, the voltage generated in the capacitor 24 can be made equal to that generated in the capacitor 25 independently of the voltage polarity of the commercial power supply 1 and thus the current of the commercial power supply 1 can be made a symmetrical waveform with respect to the voltage polarity. Such operation is continued, whereby the voltage waveform of the capacitor 24, 25 generates a voltage boosted in response to the voltage polarity of the commercial power supply 1 with respect to the period of the commercial power supply 1, as shown in FIG. 4. Thus, the envelope waveform of the current flowing into the primary winding of the high-voltage transformer 26 becomes a waveform as shown in V26 (Lp). Since the high-voltage transformer 26 boosts the voltage and applies the boosted voltage to the magnetron 8, the voltage applied to the magnetron 8 shows a waveform as in V8 and it is made possible to always maintain the voltage equal to or more than oscillation voltage VAK (TH) Consequently, the input current I1 can be allowed to flow in any periods of the commercial power supply 1 and improvement in the power factor and suppression of harmonics can be accomplished.

When a transition is made from the time period (a) to (b) in FIG. 3, the operation of cutting off the diode 23 is performed; the semiconductor switch element 21, which is connected in series as a current path, shuts off the current, and the switching speed of the diode 23 is not required. Since the voltage applied to the diode 23 at the off time is zero, no switching loss occurs at the turning off time. Therefore, it is made possible to design the diode 22, 23 so as to focus on suppressing the loss at the conduction time in the design with importance attached to the forward on voltage VF, and simplifying the structure of cooling the diode 22, 23 as well as miniaturizing the diode 22, 23 is facilitated. Particularly, such a magnetron drive power supply used with a microwave oven handles high power of 1000 W or more and thus the current of an inverter circuit becomes a very large current level of about 40 A to 50 A and it is advantageous in improving the efficiency of the inverter circuit to decrease the conduction loss with importance attached to the forward on voltage VF in the design of the diode 22, 23. Thus, the total power loss of the inverter circuit can be minimized and a magnetron drive power supply high in efficiency can be provided.

Thus, in the magnetron drive power supply used in the embodiment, it is made possible to design the diode 22, 23 with importance attached to the forward on voltage VF by performing circuit operation entirely different from that of the circuitry shown in the related art example, the loss of the diode 22, 23 is minimized, and the whole power conversion efficiency of the magnetron drive power supply is improved. This advantage is a proper advantage to the invention exerted as the capacitor 24, 25 serves as both the inverter operation and the operation of applying the voltage provided by boosting the voltage of the commercial power supply 1, and is provided by the capacitor circuit function and circuit operation different from those in JP-A-10-271846 described in the related art example.

FIG. 12 shows a more actual circuit configuration of the magnetron drive power supply of the embodiment, wherein output of the commercial power supply 1 is provided with a low-pass filter 29 consisting of an inductor 27 and a capacitor 28, whereby the high-frequency current of the inverter circuit is not allowed to flow into the commercial power supply. The low-pass filter 29 is thus inserted between the commercial power supply 1 and the inverter circuit, so that the high-frequency current or voltage of the inverter circuit is not routed to the commercial power supply side, thereby making it possible to decrease terminal noise. The above-described operation does not change if the configuration is applied. The description to follow centers around a drive circuit 33 for controlling drive signals of the semiconductor switch elements 20 and 21.

The drive circuit 33 drives the semiconductor switch elements 20 and 21 for operating the inverter circuit. Drive signals Vg20 and Vg21 sent by the drive circuit 33 to the semiconductor switch elements 20 and 21 have waveforms each having a dead time and turned on and off complementarily to each other, as shown in FIG. 13(a). The semiconductor switch elements 20 and 21 are thus turned on and off complementarily to each other, whereby the inverter circuit transmits electric power to the magnetron 8.

FIG. 14 shows the relationship between on time ratio Don21 of the semiconductor switch element 21 and conversion power P of the inverter circuit. In the figure, the curve indicated by the solid line shows change in the conversion power P when the commercial power supply 1 has a voltage polarity shown in FIG. 12 and in contrast, the curve indicated by the dashed line shows change in the conversion power P when the commercial power supply 1 has a voltage polarity opposite to that shown in FIG. 12. Thus, the relationship between the on time ratio Don21 of the semiconductor switch element 21 and the conversion power P of the inverter circuit varies depending on the voltage polarity of the commercial power supply 1. Therefore, in a state in which the on time ratio Don21 of the semiconductor switch element 21 is roughly 50%, the same power conversion can be performed regardless of the positive or negative voltage polarity of the commercial power supply 1, so that the current of the commercial power supply 1 can made a symmetrical waveform with respect to the voltage polarity, as shown in FIG. 15(b) However, if an attempt is made to make the current of the commercial power supply 1 a sine wave symmetrical with respect to the voltage polarity, conversion power is limited only at the one point. Heating power is selected from among various steps in response to foods at the heating time with a home microwave oven, etc. The heating power needs to be adjusted as "strong," "medium," "weak," or the like is set, for example. To meet it, it becomes necessary to change the on time ratio Don21 of the semiconductor switch element 21 in response to any desired output power. However, if an attempt is made to adjust to the desired output power at a constant on time ratio Don21 independently of the voltage polarity of the commercial power supply 1, the on time ratio Don21 is placed out of 50% from the relationship between the on time ratio Don21 of the semiconductor switch element 21 and the conversion power P shown in FIG. 14, and different waveforms are shown in positive and negative time periods of the voltage of the commercial power supply 1. If the control method is executed in error, a current waveform placed out of balance of the positive and negative polarities as shown in FIG. 15(a) results. In this case, the current waveform does not become a symmetrical waveform and thus an even'th-order harmonic occurs and in the end, it is made impossible to improve the power factor.

Figure 37:
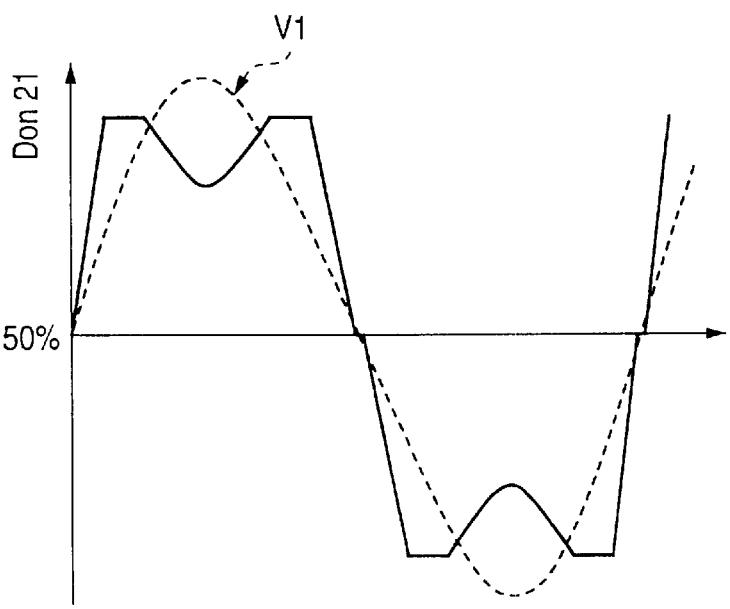
[FIG. 37]

Then, in the embodiment, the drive circuit 33 operates so as to replace the drive signals of the semiconductor switch elements 20 and 21 in response to the voltage polarity of the commercial power supply 1. That is, as shown in FIG. 37, if the voltage polarity of voltage waveform V1 (dotted line) of the commercial power supply 1 is positive, the on time ratio (solid line) Don21 of the semiconductor switch element 21 for governing step-up charging-up operation and inverter operation is raised and when the polarity is opposite, the on time ratio Don21 of the semiconductor switch element 21 is lowered. When the polarity of the commercial power supply voltage V1 is positive, the on time ratio Don21 enabling step-up charging up at the maximum is set in the valley part from 0 volts to the maximum voltage and in contrast, the on time ratio Don21 is a little lowered in the vicinity of the maximum voltage (peak part) The on time ratio Don21 of the semiconductor switch element 21 is thus changed, whereby it is made possible to provide input current with small distortion, and the heating power of "strong," "medium," "weak," etc., can be easily adjusted. The other semiconductor switch element 20 for governing the step-up charging-up function and the inverter function when the voltage polarity is negative performs complementary operation following the described semiconductor switch element 21, needless to say.

Figure 38:
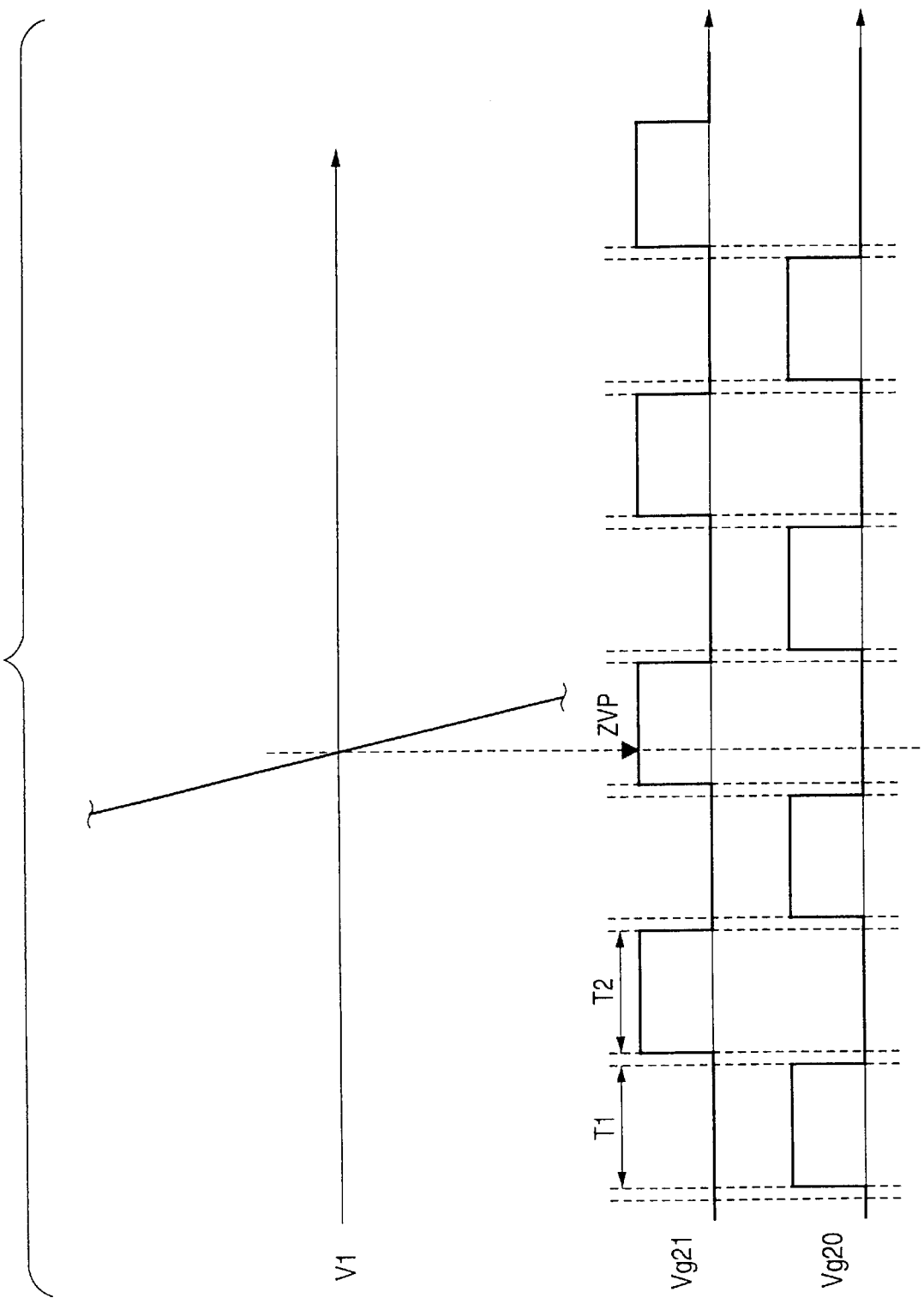
[FIG. 38]

At the time, the on time ratio Don21 is 50% at the polarity change point where the polarity of the commercial power supply voltage V1 is changed in FIG. 37, and on times T1 and T2 of Vg21 and Vg20 are equal as in FIG. 38 to show the polarity change point portion in detail. Under the control, the roles of one semiconductor switch element for governing both the step-up charging-up function and the inverter function and the other semiconductor switch element for governing only the inverter function can be replaced smoothly at the polarity change point. Consequently, needle-like distortion occurring in the vicinity of the polarity change point in the input current can be suppressed and stable input current can be provided.

As a whole, while the occurrence loss of the magnetron drive power supply in the circuit is decreased, the conversion power of the magnetron drive power supply changes and if the on time ratio Don21 of the semiconductor switch element 21 shifts in either direction from the state of roughly 50% and the conversion power is increased or decreased, it is made possible to always maintain the current waveform of the commercial power supply 1 as a waveform like a sine wave symmetrical with respect to the voltage polarity. Thus, it is made possible to accomplish the operation with small current distortion at a high power factor while high power conversion efficiency is always maintained if the conversion power is changed.

(Embodiment 8)

Figure 39:
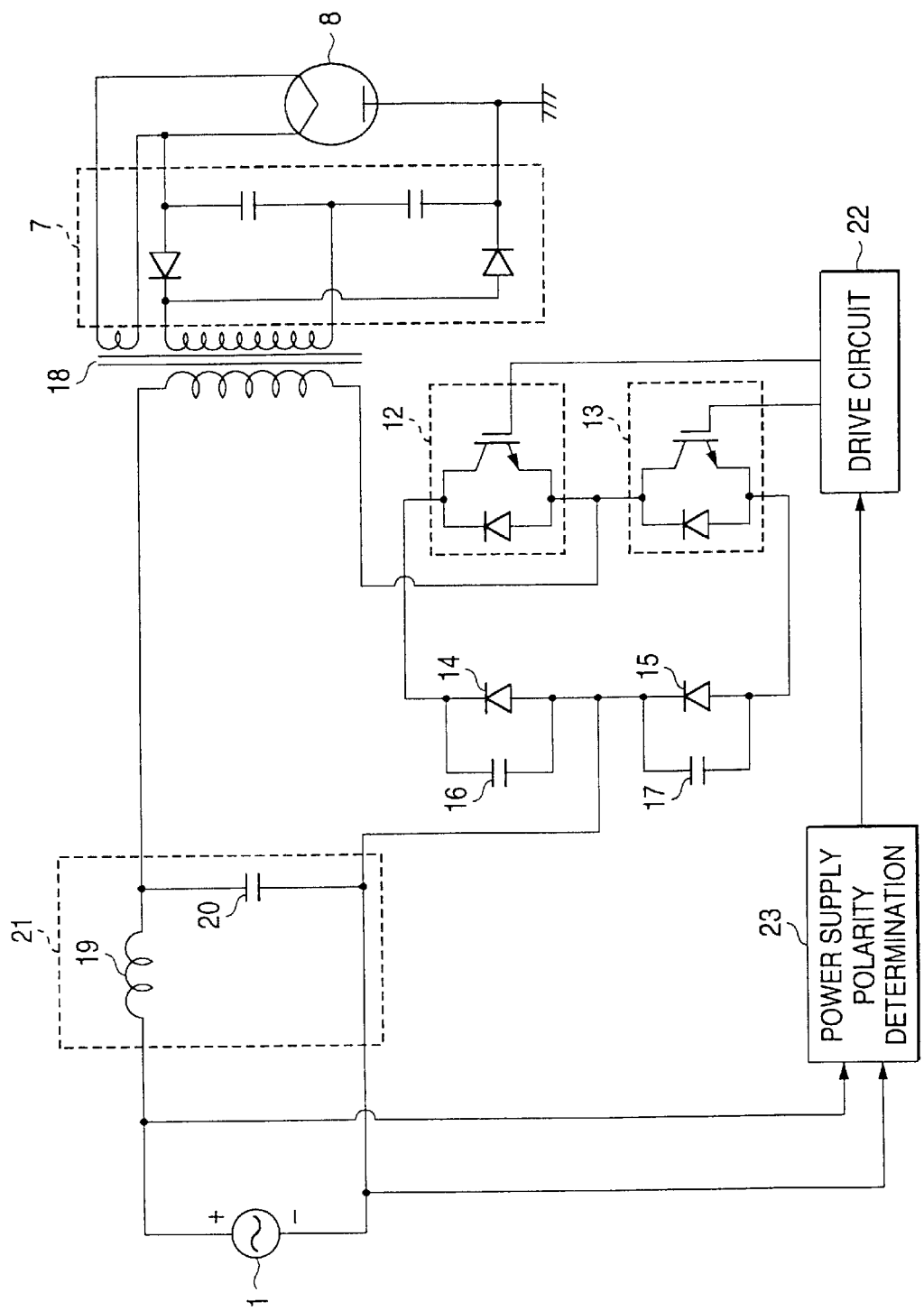
FIG. 39 is a circuit diagram of a magnetron drive power supply in an eighth embodiment of the invention.
Figure 40:
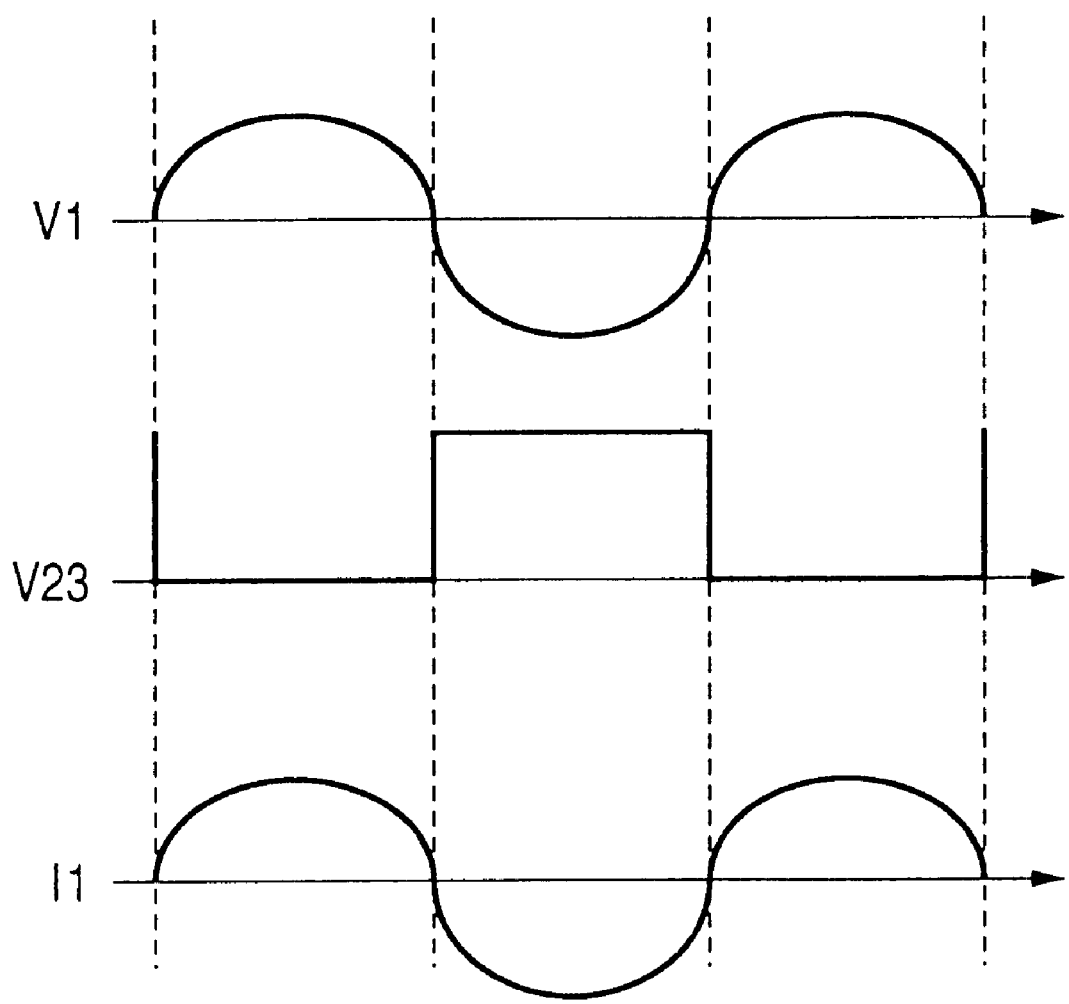
[FIG. 40]

FIG. 39 is a circuit diagram used in an eighth embodiment of the invention. Power supply polarity determination means 23 shown in FIG. 39 determines the voltage polarity of a commercial power supply 1 and transmits a signal indicating whether the commercial power supply 1 has a positive or negative voltage polarity (V23 in FIG. 40) to a drive circuit 33. As an example, when the polarity of commercial power supply voltage V1 is positive, the transmitted signal V23 is set low and when the polarity is negative, the signal V23 is set high, as shown in FIG. 40. The drive circuit 33 operates so as to replace on time ratios of semiconductor switch elements 20 and 21 based on the determination signal and at the same time, controls so as to change each on time ratio in response to the polarity of the commercial power supply 1, raise the on time ratio of the semiconductor switch element governing the step-up charging-up function in the valley part of the commercial power supply 1, and in contrast, lower the on time ratio in the peak part as shown in FIG. 37 for providing input current waveform 11 with small distortion.

Figure 41:
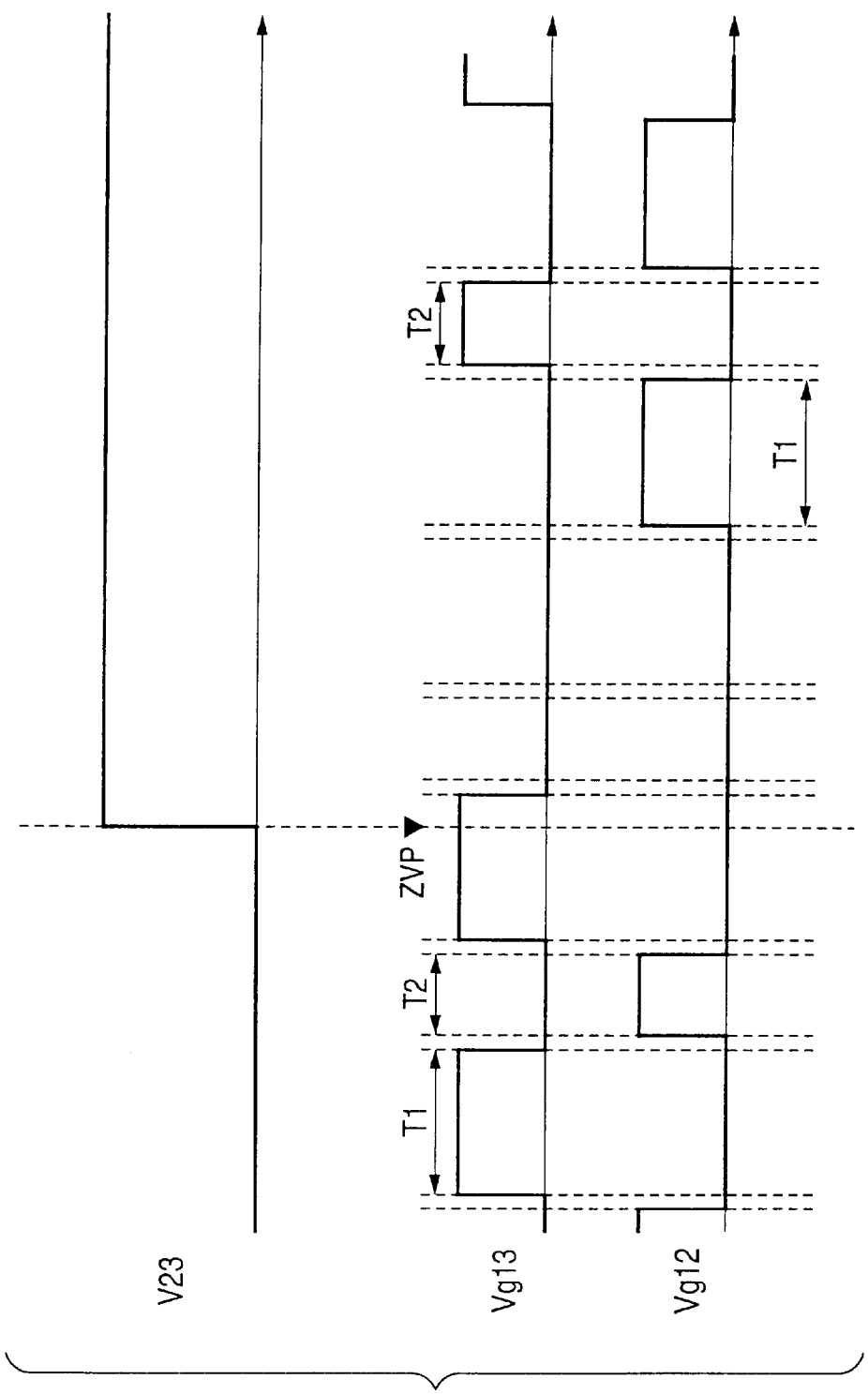
[FIG. 41]

At the time, the polarity of the commercial power supply can be determined by the power supply polarity determination means 23 and thus, after ZVP of a polarity change point is detected, a pause time period of turning off at the same time as much as one period of the inverter operation is provided, capacitor discharging is performed sufficiently, and the roles of the semiconductor switch elements can be replaced, as shown in FIG. 41. In the configuration, if on times T1 and T2 of Vg21 and Vg20 are made unequal to each other, as shown in FIG. 13, as the on-off duty ratio of each semiconductor switch element at the polarity change point, it is made possible to suppress needle-like input current distortion at the polarity change point.

(Embodiment 9)

Figure 42:
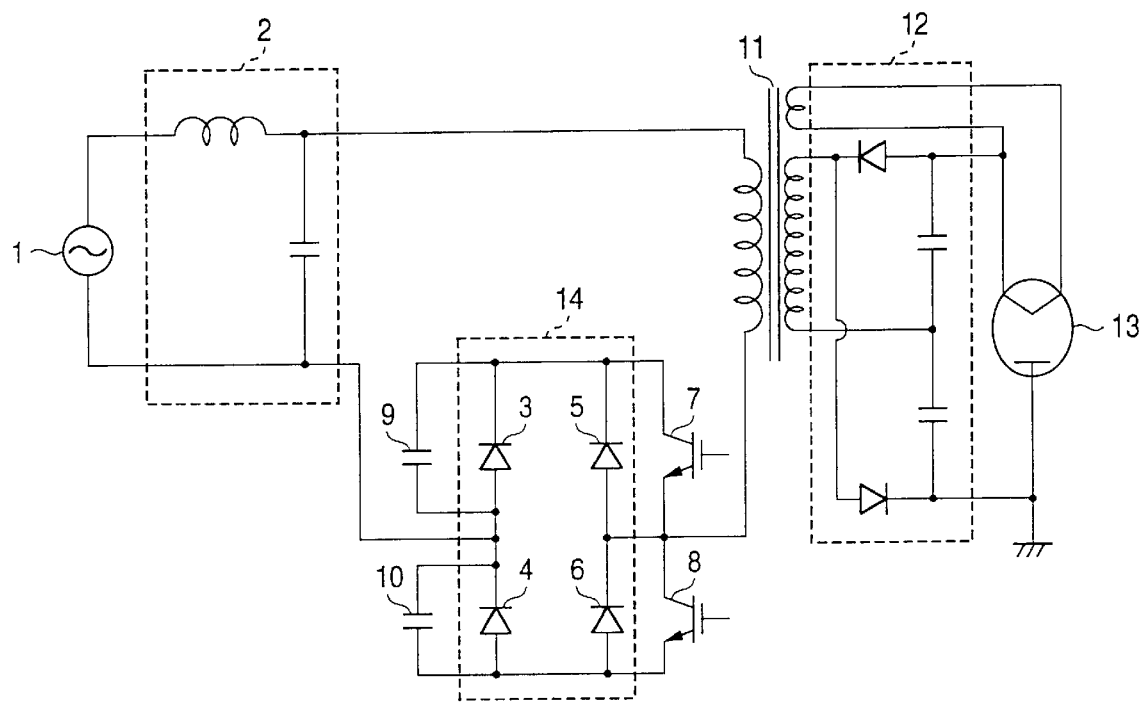
[FIG. 42]
Figure 43:
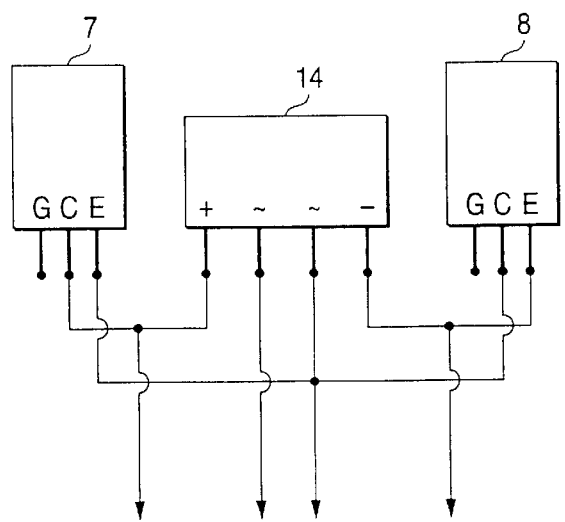
[FIG. 43]

A ninth embodiment of the invention will be discussed with reference to FIGS. 42 and 43. FIG. 42 is a diagram to show the circuit configuration of a magnetron drive power supply of the ninth embodiment of the invention. A series connection body of first and second semiconductor switches 7 and 8 is connected in parallel to a series connection body of first and second fly-wheel diodes 5 and 6. The first and second semiconductor switches 7 and 8 connected in series are connected in parallel to a series connection body of first and second rectification diodes 3 and 4. First and second capacitors 9 and 10 are connected to the first rectification diode 3 and the second rectification diode 4, and a commercial power supply 1, a filter 2, and a high-voltage transformer 11 are connected between the connection point of the first and second rectification diodes 3 and 4 and the connection point of the semiconductor switches 7 and 8. Secondary winding output of the high-voltage transformer 11 is connected to a high-voltage rectification circuit 12 for applying a DC high voltage to a magnetron 13. The magnetron 13 generates a radio wave of 2.45 GHz based on the DC high voltage. The operation of the magnetron drive power supply of the embodiment is the same as that in the related art example and therefore will not be discussed again.

The first and second rectification diodes 3 and 4 and the first and second fly-wheel diodes 5 and 6 are housed in one package as a rectification diode bridge 14, and as the first and second semiconductor switches 7 and 8, semiconductor switches containing no fly-wheel diode are housed in the package. Since such a configuration eliminates the need for containing a fly-wheel diode in the semiconductor switch 7, 8, it is made possible to adopt an inexpensive configuration. FIG. 43 is a connection diagram when the configuration is adopted. As the characteristic of the diode, a diode operating at speed used as a high-speed diode bride (trr: 5 sec or less) is fitted.

If the configuration is adopted, the losses of the semiconductors tend to be made uniform and thus the cooling balance becomes good and it is made possible to prevent only a specific element from largely rising in temperature.

As described above, according to the embodiment, the rectification diodes 3 and 4 and the fly-wheel diodes 5 and 6 are implemented as the rectification diode bridge 14, whereby the diodes of the rectification diode bridge 14 can be used with no waste and moreover the need for containing a diode in the semiconductor switch 7, 8 is eliminated, so that an inexpensive magnetron drive power supply can be provided.

(Embodiment 10)

Figure 44:
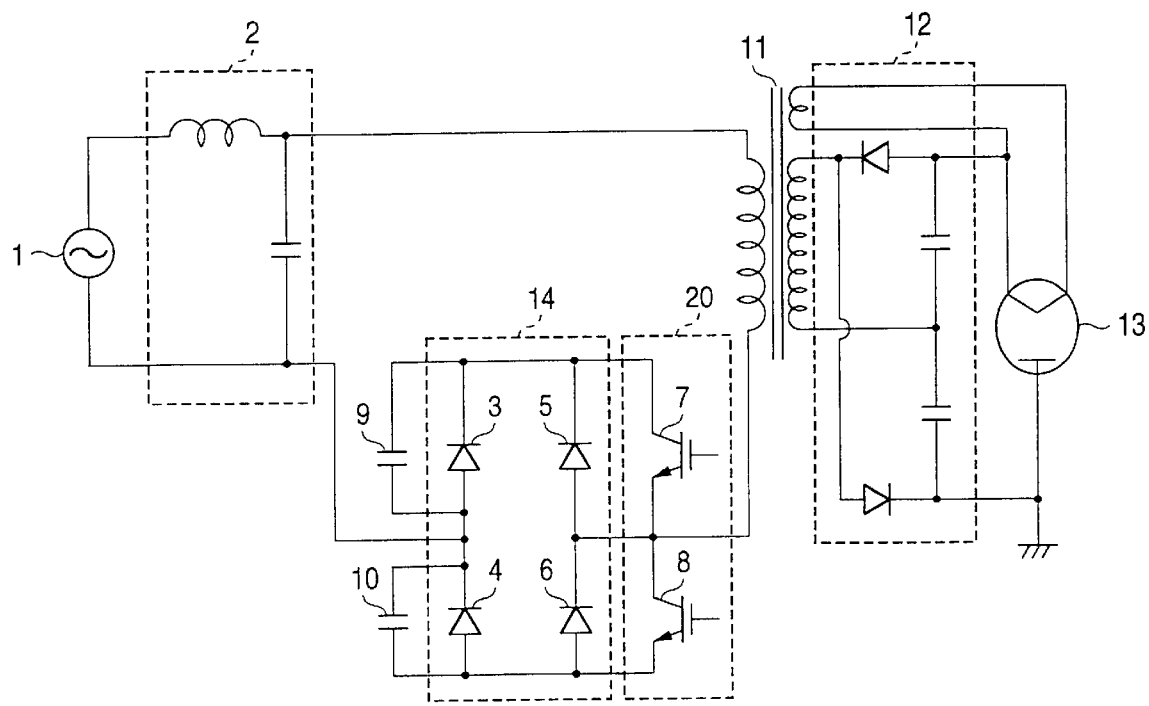
[FIG. 44]
Figure 45:
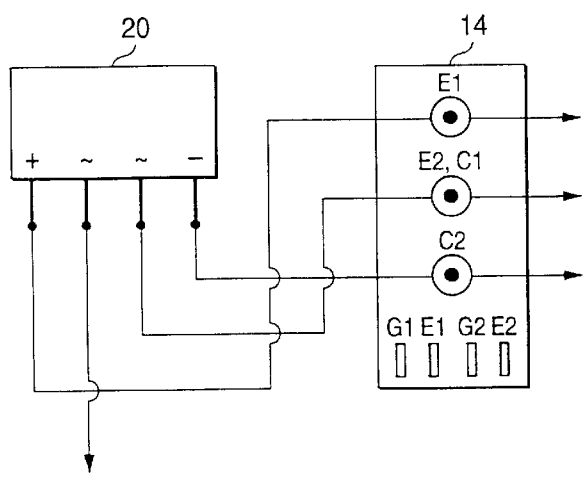
[FIG. 45]

A tenth embodiment of a magnetron drive power supply of the invention will be discussed with reference to FIGS. 44 and 45. FIG. 44 is a diagram to show the circuit configuration of the magnetron drive power supply of the tenth embodiment of the invention. The configuration of the magnetron drive power supply of the tenth embodiment differs from that of the ninth embodiment in that semiconductor switches 7 and 8 are housed in one package.

Such a configuration enables two elements of a rectification diode bridge 14 and a first module element 20 to make up a primary semiconductor element of an inverter. FIG. 45 is a connection diagram of the semiconductors when the configuration is adopted. This configuration makes it possible to reduce the number of installed packages, miniaturize the inverter, and eliminate the need for insulating the semiconductor switches 7 and 8 from each other, so that the needs for separating a radiation fan and using an insulating sheet are eliminated.

As described above, according to the embodiment, the semi22conductor switches 7 and 8 are implemented as a module, whereby it is made possible to miniaturize the inverter and a magnetron drive power supply miniaturized as a simple configuration can be provided.

(Embodiment 11)

An eleventh embodiment of a magnetron drive power supply of the invention will be discussed with reference to FIGS. 46 to 49. The configuration of the magnetron drive power supply of the eleventh embodiment is similar to that previously described with reference to FIGS. 42, 44 and therefore will not be discussed again in detail.

Figure 46:
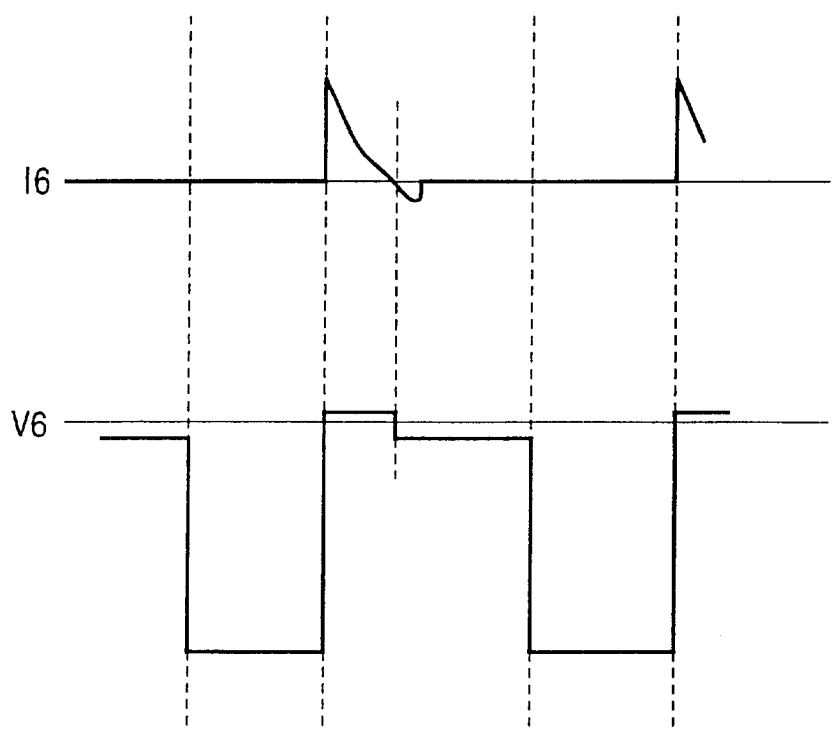
[FIG. 46]
Figure 47:
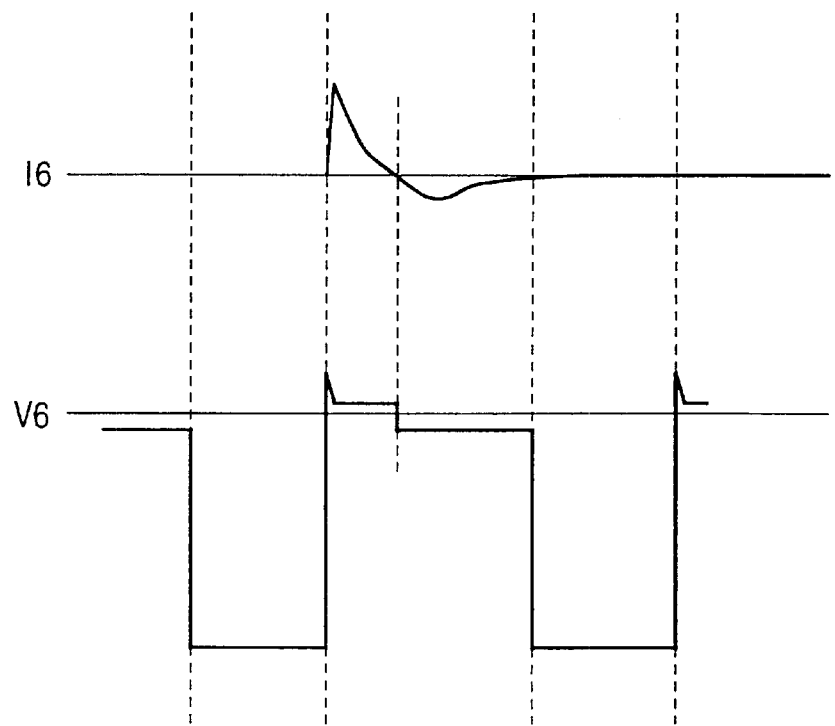
[FIG. 47]

The operation is as follows: FIGS. 46 to 49 are charts to show the waveforms of parts in the embodiment. FIG. 46 shows current and voltage waveforms of a fly-wheel diode 5, 6 when a high-speed product is used as the fly-wheel diode 5, 6. As can be seen from the figure, the loss occurring when the diode is turned on and the loss occurring when the diode is turned off, namely, the product of the current and voltage of the waveform is decreased as the high-speed product is used. FIG. 47 shows current and voltage waveforms when a low-speed product is used. As can be seen from FIG. 47, if the diode is turned on slowly, inverse voltage is much applied to a semiconductor switch 7, 8 and the switching loss occurring when the diode is turned on is increased. If turning off is slow, particularly if a current continues to flow still after the semiconductor switch 7, 8 is turned off, the loss at the turning off time grows. Thus, elements with importance attached to the switching speed are demanded for the fly-wheel diodes 5 and 6.

Figure 48:
[FIG. 48]
Figure 49:
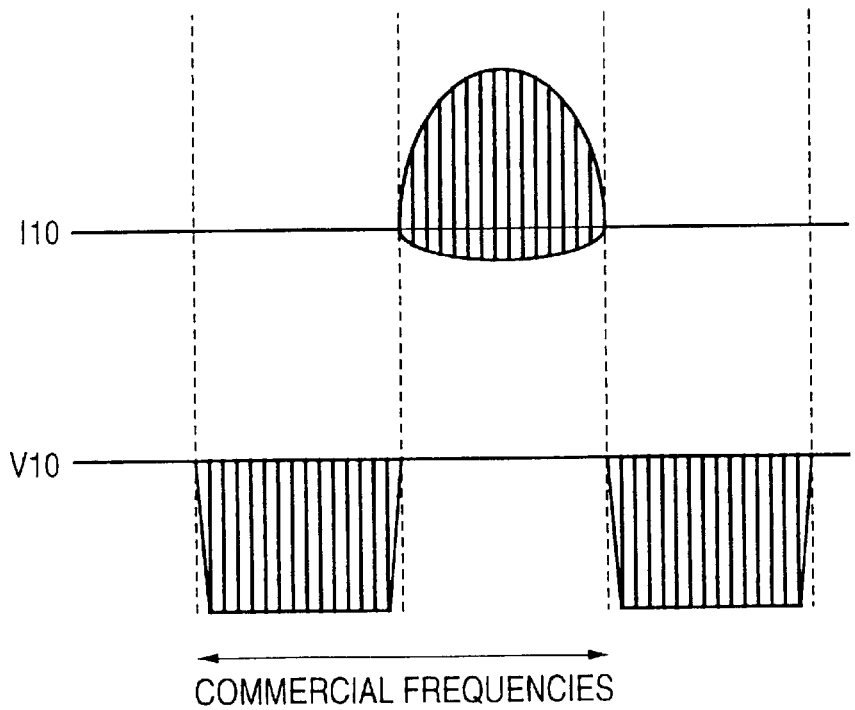
[FIG. 49]

On the other hand, FIG. 48 shows current and voltage waveforms of a rectification diode 3, 4. FIG. 49 shows current and voltage waveforms of the rectification diode 3, 4 when viewed with respect to commercial frequencies. As can be seen from FIG. 48, in the current waveform of the rectification diode 3, 4, the switching loss is small and the on loss, namely, the product of the current and the voltage when flowing in a steady state is dominant, because, as shown in FIG. 49, in the period during which a current flows into the rectification diode 3, 4, even when the rectification diode 3, 4 is turned off, voltage occurs only a little in the rectification diode 3, 4 and the product of the current and the voltage at the time also lessens. Thus, elements with importance attached to the low on voltage of diode, namely, VF are demanded for the rectification diodes 3 and 4.

Figure 50:
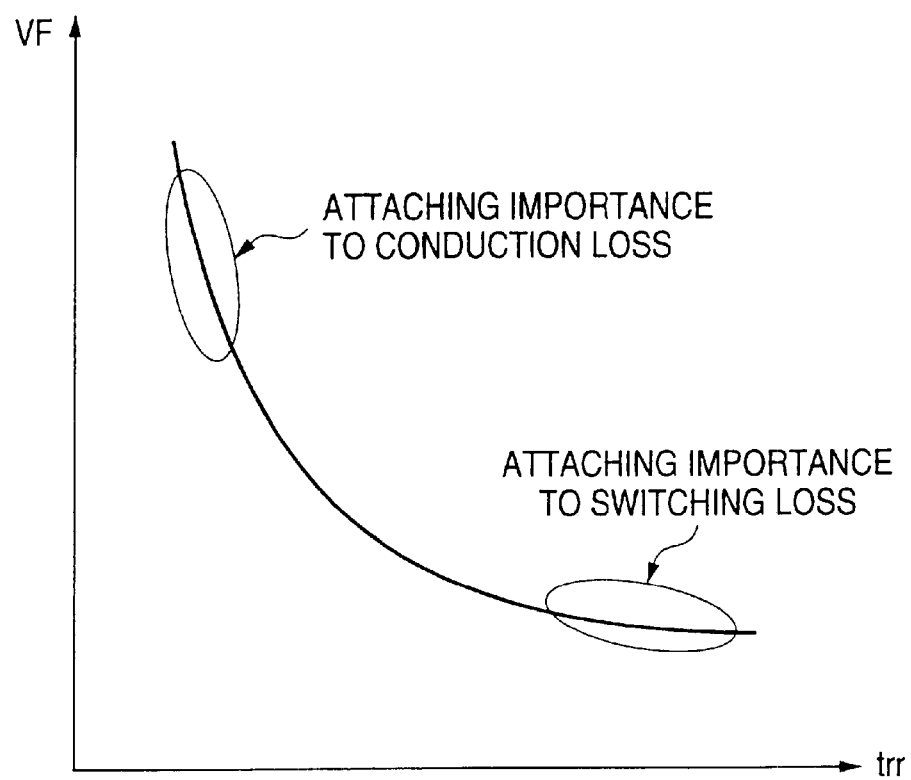
[FIG. 50]

FIG. 50 is a chart to show the characteristics of speed (trr) and on voltage (VF) of a general diode. Since trr and VF normally have mutually contradictory relationship, to form a rectification diode bridge 14 with one type of characteristic, an element of a value indicating the optimum characteristic is used. Conversely, the optimum element cannot be used. Using two types of elements different in characteristic, it is made possible to drastically decrease the element loss. That is, elements with importance attached to VF are used for the rectification diodes 3 and 4 and elements with importance attached to trr are used for the fly-wheel diodes 5 and 6, whereby a rectification diode bridge 14 with a low loss can be provided.

As described above, according to the embodiment, diodes with low VF are used for the rectification diodes 3 and 4 and high-speed diodes are used for the fly-wheel diodes 5 and 6 to make up the rectification diode bridge 14, so that it is made possible to minimize the loss of each diode, and an inexpensive magnetron drive power supply excellent in cooling capability making it possible to downsize a radiation fan can be provided.

(Embodiment 12)

A twelfth embodiment of a magnetron drive power supply of the invention will be discussed with reference to FIG. 51.

Figure 51:
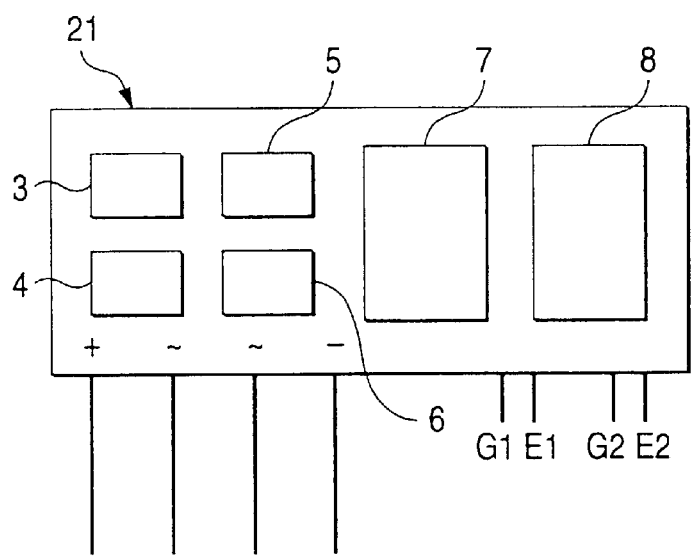
[FIG. 51]

FIG. 51 shows the configuration of the magnetron drive power supply of the embodiment of the invention. The twelfth embodiment differs from the ninth, tenth, or eleventh embodiment in that semiconductor switches 7 and 8, rectification diodes 3 and 4, and fly-wheel diodes 5 and 6 are housed in one package.

Such a configuration makes it possible to house semiconductors used on the primary side of the magnetron drive power supply in one package, eliminates the need for insulation between elements, required for discrete elements, and enables compact installation. It is also made possible to more miniaturize the cooling configuration as heating parts are collected in one point.

As described above, according to the embodiment, the semiconductor switches 7 and 8, the fly-wheel diodes 5 and 6, and the rectification diodes 3 and 4 are housed in one package, whereby all semiconductor elements of the primary circuit of an inverter are housed in one package and a miniaturized magnetron drive power supply can be provided.

(Embodiment 13)

A thirteenth embodiment of a magnetron drive power supply of the invention will be discussed with reference to FIG. 52.

Figure 52:
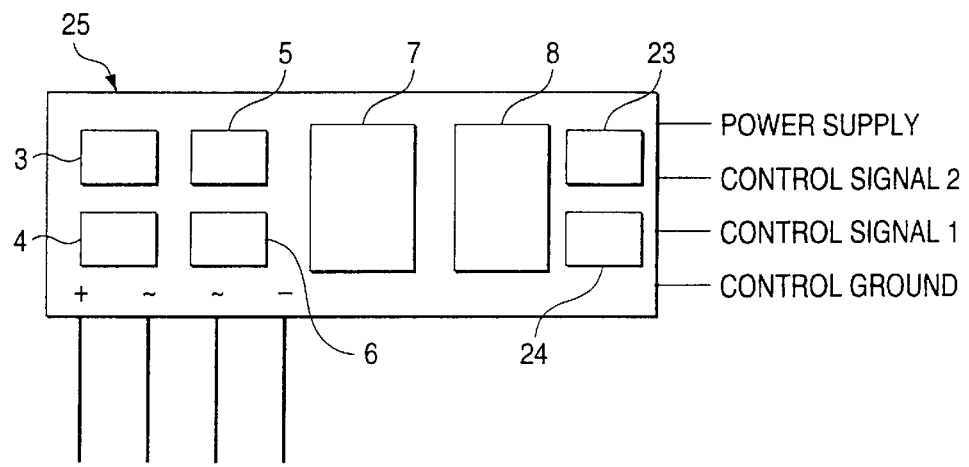
[FIG. 52]
Figure 53:
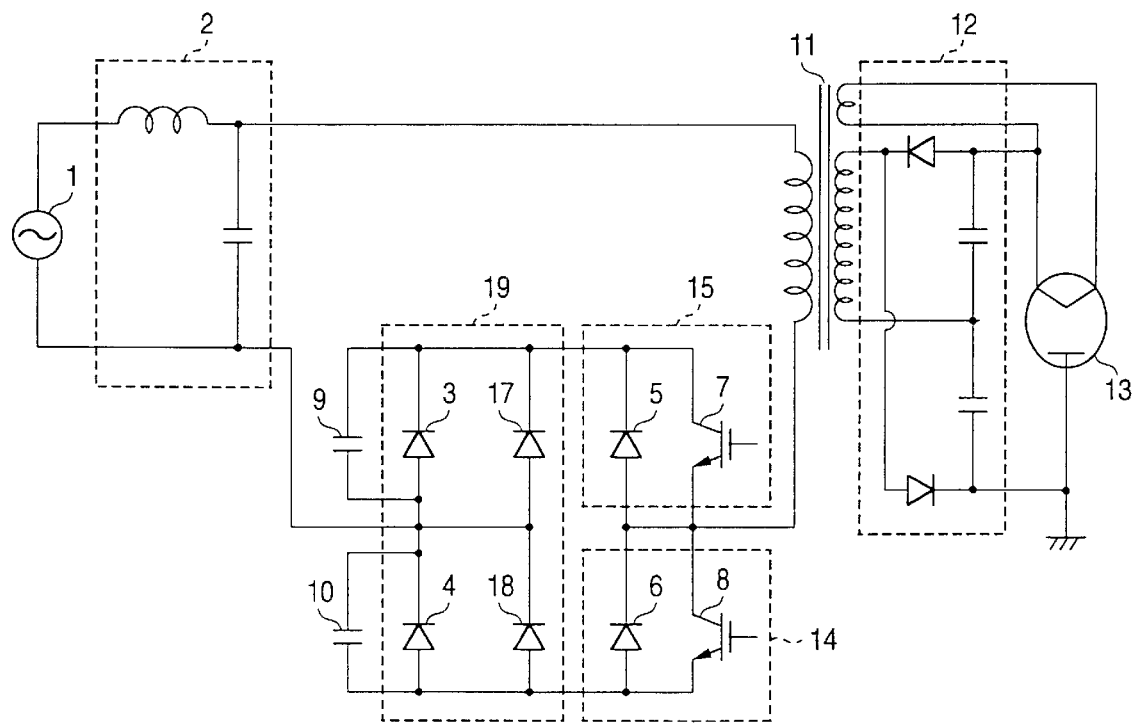
[FIG. 53]

FIG. 52 shows the configuration of the magnetron drive power supply of the embodiment of the invention. The thirteenth embodiment differs from the twelfth embodiment in that semiconductor switch drivers 23 and 24 are contained in a semiconductor module comprising semiconductor switches 7 and 8, rectification diodes 3 and 4, and fly-wheel diodes 5 and 6 housed in one package.

Such a configuration makes it possible to drive a switching element simply by connecting a drive signal and a driver power supply to the semiconductor module from a drive circuit (not shown). Thus, it is made possible to still more miniaturize the magnetron drive power supply. The drivers 23 and 24 are placed in the proximity of the semiconductor switches 7 and 8, so that it is also expected to provide more resistance to external noise.

As described above, according to the embodiment, the drivers 23 and 24 are housed in the semiconductor module, so that a more miniaturized magnetron drive power supply can be provided.

INDUSTRIAL APPLICABILITY

As described above, according to the invention as claimed in claims 1 to 6, input current can be allowed to flow over almost all regions of the commercial power supply through even a load having a nonlinear characteristic such as a magnetron, the occurrence loss of the inverter circuit can also be suppressed in a machine handling high conversion power such as a microwave oven, and a highly efficient magnetron drive power supply can be provided.

The high-frequency heating power supply unit of the invention makes it possible to suppress needle-like input current distortion in the polarity change point part occurring in a circuit configuration wherein the roles of one semiconductor switch element for governing the step-up charging-up function and the inverter function and the other semiconductor switch element for governing only the inverter function need to be replaced whenever the polarity of the commercial AC power supply is switched, and stable input current can be provided.

As seen from the described embodiments, according to the invention, the rectification diodes and the fly-wheel diodes are implemented as a rectification diode bridge, whereby the diodes of the rectification diode bridge can be used with no waste and moreover the need for containing a diode in the semiconductor switch is eliminated, so that an inexpensive magnetron drive power supply can be provided.

What is claimed is:

1. A magnetron drive power supply wherein a series connection body at first and second semiconductor switch elements that are capable of being brought into reverse conduction and a series connection body of first and second diodes are connected in parallel, first and second capacitors are connected In parallel to the first and second diodes, a series circuit of a commercial power supply and a primary winding of a high-voltage transformer is connected between a connection point of the first and second semiconductor switch elements that are capable of being brought into reverse conduction and a of the high-voltage transtormer energizes a magnetron through a high-voltage connection point of the first and second diodes, and output of a secondary winding rectification circuit.

2. The magnetron drive power supply as claimed in claim 1 wherein the first and second semiconductor switches that are capable of being brought into reverse conduction comprise a semiconductor switching element conducting forward and & diode connected in inversely parallel with the semiconductor switching element.

3. The magnetron drive power supply as claimed in claim 1 or 2 wherein the first and second diodes are made equal in capacity.

4. The magnetron drive power supply as claimed in any one of claims 1 to 3 wherein a third capacitor is connected in parallel to at least one point of the first and second semiconductor switch elements and the primary winding of the high-voltage transformer.

5. A magnetron drive power supply wherein a series connection body of first and second semiconductor switch elements that are capable of being brought into reverse conduction and a series connection body of first and second diodes are connected in parallel, first and second capacitors are connected in parallel to the first and second diodes, a series circuit of a commercial power supply and a primary winding of a high-voltage transformer is connected between a connection point of the first and second semiconductor switch elements that are capable of being brought into reverse conduction and a connection point of the first and second diodes, output of a secondary winding of the high-voltage transformer energizes a magnetron through a high-voltage rectification circuit, and drive circuit for driving the first and second semiconductor switch elements is provided and drives the first and second semiconductor switch elements complementarily and replaces drive signals depending on whether the commercial power supply is of positive or negative polarity.

6. The magnetron drive power supply as claimed in claim 5 comprising power supply polarity determination means for determining the polarity of the commercial power supply, wherein the drive circuit replaces the drive signals of the first and second semiconductor switch elements based on determination information of the power supply polarity determination means.

7. The magnetron drive power supply as claimed in claim 6 wherein the power supply polarity determination means is implemented as a photocoupler for determining the polarity of the commercial power supply.

8. The magnetron drive power supply as claimed in claim 6 wherein the power supply polarity determination means detects voltage of the second capacitor and determines the polarity of the commercial power supply.

9. The magnetron drive power supply as claimed in claim 5 wherein the drive signal is changed at a predetermined change rate in the proximity of a zero-cross point of the commercial power supply.

10. The magnetron drive power supply as claimed in any one of claims 5 to 9 wherein the conduction time of the second semiconductor switch element is changed so as to shorten in response to the voltage of the commercial power supply in the time period over which the voltage of the commercial power supply is high in a positive direction and in contrast, the conduction time of the first semi conductor switch element changed so as to shorten in response to the voltage of the commercial power supply in the time period over which the voltage of the commercial power supply is high in a negative direction.

11. A high-frequency heating power supply unit wherein a series connection body of first and second semiconductor switch elements that ten are capable of being brought into reverse conduction and a series connection body of first and second diodes re connected in parallel, first and second capacitors are connected in parallel to the first and second diodes, a series circuit of a commercial power supply and a primary winding of a high-voltage transformer is connected between a connection point of the first and second semiconductor switch elements that are capable of being brought into reverse conduction and a connection point of the first and second diodes, output of a secondary winding of the high-voltage transformer drives a magnetron through a high-voltage rectification circuit, and each of on-off duty ratios of the first and second semi conductor switch elements that are capable of being brought into reverse conduction is set to about 50% in the vicinity of a polarity change point where the polarity of the commercial power supply changes.

12. A high-frequency heating power supply unit wherein a series connection body of first and second semiconductor switch elements that are capable of being brought into reverse conduction and a series connection body of first and second diodes are connected in parallel, first and second capacitors are connected in parallel to the first and second diodes, a series circuit of a commercial power supply and a primary winding of a high-voltage transformer is connected between a connection point of the first and second semiconductor switch elements that are ca able of being brought into reverse conduction and a connection point of the first and second diodes, output of a secondary winding of the high-voltage transformer drives a magnetron through a high-voltage rectification circuit, and while polarity determination means is provided in control of the vicinity of a polarity charge point of the commercial power supply, the polarity change point is detected, whereby roles of the first and second semiconductor switch elements that are capable of being brought into reverse conduction for playing a role of both a step-up charging-up function and an inverter function and a role of only the inverter function complementarily at the same time are replaced.

13. A magnetron drive power supply comprising a series connection body of first and second semiconductor switches, first and second fly-wheel diodes in inverse parallel to the first and second semiconductor switches, a series connection body of first and second rectification diodes connected in parallel to the first and second semiconductor switches, first and second capacitors connected in parallel to the first and second rectification diodes, a commercial power supply and a primary winding of a high-voltage transformer connected in series to each other, connected between a connection point of the first and second semiconductor switches and a connection point of the first and second rectification diodes, and a high-voltage rectification circuit and a magnetron connected to output of a secondary winding of the high-voltage transformer, characterized in that the first and second fly-wheel diodes and the first and second rectification diodes are housed in one package.

14. The magnetron drive power supply as claimed in claim 13 wherein the first and second semiconductor switches are housed in one package.

15. The magnetron drive power supply as claimed in claim 13, wherein the first and second semiconductor switches, the first and second fly-wheel diodes, and the first and second rectification diodes are housed in one package.

16. The magnetron drive power supply as claimed in claim 13, 14, or 15 wherein high-speed diodes are used as the first and second fly-wheel diodes and diodes with low VF are used as the first and second rectification diodes.

17. The magnetron drive power supply as claimed in claim containing a drive circuit for driving the first and second semiconductor switches.

* * * * *

UNITED STATES PATENT AND TRADEMARK OFFICE
CERTIFICATE OF CORRECTION

PATENT NO. : 6,624,579 B2
DATED : September 23, 2003
INVENTOR(S) : Kenji Yasui et al.

It is certified that error appears in the above-identified patent and that said Letters Patent is hereby corrected as shown below:

Title page,
Item [30], Foregin Application Priority Data, please delete "P2000-068955", and insert therefor -- P2001-068955 --; and please delete "P2000-069964", and insert therefor -- P2001-069964 --.

Column 2,
Line 22, please delete "current 11", and insert therefor -- current I1 --.

Column 3,
Line 16, please delete "capacitor C1", and insert therefor -- capacitor C1. --.

Column 14,
Line 32, please delete "shown in 121", and insert therefor -- shown in I21 --.

Column 15,
Line 33, please delete "curremt 11", and insert therefor -- current I1 --.

Column 22,
Line 1, please delete "waveform 11", and insert therefor -- waveform I1 --.
Line 19, please delete "value 121", and insert therefor -- value I21 --.

Column 23,
Line 10, please delete "shown in 121", and insert therefor -- shown in I21 --.
Line 55, please delete "supply is", and insert therefor -- supply 1 is --.

Column 24,
Line 10, please delete "VAK(TH)", and insert therefor -- VAK(TH). --

Column 26,
Line 54, please delete "waveform 11", and insert therefor -- waveform I1 --.

Column 27,
Line 35, please delete "5 sec", and insert therefor -- 5μsec --.

Column 28,
Line 2, please delete "semi22conductor", and insert therefor -- semiconductor --.

Column 30,
Line 8, please delete "body at first", and insert therefor -- body of first --.

UNITED STATES PATENT AND TRADEMARK OFFICE
CERTIFICATE OF CORRECTION

PATENT NO. : 6,624,579 B2
DATED : September 23, 2003
INVENTOR(S) : Kenji Yasui et al.

It is certified that error appears in the above-identified patent and that said Letters Patent is hereby corrected as shown below:

Column 30 (cont'd),
Line 12, please delete "connected In parallel", and insert therefor -- connected in parallel --.
Line 24, please delete "and & diode", and insert therefor -- and a diode --.
Lines 17-20, please delete "and a of the high-voltage transtormer energizes a magnetron through a high-voltage connection point of the first and second diodes, and output of a secondary winding rectification circuit", and insert therefor -- and a connection point of the first and second diodes, and output of a secondary winding of the high-voltage transformer energizes a magnetron through a high-voltage rectification circuit. --

Column 31,
Line 11, please delete "element changed", and insert therefor -- element is changed --.
Line 18, please delete "that ten are", and insert therefor -- that are --.
Line 20, please delete "diodes re connected", and insert therefor -- diodes are connected --.
Line 43, please delete "are ca able of", and insert therefor -- are capable of --.

Column 32,
Line 5, please delete "charge point", and insert therefor -- change point --.
Line 41, please delete "claim containing", and insert therefor -- claim15 containing --.

Signed and Sealed this

Thirteenth Day of April, 2004

JON W. DUDAS
*Acting Director of the United States Patent and Trademark Office*